(12) United States Patent
Thompson et al.

(10) Patent No.: US 7,580,816 B2
(45) Date of Patent: Aug. 25, 2009

(54) APPARATUS AND METHODS FOR CREATING SKETCH-BASED EGGCRATE SUBSTRUCTURES FOR COMPOSITE PARTS

(75) Inventors: Michael W. Thompson, Maple Valley, WA (US); Thomas J. Vanderwiel, Everett, WA (US); Joji Yokoyama, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 11/379,980

(22) Filed: Apr. 24, 2006

(65) Prior Publication Data

US 2006/0195303 A1     Aug. 31, 2006

Related U.S. Application Data

(63) Continuation-in-part of application No. 10/774,220, filed on Feb. 6, 2004, now Pat. No. 7,076,323.

(51) Int. Cl.
G06F 17/50 (2006.01)
G05B 15/00 (2006.01)

(52) U.S. Cl. ............... 703/2; 700/182; 345/419; 345/423; 345/426

(58) Field of Classification Search ............... 703/2; 700/182; 345/419–426
See application file for complete search history.

(56) References Cited

U.S. PATENT DOCUMENTS

| 4,697,240 | A | 9/1987 | Cedar et al. |
| 4,917,394 | A | 4/1990 | Lin |
| 5,321,835 | A | 6/1994 | Tanaka et al. |
| 5,364,491 | A | 11/1994 | Aochi et al. |
| 5,701,403 | A | 12/1997 | Watanabe et al. |
| 5,856,210 | A | 1/1999 | Leavitt et al. |
| 6,549,201 | B1 * | 4/2003 | Igarashi et al. ............... 345/423 |
| 6,606,528 | B1 | 8/2003 | Hagmeier et al. |
| 6,675,059 | B2 | 1/2004 | Scott |
| 6,775,585 | B2 | 8/2004 | Bedont, Jr. et al. |
| 7,076,323 | B2 * | 7/2006 | Vanderwiel ................. 700/182 |
| 2002/0158870 | A1 * | 10/2002 | Brunkhart et al. ........... 345/424 |
| 2006/0082571 | A1 * | 4/2006 | McDaniel .................... 345/419 |
| 2007/0018980 | A1 * | 1/2007 | Berteig et al. ............... 345/426 |

* cited by examiner

Primary Examiner—Thai Phan
(74) Attorney, Agent, or Firm—Lee & Hayes, PLLC

(57) ABSTRACT

Apparatus and methods of creating sketch-based eggcrate substructures for manufacturing composite parts are disclosed. In one embodiment, a method of creating a design includes providing an input model from a plurality of inputs, including providing a layout geometry, and providing a specification data structure. A resolution model of the input model is created, including interpolating the layout geometry, and interpolating the specification data structure. The method further includes finalizing a layout using the resolution model, and providing one or more solid components into the finalized resolution model to create the design. Embodiments of the invention enable rapid configuration of designs either interactively, non-interactively, or through combinations of both, and may reduce the time, labor, and expense associated with the development of such designs.

20 Claims, 44 Drawing Sheets

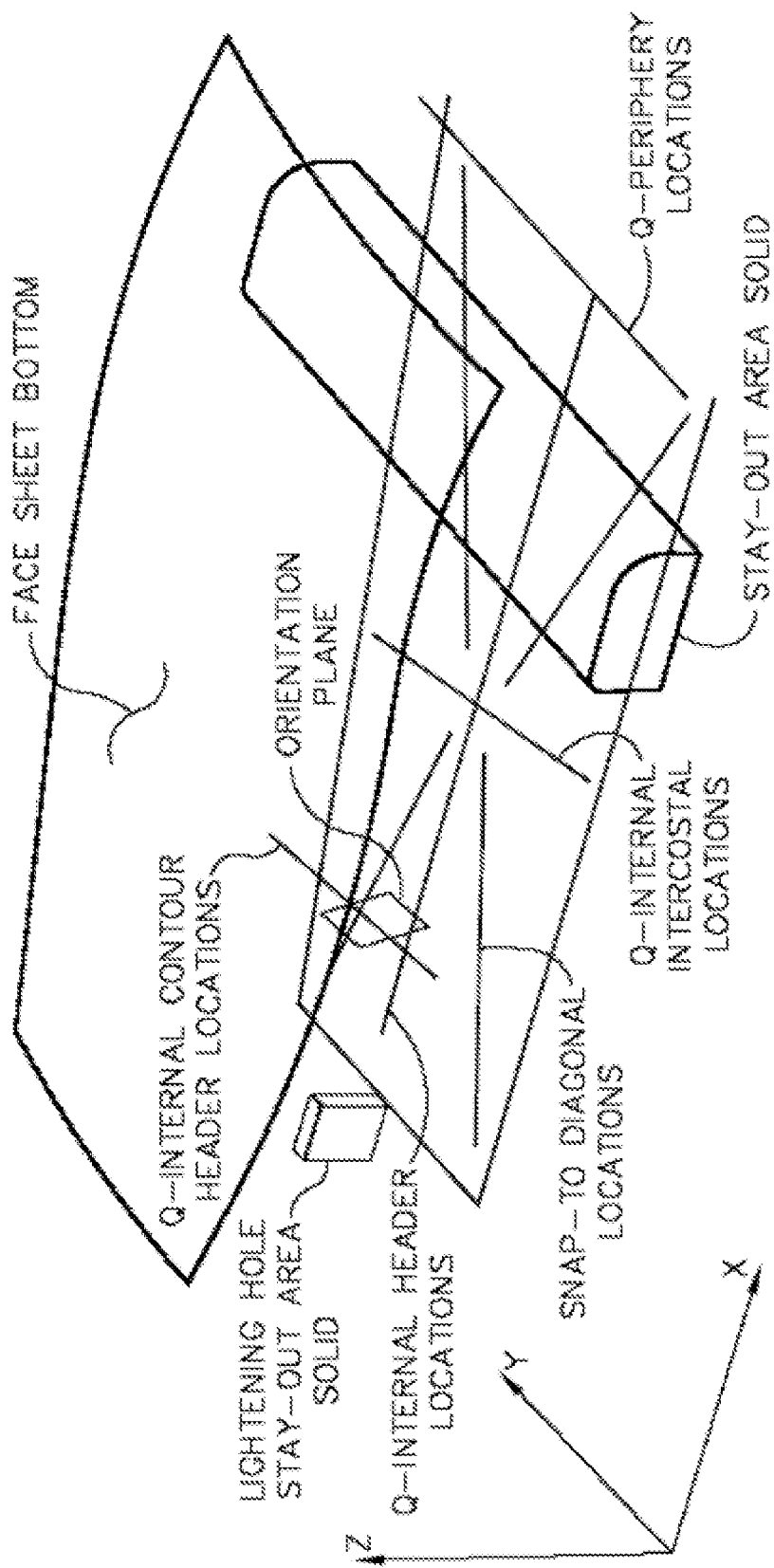

Fig. 16B

2D Drew
(Input Spec Sheets)

APPARATUS AND METHODS FOR CREATING SKETCH-BASED EGGCRATE SUBSTRUCTURES FOR COMPOSITE PARTS

CROSS REFERENCE TO RELATED APPLICATIONS

This patent application is a continuation-in-part of, commonly-owned U.S. patent application Ser. No. 10/774,220 entitled "Apparatus and Method for Creating Sketch-Based Eggcrate Substructures for Composite Parts" filed on Feb. 6, 2004, (now U.S. Pat. No. 7,076,323) which application is incorporated herein by reference.

FIELD OF THE INVENTION

The present invention relates to apparatus and methods for creating sketch-based eggcrate substructures for manufacturing composite parts using an automated tool design program, including tools that enable rapid configuration and modification of designs of such sketch-based eggcrate substructures, either interactively, non-interactively, or through combinations of both interactive and non-interactive actions.

BACKGROUND OF THE INVENTION

In conventional tool design systems, tool design engineers spend a great deal of time generating CATIA (by Dassault Systemes) detail geometry (i.e., creating lines, arcs, points, etc.) in designing a LM (Lay-up Mandrel) to produce a Computer-Aided Design (CAD) model of their concept. Once the CAD model is created, changing the basic design requires recreating many of the detail CAD elements, generating a need for a KBE (Knowledge-based Engineering) application allowing engineers to iterate designs without regenerating detailed geometry.

Conventional LM KBE applications are restricted to four-sided rectangular tool designs and simple contours. For example, existing applications only allow internal substructure headers at right angles to each other and are usually site specific. Accordingly, a more simplified input design creation process, which is more flexible, is needed. The present invention overcomes those limitations and simplified the input's creation process, adding a great deal of design flexibility.

SUMMARY OF THE INVENTION

The present invention relates to apparatus and methods for creating sketch-based eggcrate substructures for manufacturing composite parts using an automated tool design program. Embodiments of the present invention may advantageously provide tools that enable rapid configuration and modification of designs of such sketch-based eggcrate substructures, either interactively, non-interactively, or through combinations of both interactive and non-interactive actions, thereby greatly reducing the time, labor, and expense associated with the development of such designs.

Specifically, in one embodiment, a method of creating a design of a sketch-based eggcrate substructure for manufacturing composite parts includes providing an input model from a plurality of inputs, including providing a layout geometry, and providing a specification data structure. A resolution model of the input model is created, including interpolating the layout geometry, and interpolating the specification data structure. The method further includes finalizing a layout using the resolution model, and providing one or more solid components into the finalized resolution model to create the design.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

Embodiments of the present invention are described in detail below with reference to the following drawings.

Figures 6, 7:
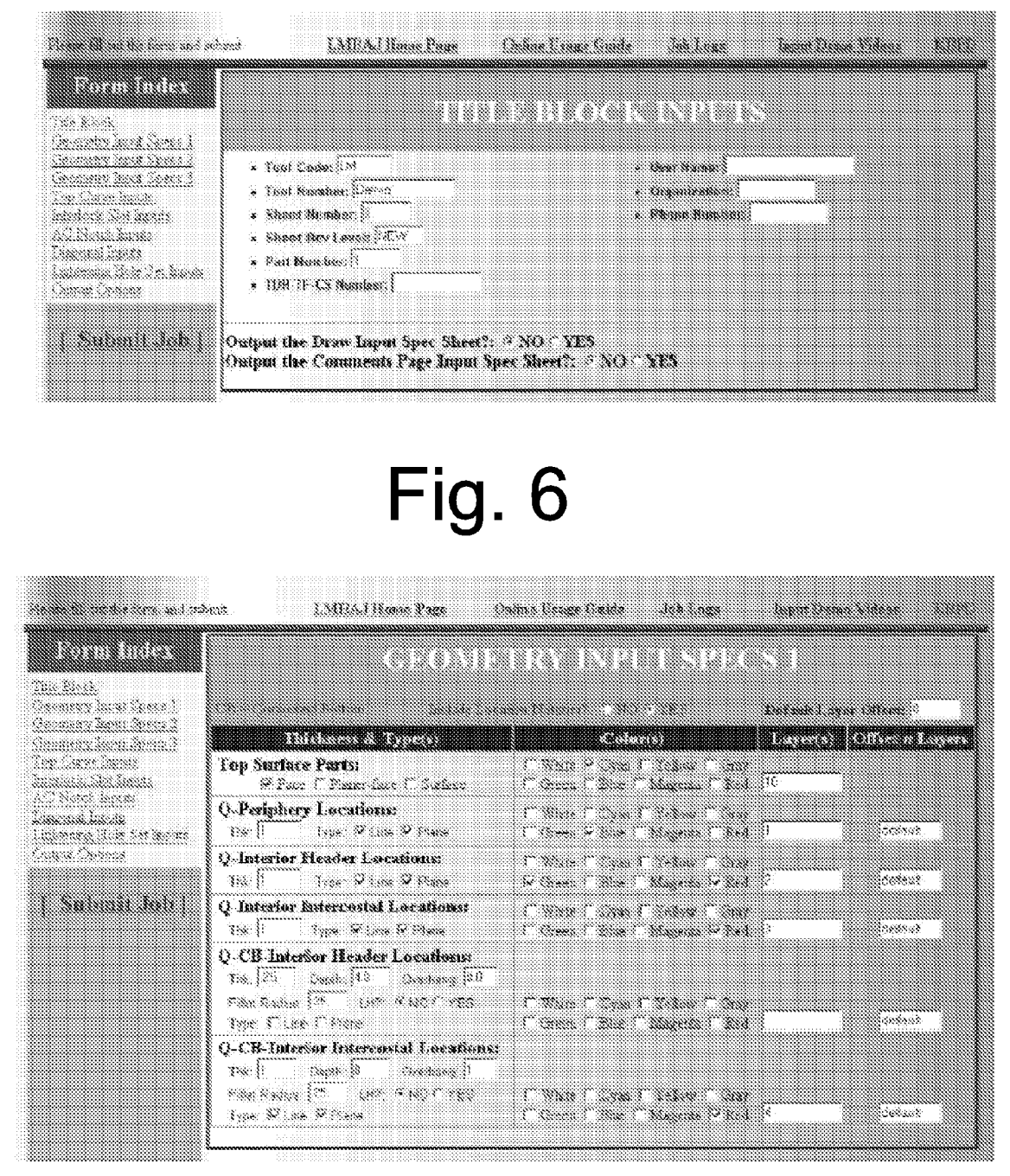

FIG. 6 is a screen shot of a Form Index and Title Block Inputs form of the computer software program for creating a sketch-based eggcrate substructure for manufacturing composite parts according to one embodiment consistent with the present invention;

FIG. 7 is a screen shot of the Geometry Input Specs 1 of the computer software program for creating a sketch-based eggcrate substructure for manufacturing composite parts according to one embodiment consistent with the present invention;

Figures 8, 9:
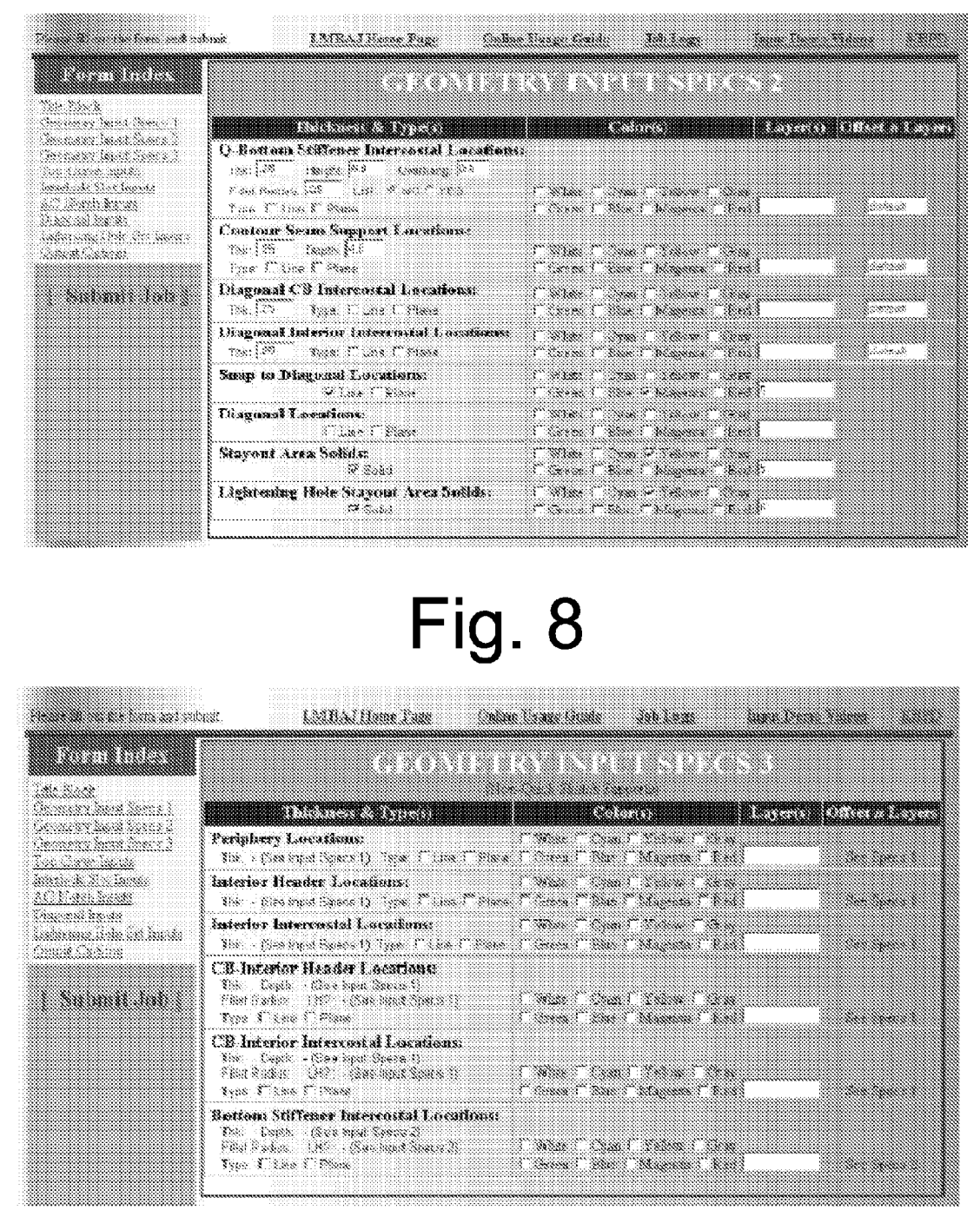

FIG. 8 is a screen shot of the Geometry Input Specs 3 of the computer software program for creating a sketch-based eggcrate substructure for manufacturing composite parts according to one embodiment consistent with the present invention;

FIG. 9 is a screen shot of the Geometry Input Specs 3 of the computer software program for creating a sketch-based eggcrate substructure for manufacturing composite parts according to one embodiment consistent with the present invention;

FIG. 15 is a perspective of an exemplary input model according to one embodiment consistent with the present invention;

Corresponding reference characters indicate corresponding parts throughout the several views of the drawings.

DETAILED DESCRIPTION

Figure 1:
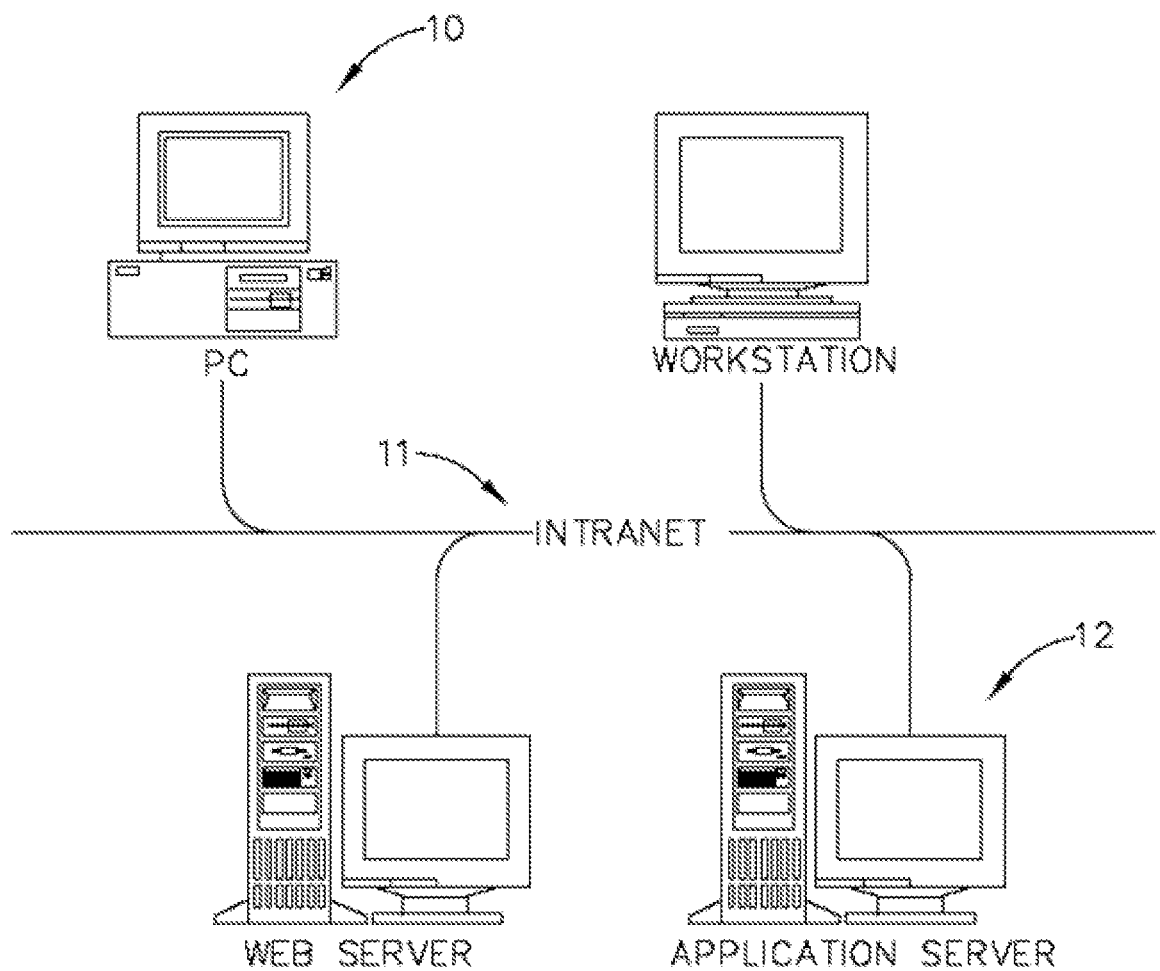
FIG. 1 is a schematic of a system architecture used to perform the methods and system consistent with the present invention.

The present invention relates to apparatus and methods for creating sketch-based eggcrate substructures for manufacturing composite parts using an automated tool design program. Many specific details of certain embodiments of the invention are set forth in the following description and in FIGS. 1 through 32 to provide a thorough understanding of such embodiments. One skilled in the art, however, will understand that the present invention may have additional embodiments, or that the present invention may be practiced without several of the details described in the following description.

In one embodiment consistent with the present invention, a method (and computer program product) is known as a Knowledge Based Product Definition (KBPD) tooling application used for creating eggcrate substructures from a 3D CAD sketch for many tool types (LM's, Master Models, Part Models, holding fixtures), and includes a Graphical Interactive Interface (GII) function with a menu structure. In a further embodiment, the present invention relates to an LMBAJ (KBE) application created to a wide variety of eggcrate substructures for LM type tools. The application advantageously captures the design rules for the various features of an LM eggcrate substructure.

The application geometric inputs may be a CAD file from, for example, various CAD systems such as CATIA, UG, and IGES, or can be obtained from the web-based or interactive application. In particular, the inputs from the CAD file are read in to the application using the ICAD Input Interface Toolkit. ICAD is software for developing and operating knowledge based generative design systems. Applications are developed in ICAD's native programming language IDL (ICAD Design Language), which is an extension of LISP—the primary language of artificial intelligence. ICAD's extensions to LISP provide tools for the definition, manipulation, and analysis of geometry and "rules". Complex surface and solid modeling capabilities are incorporated into ICAD's object oriented syntax.

ICAD applications are typically designed to automate a specific design task. A combination of CATIA geometry, numeric data, and user-supplied parameters are used as input. The ICAD developer generates rules that specify how the data is to be manipulated. These rules process the input data in the manner specified, and produce an output, which is typically a geometric model for export to CATIA.

In some embodiments, the input CAD file contains surface/contour geometry and an active axis defining the tool orientation, which are required to produce the output. The input CAD file includes a layout sketch of the bottom centerlines of each support or diagonal required in the eggcrate substructure design. "Stayout area solids" may also be input to represent other non-eggcrate substructure, such as forklift tubes and lift rings, that may become part of the overall tool design and affect how supports are created. The sketch allows the designer to control how the tool is engineered for size, stress, and weight and other factors. By keeping the input CAD geometry simple, the designer can concentrate on engineering factors and avoid the tedious work of creating all the detailed CAD geometry.

Along with the input sketch the designer selects a set of variables to toggle and control the shape and size of features. The designer controls how the output will be formatted. The design engineer simply sketches a line representing the support location that represents the approximate length at the desired height and, if desired, adds a plane to control the support orientation. No other geometry creation is needed.

Once the model is created, and the user is ready to see the model, the user can obtain the input model by launching the program, which can be also launched as a batch job via a web page. If the model is acceptable, the output can be used for tool design. If not, changes can be made to the model and the program re-launched.

In a system architecture consistent with the present invention, the user utilizes a data processing system such as a personal computer (PC) 10 (see FIG. 1), and may use an internet 11 or intranet connection in order to launch the program from a server 12. Display means are used to provide the user with a choice of inputs to prepare the model. The program runs in memory on the server or in a distributed system, which allows end-users and system designers/analysts to interact with the tool to rapidly design, modify, and/or test and validate the embedded application software.

For example, in a client-server arrangement, a client computer system and server computer system would each be connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network. The present invention may also be implemented in a distributed system environment.

Further, although aspects of one implementation are depicted as being stored in memory, one of ordinary skill in the art would appreciate that all or part of the systems and method consistent with the present invention may be stored on or read from other computer-readable media, such as secondary storage devices, like hard disks, floppy disks, and CD-ROM; a carrier wave received from a network such as the Internet; or other forms of ROM or RAM. Further, one of ordinary skill in the art would appreciate that generic embedded technology architecture suitable for use with methods, systems, and articles of manufacture consistent with the present invention may contain additional or different components.

Figure 2:
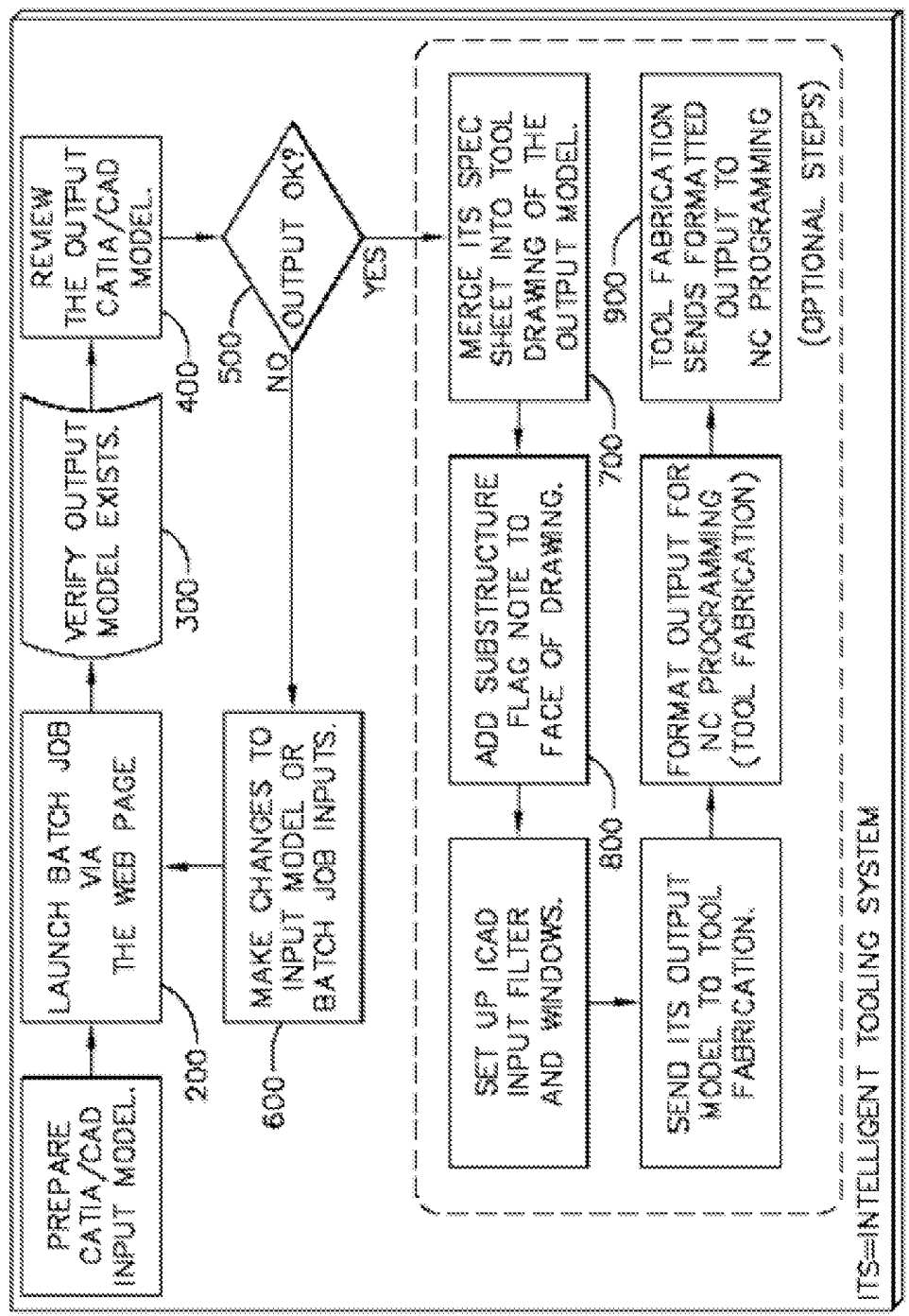
FIG. 2 is a flow chart of an overall process flow for a tier I flow of an application of creating a sketch-based eggcrate substructure for manufacturing composite parts according to one embodiment consistent with the present invention.
Figure 3:
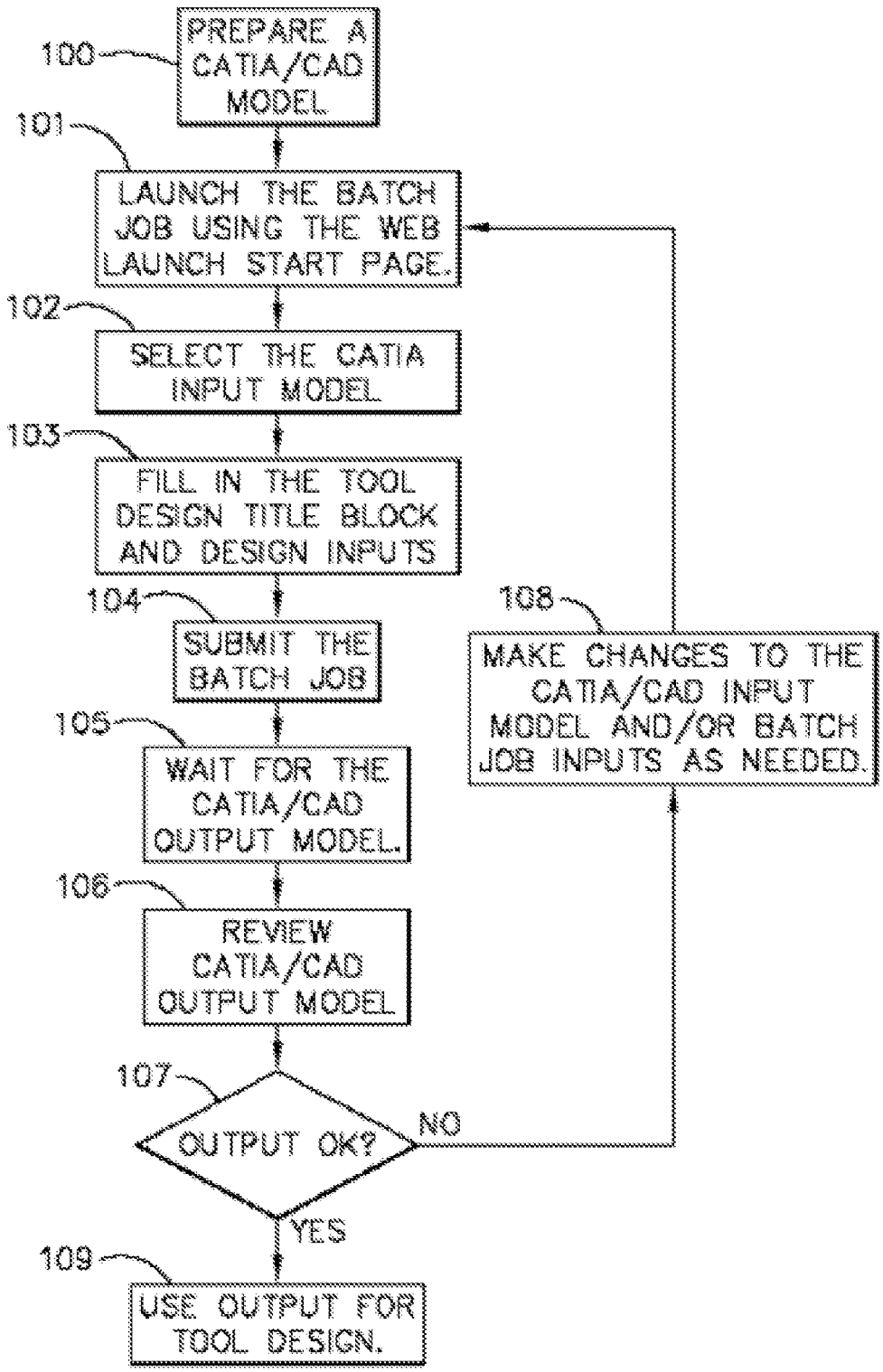
FIG. 3 is a flow chart of steps involved in launching and running an application as a batch job from a web browser according to one embodiment consistent with the methods and system of the present invention.
Figure 4:
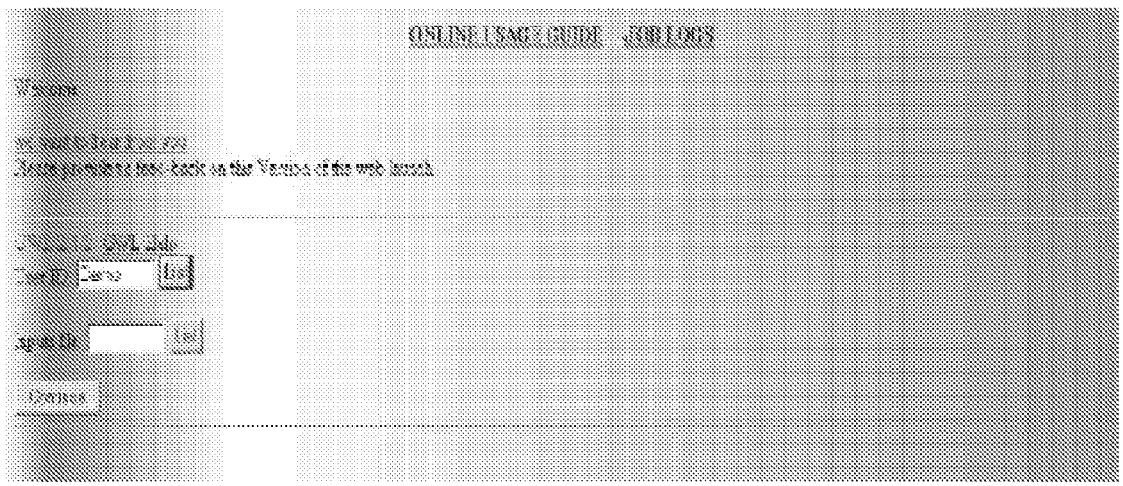
FIG. 4 is a screen shot of a Web Launch Start Page for a computer software program for creating a sketch-based eggcrate substructure for manufacturing composite parts according to one embodiment consistent with the present invention.
Figure 5:
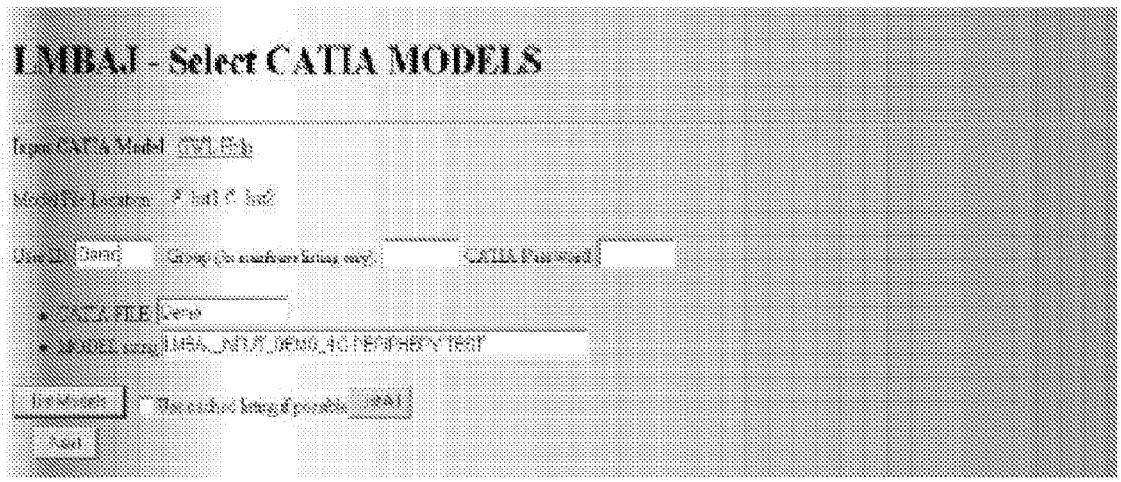
FIG. 5 depicts a screen shot of a Web Launch Page for selecting a CATIA input model of the computer software program for creating a sketch-based eggcrate substructure for manufacturing composite parts according to one embodiment consistent with the present invention.
Figure 10A:
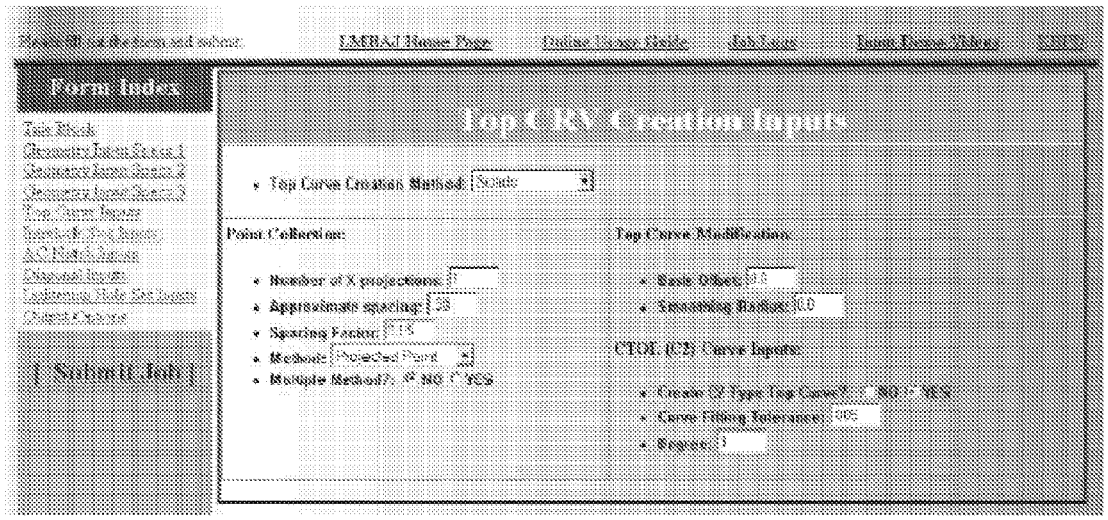
FIG. 10A (Top CRV Creation Inputs), FIG. 10B (Interlock Slot Inputs), FIG. 10C (Air Circulation Notch Inputs), FIG. 10D (Diagonal Inputs), FIG. 10E (Lightening Hole Inputs), and FIG. 10F (Output Options) are screen shots of various input specs of the computer software program for creating a sketch-based eggcrate substructure for manufacturing composite parts according to one embodiment consistent with the present invention.
Figure 10B:
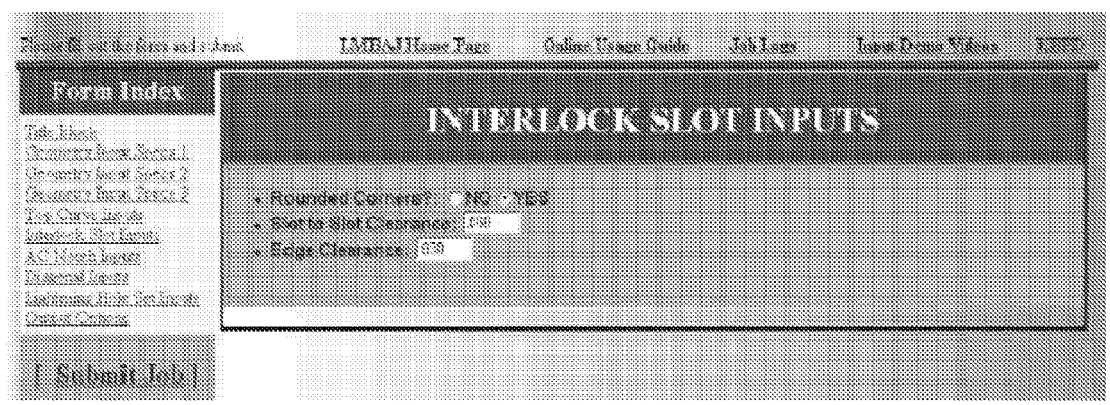

FIG. 2 shows an overall process flow for an application of creating a sketch-based eggcrate substructure for manufacturing composite parts using a batch mode of operation in accordance with one embodiment of the invention. As stated previously, the CAD input file/model may be created or prepared prior to accessing the program interactively or via the web launch page.

With respect to the first process step S100 (see FIG. 3) of preparing a CATIA model, the user first accesses the CAD program to define the input sketch. To launch the eggcrate tool, in step S101, the program presents the user with, for example, a Title Block screen (see FIG. 4) on the user's display means or monitor, requesting administrative information, which the user may complete.

The user is provided in step S102 with a Form Index in menu form (see FIG. 6), for example, which the program displays on the user's monitor, and which provides various inputs from which the user can choose. The user then chooses from among a variety of input sets, for example, such as Title Block, Geometry Input Specs, Top Curve Inputs, Interlock Slots, AC (Air Circulation) Notch Inputs, Diagonal Inputs, Lightening Hole Set Inputs, and Output Options.

Once the user chooses one of the input sets, the program will provide the user with a input form related to each chosen input set, in step S103, such that the user may select from the various input sets to define the eggcrate tool (although, in one embodiment consistent with the present invention, some items will be automatically preset at default values and not requested from the user).

In the present invention, the following inputs are provided in menu form to the user and the user selects the desired inputs to create the output CAD model for the desired CAD system (i.e., CATIA, UG, and even in universal standard CAD transfer file format like IGES).

Geometry Input Specs

Geometry input specs are a way of describing to the application, which input CAD model elements to use as input. They group together the geometric elements in the 3D CAD sketch that represent a set of supports of a given type, a set of diagonals of a given type, both Stay-Out area Solids and Lightening Hole Stay-out Area Solids, and a set of surfaces and/or faces representing the bottom of the tool face sheet.

Preferably, the CAD input model contains only input geometry (the 3D sketch) used by the application to generate the eggcrate supports. Any other miscellaneous geometry in the file may undesirably slow down the translation time and might cause errors resulting in no output. By using simple LISP forms as input specs the application can obtain the proper geometry for each input set. This reduces (or removes) requirements for setting up the input CAD model allowing the designer more flexibility.

When the user submits the batch job the web launch page creates the geometry input specs using the input form fields. Then the web page will submit the batch job with the formatted inputs to the server. Running the application interactively the user can directly change each input spec as desired.

Each input spec form may have one or more keywords followed by a keyword entry. The keyword entry may be another keyword, list of keywords or a string (see examples below). In operation, the user accesses the menu for each keyword or keyword entry, and selects the keyword or string desired (see FIGS. 6-9). The program will use these inputs to create eggcrate geometry to place in the output CAD file.

Keyword Entry

:TYPE—a keyword or list of keywords, specifying the type(s) of CAD entities to be selected. Some valid entries include: :point, :line, :plane, :arc, :circle, :parametric-surface, :face, :planar-face, :parametric-spline. Examples include: :type :line, :type (:line :plane).

:COLOR—a keyword, or list of keywords, specifying the type(s) of CAD entities to be selected. Some valid entries include: :red, :yellow, :green, :blue, :cyan, :magenta, :black, :white. Examples include: :color :blue, :color (:red :blue).

:LAYER—a string specifying the layer or layers. It uses the same format as in CATIA (i.e., a single number; a comma separated list; a range, specified by two numbers separated by a hyphen "20-30"; or any combination of these formats. Some valid entries include: a string. Examples include: :layer 20, :layer 20, 30, 40, :layer 0-5, 15, 20-30, 221.

:FONT—a keyword, or list of keywords, specifying the line font(s) of CAD entities to be selected. Some valid entries include: :solid, :dashed. Examples include: :font :solid, :font (:solid :dashed).

:IDENTIFIER—a string specifying the EXACT identifier that the entity must have to be selected. Note that in a CATIA input file, each entity has a unique identifier. Therefore, this filter will only return a single entity, unless the :logical-or? Keyword (see below) is non-nil, and other filters are specified. Note also, that if :logical-or? is nil, AND other filters are specified, then the entity with the specified identifier must also meet the other filter criteria in order to be selected. This filter is not case sensitive, since the CATIA data is all upper case. Some valid entries include: a string. Examples include: :identifier "centerline", "identifier "ORIGIN PT".

:ID-SUBSTRING—a string specifying a substring to be searched for in the entities :identifier string. All entities whose :identifier string contains the specified string will be selected. Some valid entries include: a string. Examples include: "id-substring "112A", :id-substring "LOWER".

:LOGICAL-OR?—defaults to nil. If non-nil, causes ALL of the entities selected by all of the specified filter keywords to be "or"-ed together rather than being "and"-ed together. In other words, all of the entities meeting any of the specified filter criteria will be returned. Some valid entries include: R or NIL. Examples include: :LOGICAL-OR? T, :LOGICAL-OR? NIL.

Input Model Descriptions

The following are descriptions which the user can select from a menu, which can be used to define the input model (see FIG. 7):

Default Layer Offset: (integer). The default number of layers to move from the support's solid layer to the support's wireframe layer. This is applied to all supports. Default value: 0.

Offset Layer: (integer). The number of layers to move the support's wireframe geometry from its solid's layer. This input is supplied for each support type and will override the default layer offset input. Default value: 0.

Geometry Inputs Specs 1

Top Surface Parts: (spec). A spec describing which elements in the input model to use as inputs to define the bottom contour of the tool face sheet. Note: CATIA Skin and Volume entities are decomposed into their component Face entities before being transferred to the ICAD. Default value: none.

Q-Periphery Locations: (spec). A spec describing which elements in the input model to use as inputs to define where periphery supports are desired and how they are orientated. Lines and optionally planes, for an orientation other than vertical, may be used. Lines are matched up with their corresponding planes by finding the first plane collected by the spec to pass through a given line. These lines represent the location of the inside edge of each Q-Periphery support and should from a series of line segments. The series does not have to be closed. These lines only represent the approximate length of the final support. The final location and length are solved using the application's "Q-Periphery Generation" algorithm and are used to create BLOCs (Bottom Location objects) representing the final support's thickness, length, location and orientation. Default value: none.

Q-Internal Header Locations: (spec). A spec describing which elements in the input model to use as inputs to define where internal header supports are desired and how they are orientated. Lines and optionally planes, for an orientation other than vertical, may be used. Lines are matched up with their corresponding planes by finding the first plane collected by the spec to pass through a given line. These lines only represent the approximate length of the final support's bottom edge centerline and are used to create BLOCs representing the final support's thickness, length, location and orientation. Default value: none.

Q-Internal Intercostal Locations: (spec). A spec describing which elements in the input model to use as inputs to define where internal intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support's bottom edge centerline and are used to create BLOCs representing the final support's thickness, length, location and orientation. Default value: none.

Q-CB (Contoured Bottom) Internal Header Locations: (spec). A spec describing which elements in the input model to use as inputs to define where CB internal header supports are desired and how they are orientated. Lines and optionally planes, for an orientation other than vertical, may be used. Lines are matched up with their corresponding planes by finding the first plane collected by the spec to pass through a given line. These lines only represent the approximate final support's bottom edge centerline and are used to create BLOCs representing the final support's thickness, length, location and orientation. Default value: none.

Q-CB Internal Intercostal Locations: (spec). A spec describing which elements in the input model to use as inputs to define where CB internal intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support's bottom edge centerline and are used to create BLOCs representing the final support's thickness, length, location and orientation. Default value: none.

Geometry Inputs Specs 2

Q-Bottom Stiffener Intercostal Locations: (spec). A spec describing which elements in the input model to use as inputs to define where bottom stiffener intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support's bottom edge centerline and are used to create BLOCs representing the final support's thickness, length, location and orientation. Other inputs include thickness, height, periphery overhang and corner fillet radius. Default value: none.

Contour Seam Support Locations: (spec). A spec describing which elements in the input model to use as inputs to define where contour seam supports are desired and how they are orientated. Lines and optionally planes, for an orientation other than vertical, may be used. Lines are matched up with their corresponding planes by finding the first plane collected by the spec to pass through a given line. These lines represent the exact length and location of the final support's bottom edge centerline and are used to create BLOCs representing the final support's thickness, length, location and orientation.

Diagonal CB Intercostal Locations: (spec). A spec describing which elements in the input model to use as inputs to define where diagonal CB intercostal supports are desired. Lines may only be used. These lines only represent the approximate location and length of the final support's bottom edge centerline. The final location and length are solved using the application's "snap-to diagonal" algorithm. These solved lines are used to create BLOCs representing the final support's thickness, length, location and orientation. Default value: none.

Diagonal Interior Intercostal Locations: (spec). A spec describing which elements in the input model to use as inputs to define where diagonal interior intercostal supports are desired. Lines may only be used. These lines only represent the approximate location and length of the final support's bottom edge centerline. The final location and length are solved using the application's "snap-to diagonal" algorithm. These solved lines are used to create BLOCs representing the final support's thickness, length, location and orientation. Default value: none.

Snap to Diagonal Locations: (spec). A spec describing which elements in the input model to use as inputs to define where snap-to diagonals are desired. The bottom centerlines do not have to be in an exact location. Snap-to diagonals are "smart" and each end will snap to into the nearest corner or the nearest face. Valid types: line. Default value: none.

Diagonal Locations: (spec). A spec describing which elements in the input model to use as inputs to define where diagonals are desired. These are simple diagonals. No snapping will take place. A simple box solid will be created on top of the bottom centerline. Valid types: :line. Default value: none.

Stayout Area Solids: (spec) A spec describing which elements in the input model to use as stayout area solids. These solids affect all of the supports that they are near to. For each support that is within the given stayout area clearance a subtraction will be made to make a clearance cutout in the support. These clearance cutouts are then passed on as Lightening hole stayout area solids. Valid types: solid (Must be an extruded solid such as a box, cylinder, or planar profile extruded. Holes will be ignored) Default Value: none Lightening Hole Stayout Area Solids: (spec). A spec describing which elements in the input model to use as lightening hole stayout area solids. These solids affect all of the supports that they are near to. For each support that is within the given stayout area clearance the solid will be passed to that supports lightening holes as a stayout area. A subtraction will be made to make a clearance cutout in the lightening hole, in effect adding back material to the support. Valid types: solid. (Must be an extruded solid such as a box, cylinder, or planar profile extruded. Holes will be ignored.) Default value: none.

Geometry Inputs Specs 3

Periphery Locations: (spec). A spec describing which elements in the input model to use as inputs to define where periphery supports are desired and how they are orientated. Lines and optionally planes, for an orientation other than vertical, may be used. Lines are matched up with their corresponding planes by finding the first plane collected by the spec to pass through a given line. These lines only represent the exact length and location of the final supports' bottom edge centerline and are used to create BLOCs representing the final support's thickness, length, location and orientation. Default value: none.

Internal Header Locations: (spec). A spec describing which elements in the input model to use as inputs to define where internal header supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support's bottom edge centerline and are used to create BLOCs representing the final support's thickness, length, location and orientation. Default value: none.

Internal Intercostal Locations: (spec). A spec describing which elements in the input model to use as inputs to define where internal intercostal supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support's bottom edge centerline and are used to create BLOCs representing the final support's thickness, length, location and orientation. Default value: none.

CB-Internal Header Locations: (spec). A spec describing which elements in the input model to use as inputs to define where CB internal header supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support's bottom edge centerline and are used to create BLOCs representing the final support's thickness, length, location and orientation. Default value: none.

CB-Internal Intercostal Locations: (spec). A spec describing which elements in the input model to use as inputs to define where CB internal intercostal supports are desired and how they are orientated. Lines and optionally planes, for an orientation other than vertical, may be used. Lines are matched up with their corresponding planes by finding the first plane collected by the spec to pass through a given line. These lines represent the exact length and location of the final support's bottom edge centerline and are used to create BLOCs representing the final support's thickness, length, location and orientation. Default value: none.

Bottom Stiffener Intercostal Locations: (spec). A spec describing which elements in the input model to use as inputs to define where bottom stiffener intercostal supports are desired and how they are orientated. Lines and optionally planes, for an orientation other than vertical, may be used. Lines are matched up with their corresponding planes by finding the first plane collected by the spec to pass through a given line. These lines represent the exact length and location of the final support's bottom edge centerline and are used to create BLOCs representing the final support's thickness, length, location and orientation. Default value: none.

Top Curve Inputs

The Top Curve Inputs form contains inputs that control the creation of the top edge of a support.

Top Curve Creation Method: (keyword). This is the method to use to create the top curve. Default value: Projected-points. Available selections: Projected-points, Solids, Intersect Plane, Project Curve Number of X Projections: (integer). The quantity of top curve points taken across the width of a support at each sampling location. Default value: 2

Approximate Spacing: (floating-point number). The top curve point sampling distance along a support's length at which point(s) will be projected onto the face sheet. A smaller spacing will slow down the computation of the support's top curve. Also too small or large a value could cause undesired results. Adjust this value based on the overall face sheet contour of the tool. Default value: 0.2

Spacing Factor: (floating-point number). This value affects when more top curve sampling points are needed between each sampled section. If the 3D distance between two consecutive points is greater than the calculated spacing multiplied by the factor then more point sampling will occur. Large gaps that can not be filled are assumed to be straight line sections. Default value: 2.15.

Method: (keyword). This is the top curve definition method used when sampling top curve points. Default value: Projected-point. Available selections: Projected-point, Line-intersection.

Method Multiple?: (NIL or T). This input changes the top curve definition method to either return multiple points or just the closest point. Default value: NO, Available selections: NO/YES.

Basis Offset: (floating-point). Specifies the distance to offset the top curve. Default value: 0.0.

Smoothing Radius: (floating-point). Specifies the radius to use when smoothing the top curve. Default value: 0.0.

Create C2 type Top Curve?: (NIL or T). Specifies whether to create the top curve as a C2 curve. Default value: NO, Available selections: NO/YES.

Curve Fitting Tolerance: (floating-point). Specifies the curve fitting tolerance to use when creating a C2 type top curve. Default value: 0.005.

Degree: (integer). Specifies the degree of the C2 top curve. Default value: 3

Interlock Slot Inputs

The interlock slot inputs group contains inputs that control slots created in a support when it crosses another support.

Rounded corners?: (NIL or T). Controls whether the bottom corners of a slot will be rounded. Default Value: YES, Available Selections: NO/YES Slot to Slot Clearance: (floating-point number). The clearance distance between the bottoms of two interlocking slots. Default Value: 0.060

Edge Clearance: (floating-point number). The clearance distance between a slots edge and the support passing through the slot. Angles other than 90 degrees are taken into account when interlock slots are being generated. Default Value: 0.030

AC Notch Inputs

Include Air Circulation Notches: (NIL or T). If the substructure requires air circulation notches, the user may select this option. Default value: Yes; Available Selections: No/Yes.

Air Circulation Notch Type: (keyword). Controls the type of air circulation notch. Default value: Filleted. Available selections: filleted, circular, fitted, single-castle, multi-castle.

Notches at Butt Joints? (NIL or T). Controls whether air circulation notches are placed at butt joints. Default value: YES. Available selections: NO/YES>

Notches at Interlock Slot Joints? (NIL or T). Controls whether air circulation notches are placed at interlock slot joints. Default value: YES. Available selections: YES/NO.

Minimum Separation: (floating-point number). The minimum distance between notches along the supports top contour (see FIG. 7). Used to determine notch quantity. Default value: 2.0

Minimum Notch-to-Notch: (floating-point). The minimum allowable distance between two adjacent notches. Default value: 1.70.

End Separation: (floating-point). The distance between the first or last notch in a set and the start or end of the notch set. A notch set is created for each section along the top of a support that is broken up by other supports crossing or butting up to the support.

Notch Depth: (floating-point). Specifies the distance to the bottom of the notch offset from the top curve. Default value: 2.00.

Max Notch Width: (floating-point). The maximum allowable width of and AC notch. For the circular-notch type this would be equal to the diameter of the notch. Default value: 4.500.

Min Notch Width: (floating-point). The minimum allowable width of an AC notch. For the circular-notch type this would be equal to the diameter of the notch. Default value: 2.500.

Notch Fillet Radius: (floating-point). The radius used for all fillets within any AC notch. This includes fillets other than at the two bottom corners added to a notch that required trimming based on the min-notch-to-notch-separation distance. Default value: 0.250

Added Castle Bottom Width: (floating-point). The additional distance to add to the bottom width of a castle after widening to the minimum notch width when its basis bottom width is less then the minimum notch width. Default value: 0.10.

AC Multi Castle Max Qty: (integer|NIL). The maximum number of castles to create for each castle location span. Default value: NIL.

AC Multi Castle End Gap Factor: (floating-point). The ratio of the end notch width to the calculated notch with for a given castle location span along the top curve. Default value: 0.50.

Default Fit Factor: (floating-point). This input applies only to notches of type fitted-notch. Its value determines how the front and rear of the notch will be defined. These edges are defined by connecting the bottom and point edge point of intersection with the support top contour. The factor is used to position points used to build the edge curved. Default value: 0.60.

Bottom Fit Factor: (floating-point). This input applies only to notches of a type fitted-notch. Its value determines how the front and rear of the notch will be defined. These edges are defined by connecting the bottom and point edge point of intersection with the support top contour. The factor is used to size the bottom used to build the front and rear curves of the notch. Default value: 0.60.

Smooth Out AC Set Spacing Curve? (NIL or T). Controls whether the top curve used to locate and define the air circulation notches is smoothed. Default value: NO. Available selections: NO/YES.

Spacing Curve Smoothing Radius: (floating-point). The radius to use when smoothing the top curve used to locate and define air circulation notches. Default value: 0.50.

Check Front and Rear for Thin Area? (NIL or T). Controls whether to test the area in-front or behind the notch are too thin to support the notch. Default value: YES. Available selections: NO/YES.

Thin Test Offset Distance: (floating-point). The distance from the front and rear notch intersection points to offset along the top curve to check for thin areas. Default value: 0.25.

Thin Test Min Angle: (floating-point). The minimum angle allowed for thin areas. If the calculated angle is less than the minimum allowed thin test angle the notch is considered to be invalid and does not become a feature of the support. Default value: 30.0.

Check Area Test M4? (NIL or T). Controls whether a comparison between the notch basis area and the notch area after one end is trimmed is done to check for an invalid notch. Default value: YES. Available selections: NO/YES.

Area Test M4 Factor: (floating-point). The ration of the notch basis trimmed on one end to the notch basis area. If the calculated ratio is smaller than the input value the notch is considered to be invalid and does not become a feature of the support. Default value: 30.0

Diagonal Inputs

The diagonal inputs group contains inputs that control diagonal stiffeners created as part of the eggcrate substructure.

Thickness?: (floating-point) Specifies the thickness of a diagonal. Default Value: 0.250

Height: (floating-point number) Specifies the height of a diagonal. Default Value: 4.00

Same Diagonal Length Tolerance: (floating-point number) The clearance distance between a slots edge and the support passing through the slot. Angles other than 90 degrees are taken into account when interlock slot are being generated. Default Value: 0.030

Interlock Slot Rounded Corners?: (NIL or T) Controls whether the bottom corners of a slot will be rounded. Default Value: YES, Available Selections: NO/YES Interlock Slot to Slot Clearance: (floating-point number) The clearance distance between the bottoms of two interlocking slots. Default Value: 0.060

Interlock Slot Edge Clearance: (floating-point number) The clearance distance between a slots edge and the diagonal passing through the slot. Angles other than 90 degrees are taken into account when interlock slots are being generated. Default Value: 0.030

Solving Tolerance: (floating-point number) Specifies the tolerance to use when solving for the position of a Snap-to-Diagonal part. Applies to Snap-to-Diagonals only. Default Value: 0.0005

Use Second Algorithm?: (NIL or T) Controls whether the algorithm to use to solve for the position of a bottom corners of a Snap-to-Diagonal part. Applies to Snap-to-Diagonals only. Default Value: YES, Available Selections: NO/YES Maximum Number of Iterations: (integer) Specifies the maximum number of interations to use to solve the position of a Snap-to-Diagonal part. Applies to Snap-to-Diagonals only. Default Value: 100

Solving Length Clearance: (floating-point number) Specifies the distance to remove from each end the solved length of a Snap-to-Diagonal part. Applies to Snap-to-Diagonals only. Default Value: 0.0

Stayout Area Added Clearance: (floating-point number) Specifies an additional distance to add to the stayout area where a Snap-to-Diagonal part's front and rear edges contact a support. Applies to Snap-to-Diagonals only. Default Value: 0.0

Lightening Hole Set Inputs

The lightening hole inputs group contains inputs that control different aspects of each hole set and each individual hole.

Include Lightening Hole Features: (NIL or T). Controls whether lightening holes are created or not. Default value: NO. Available selections: NO/YES.

Lightening Hole Type: (keyword). Controls the type of lightening hole to be created. Default value: blended rectangle. Available selections: blended rectangle, single truss, double truss.

Stacked Lightening Hole Features: (NIL or T). Controls whether lightening holes are stacked or not based upon the input max hole height. Default value: Yes. Available selections: NO/YES.

Fillet Radius: (floating-point number). The blend radius to use when filleting lightening holes. Default value: 1.0.

Separation: (floating-point number). The distance between two lightening holes along the length of a support in a given lightening hole set. Default value: 2.15.

Stack Separation: (floating-point number). The distance between each lightening hole in a given stack. Default value: 2.0.

End Separation: (floating-point number). The clearance distance between the start or end of a lightening hole set and support feature such as an interlock slot or butt joint.

Base Edge Margin: (floating-point number). The distance between the bottom of the support and the lightening hole set. Default value: 2.0.

Top Edge Margin: (floating-point number). The distance between the top of the support or bottom of any AC Notches and the lightening hole set.

Max Hole Width: (floating-point number). Specifies the maximum width for any lightening hole. Default value: 12.0.

Min Hole Width: (floating-point number). Specifies the minimum width for any lightening hole. Default value: 6.0.

Max. Hole Height: (floating-point number). Specifies the maximum height for any lightening hole. Default value: 12.0.

Min. Hole Height: (floating-point number). Specifies the minimum height for any lightening hole. Default value: 6.0.

Use Unblended Holes: (NIL or T). Controls whether lightening holes are blended/filleted. Default value: NO. Available selections: NO/YES.

Valid Hole Test Factor: (floating-point number). A factor used to determine whether to keep a lightening hole based upon its volume as compared to the volume of a cylinder made using the input fillet radius multiplied by the factor. If the volume of the hole is less than the test cylinder the hole is not used to define the support. Default value: 1.0.

Double Truss: (NIL or T). Controls whether lightening holes are created and then divided by an "X" pattern truss. Default value: NO. Available selections: NO/YES.

Single Truss Pattern: (keyword). Controls the type of single truss pattern to use for a given lightening hole. Default value: Alternate-stack-and-subset. Available Selections: Alternate-stack-and subset; Alternate-subset; Alternate-stack.

Truss Width: (floating-point number). The thickness to make a lightening hole truss. Default value: 1.0.

Stayout Area Offset Distance: (floating-point number). The clearance distance between a lightening hole and a stayout area. Default value: 2.0.

Output Options

The output options group contains inputs that control how the output geometry is formatted.

All Supports CATIA Output Method: (keyword) The method to use when outputting the geometry for each support. This input may not produce the desired result when outputting to a CAD system other than CATIA. Default Value: Inner Domain Solid, Available Selections: Inner Domain Solid, CSG Solid, Wireframe Solid Modeler Mode?: (keyword) The process mode to run ICAD's solid modeler in. Default Value: in-memory, Available Selections: in-memory, Local Include Solved 3D Layout Sketch with Output?: (NIL or T) Controls whether to include with the output a detail containing the geometry of the solved 3D layout sketch. Default Value: NO, Available Selections: NO/YES CATIA v4 Output formatted for CATIA v5?: (NIL or T) Controls whether to format a CATIA v4 output file using details and dittos such that when transferred to CATIA v5 it produces a product structure tree of the eggcrate substructure. Default Value: NO, Available Selections: NO/YES Test for like Support for each Support Type?: (NIL or T) Controls whether to test for "like" supports within a group of supports of the same type. When two or more like supports are found the detail work space for the first like support is used to ditto all of the like supports. The algorithm for this test is not based on a support's final geometric definition. But rather an intermediate creation step. This input is applied only when the input "CATIA v4 Output Formatted for CATIA v5?" is set to T and may not produce the desired result when outputting to a CAD system other than CATIA. Default Value: NO, Available Selections: NO/YES Create a Sub-Assembly for each Support Type?: (NIL or T) Controls whether to create for each type of support used a nested detail workspace containing dittos of all of the supports of that type. This input is applied only when the input "CATIA v4 Output Formatted for CATIA v5?" is set to T and may not produce the desired result when outputting to a CAD system other than CATIA. Default Value: NO, Available Selections: NO/YES Create a Sub-Assembly for Diagonals?: (NIL or T) Controls whether to create a nested detail workspace containing dittos of all diagonals. This input is applied only when the input "CATIA v4 Output Formatted for CATIA v5?" is set to T and may not produce the desired result when outputting to a CAD system other than CATIA. Default Value: YES, Available Selections: NO/YES Support Sketch Location: (keyword) The location plane parallel to a support's zy-plane to place the wireframe geometry on. This input is applied only when the input "CATIA v4 Output Formatted for CATIA v5?" is set to T and may not produce the desired result when outputting to a CAD system other than CATIA. Default Value: Left, Available Selections: Left, Right, and Centerline Diagonal Sketch Location: (keyword) The location plane parallel to a diagonal's zy-plane to place the wireframe geometry on. This input is applied only when the input "CATIA v4 Output Formatted for CATIA v5?" is set to T and may not produce the desired result when outputting to a CAD system other than CATIA. Default Value: Left, Available Selections: Left, Right, and Centerline Output Supports As: (keyword) The method to use when outputting the geometry for each diagonal. This input is applied only when the input "CATIA v4 Output Formatted for CATIA v5?" is set to T and may not produce the desired result when outputting to a CAD system other than CATIA. Default Value: Inner Domain Solid, Available Selections: Inner Domain Solid, CSG Solid, and Wireframe Output Diagonals As: (keyword) The method to use when outputting the geometry for each diagonal. This input is applied only when the input "CATIA v4 Output Formatted for CATIA v5?" is set to T and may not produce the desired result when outputting to a CAD system other than CATIA. Default Value: Inner Domain Solid, Available Selections: Inner Domain Solid, CSG Solid, and Wireframe Submit Job The actions involved in submitting a batch job for creating an eggcrate substructure in accordance with an embodiment of the present invention will now be described.

Q-Periphery Generation

Q (quick) periphery generation is a method for defining the joints between each of the Q-periphery support locations from a 3D sketch of the inside edges of the periphery support locations. From these solved joints, periphery support bottom centerline locations can be created.

Figure 11:
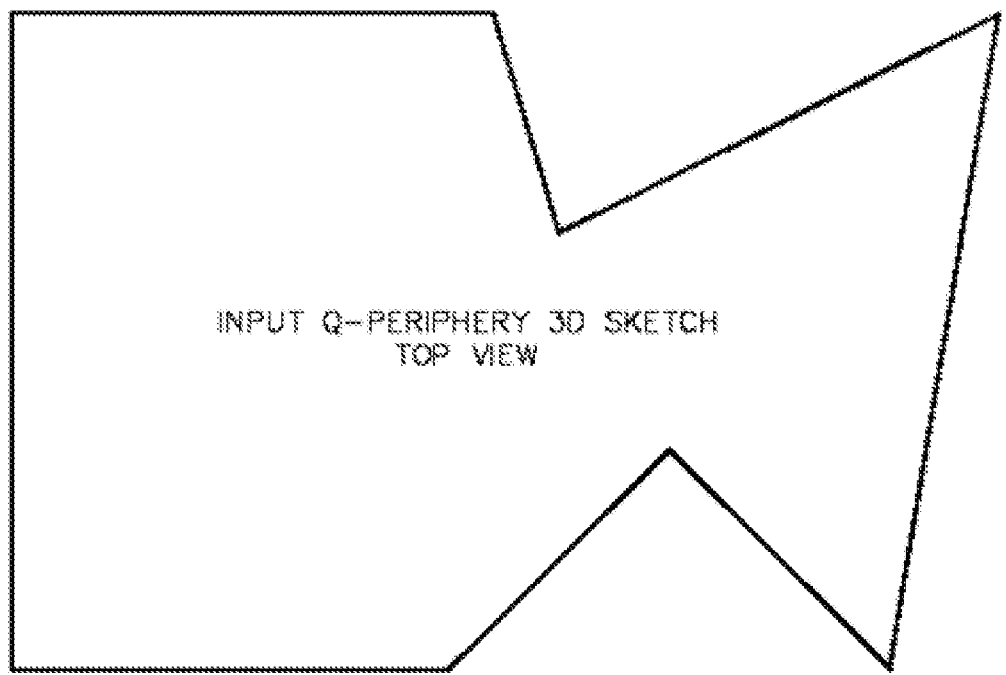
FIG. 11 is a plan of an example Q-Periphery three-dimensional input sketch showing the chained inside line segments according to one embodiment consistent with the present invention.
Figure 12:
FIG. 12 is an elevation of an example of how the Q-periphery three-dimensional input sketch chained inside line segments need not lie on the xy plane according to one embodiment consistent with the present invention.

FIG. 11 shows an elevation view (top view) showing how the Q-periphery chain does not have to lie on the xy plane. In the process rules consistent with the methods and system of the present invention:

the inside edge is never penetrated/crossed when defining the joint between q-periphery elements (unless the percent overlap exceeds 100%).

the inside edge intersection corner point does not move.

the amount of overlap is based on a percentage of the thickness of the non-overlapping part.

Q-periphery supports may move back and forth along their respective centerlines to create the final Q-periphery joint.

all Q-periphery inside edge elements must form a chain when projected onto the tool's xy plane.

the Q-periphery sketch does not have to be closed.

only one Q-periphery sketch chain is used.

Q-periphery supports may be of different thickness.

the Q-Periphery sketch may not cross itself.

Figure 13A:
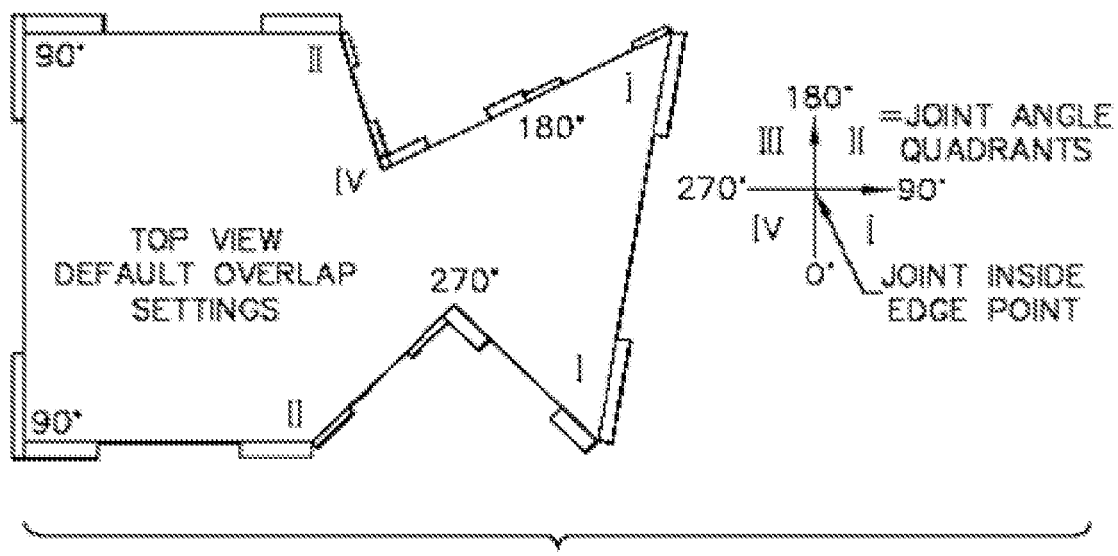
FIG. 13A (top view, default overlap settings) and FIG. 13B (top view, 50% overlap applied) are examples of resulting compound butt joints for different overlap values for a solved Q-Periphery Sketch according to one embodiment consistent with the present invention.
Figure 13B:
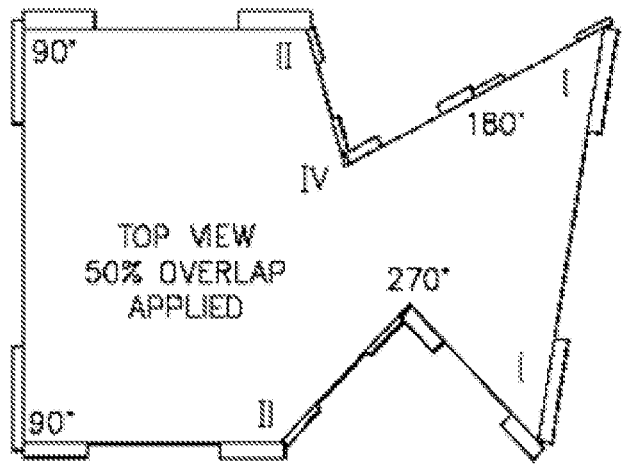
Figure 14:
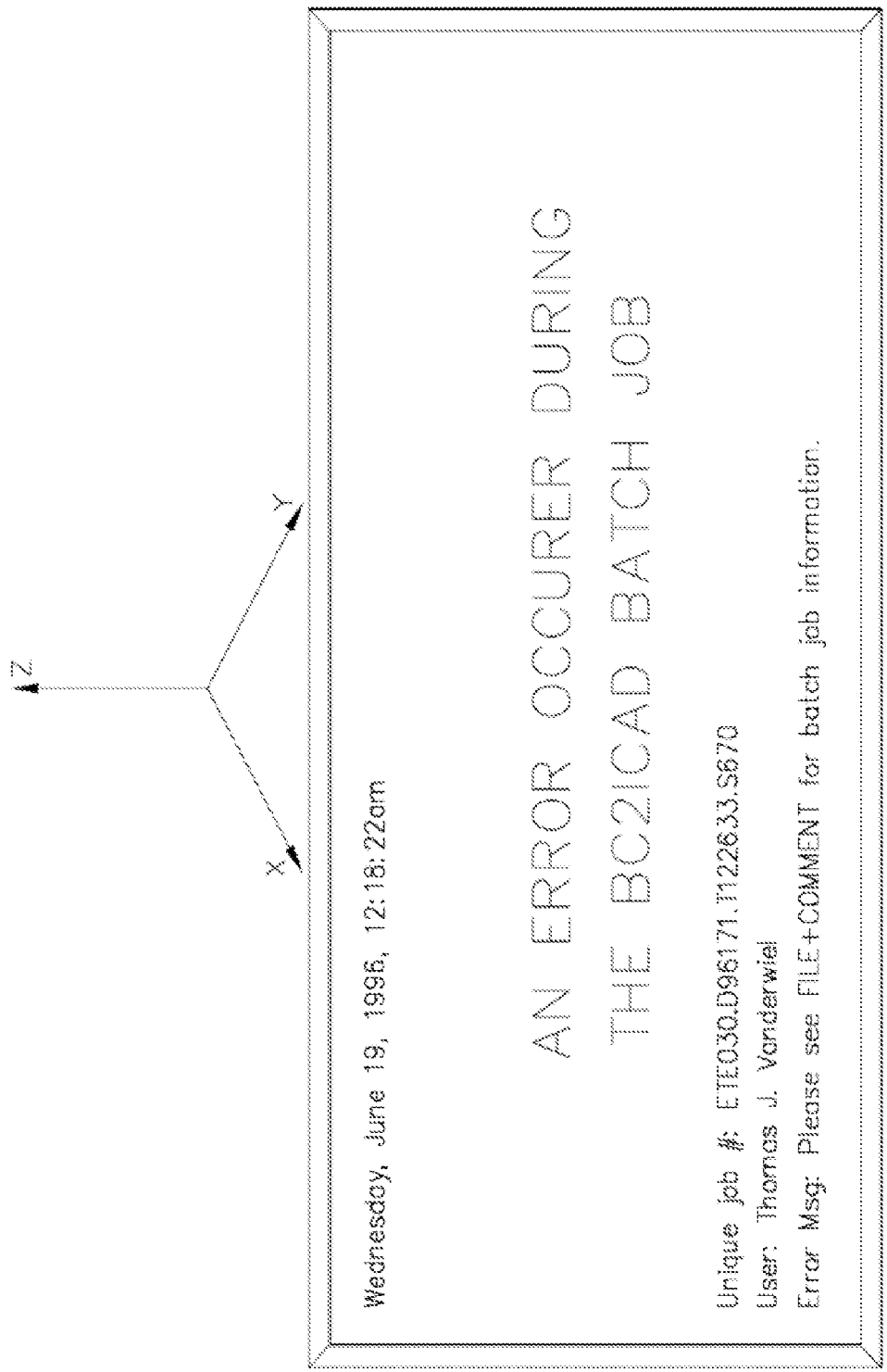
FIG. 14 is an error message presented by the program if the batch job fails according to one embodiment consistent with the present invention.
Figure 16A:
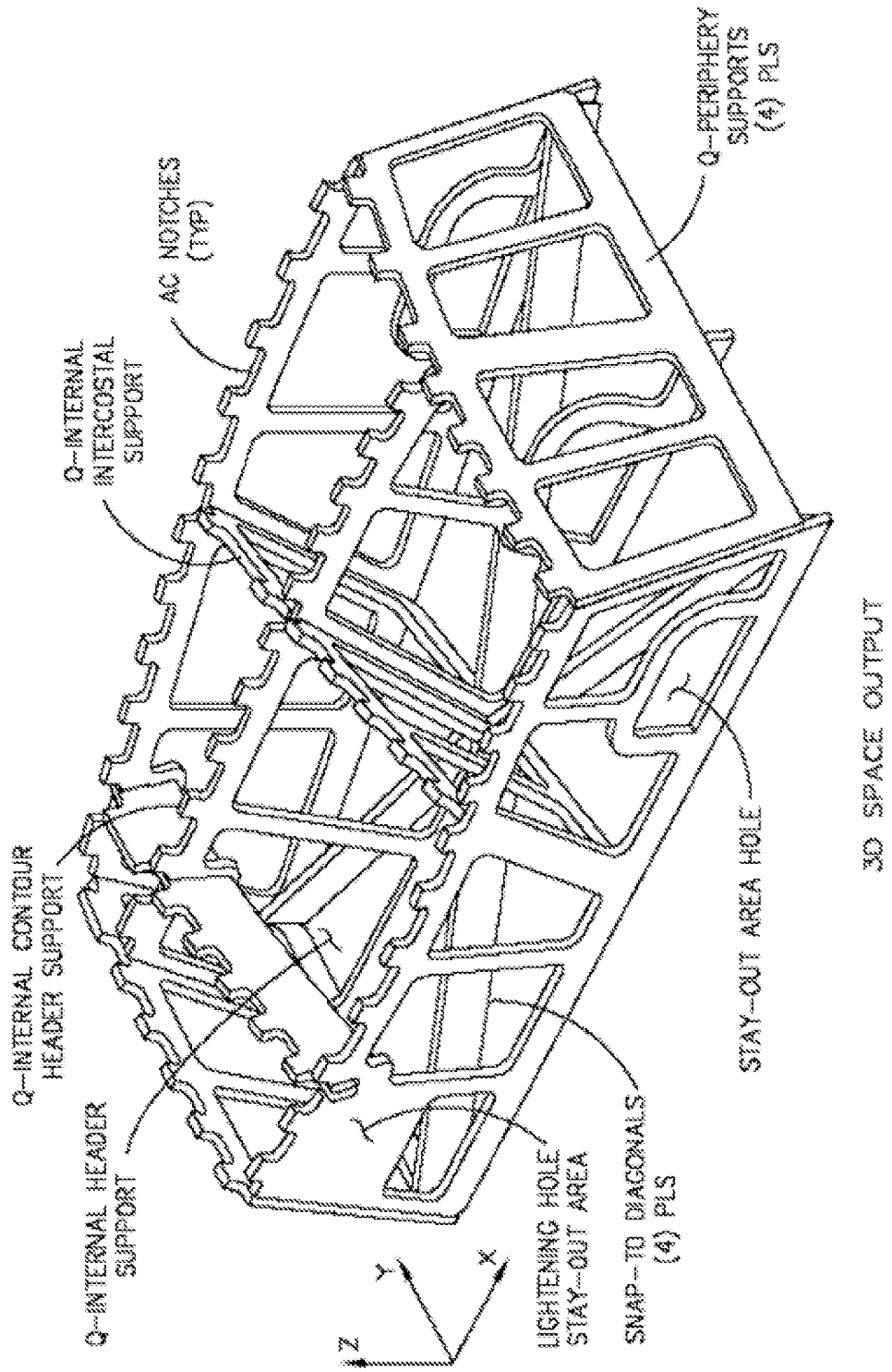
FIG. 16A (perspective of a three-dimensional space geometry) and FIG. 16B (two-dimensional draw output) are exemplary views of an output model for review by the user according to one embodiment consistent with the present invention.
Figure 17:
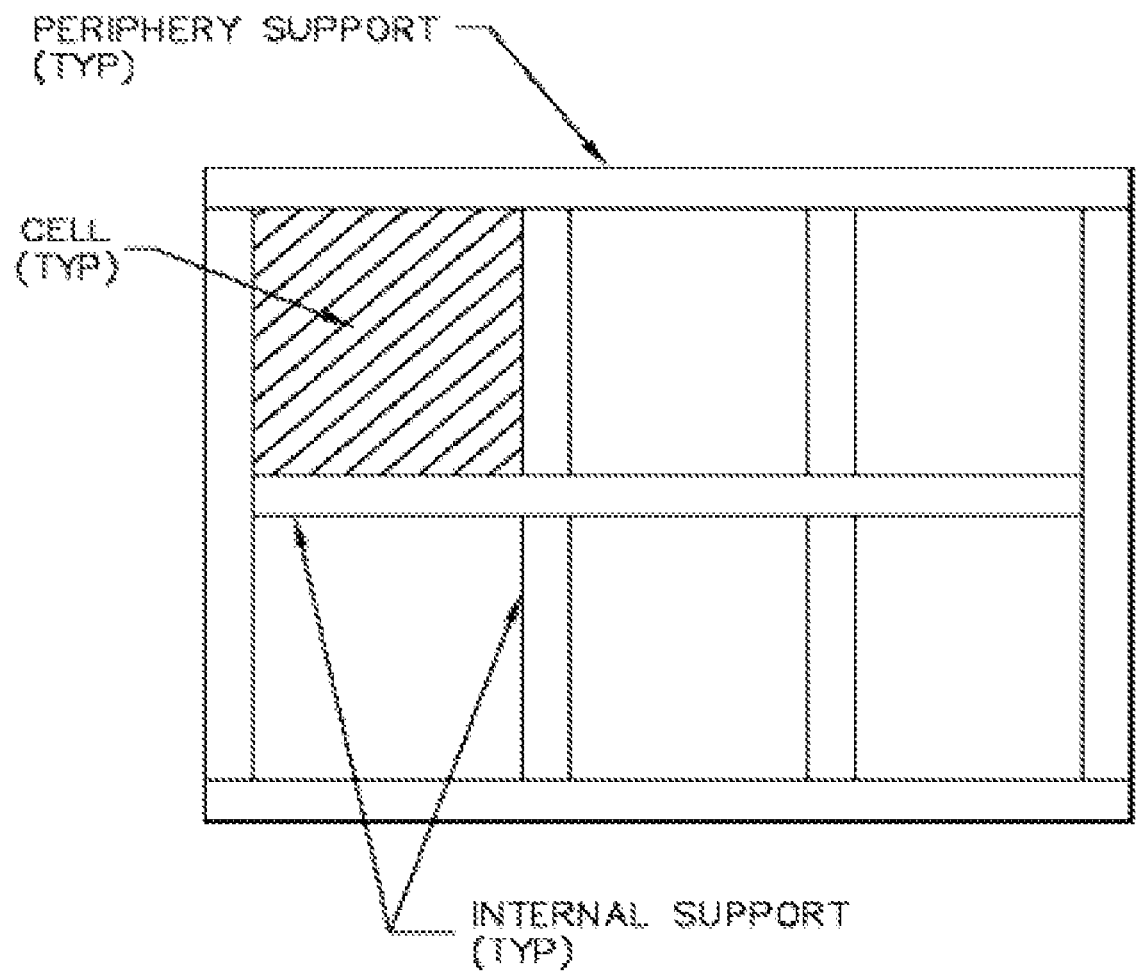
FIG. 17 is a plan of an exemplary eggcrate substructure showing how cells are formed by periphery and internal supports according to one embodiment consistent with the present invention.
Figure 18:
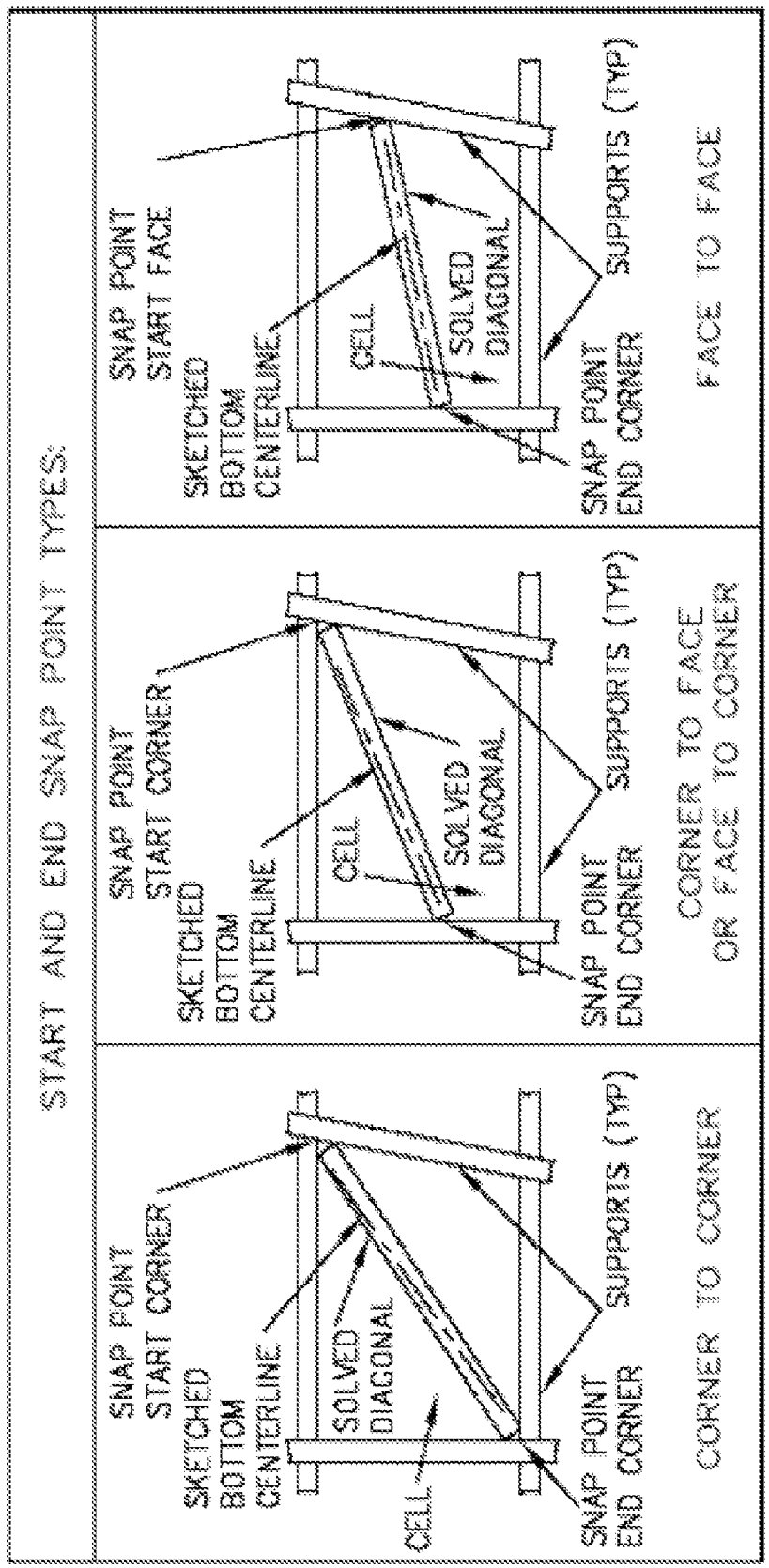
FIG. 18 is a table of exemplary views of the three different conditions possible for a Snap-to-Diagonal start and end snap-to points according to one embodiment consistent with the present invention.
Figure 19:
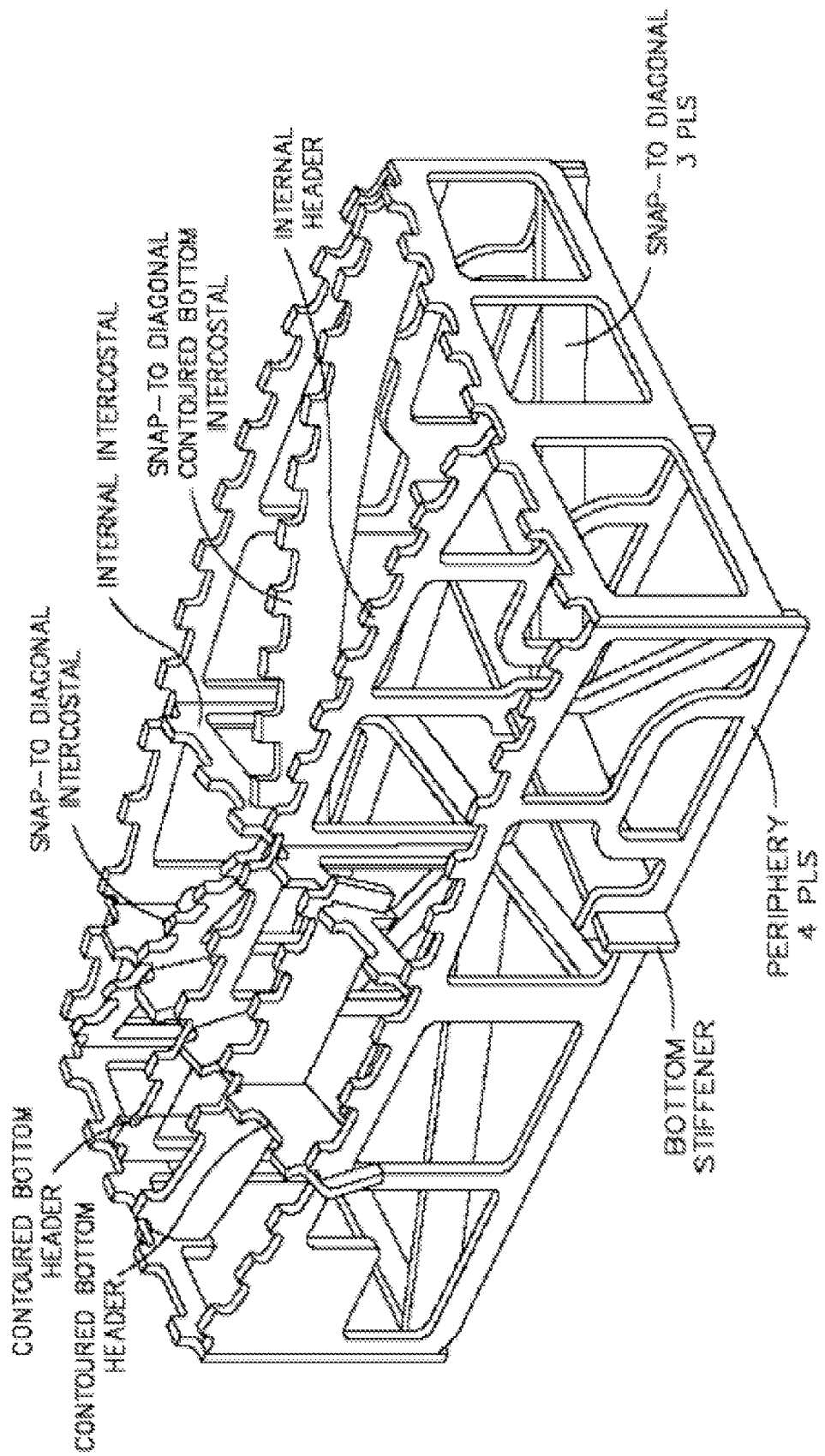
FIG. 19 is perspective of an exemplary output model table showing the various support types, diagonals and bottom stiffeners that can be generated from an input sketch according to one embodiment consistent with the present invention.
Figure 20A:
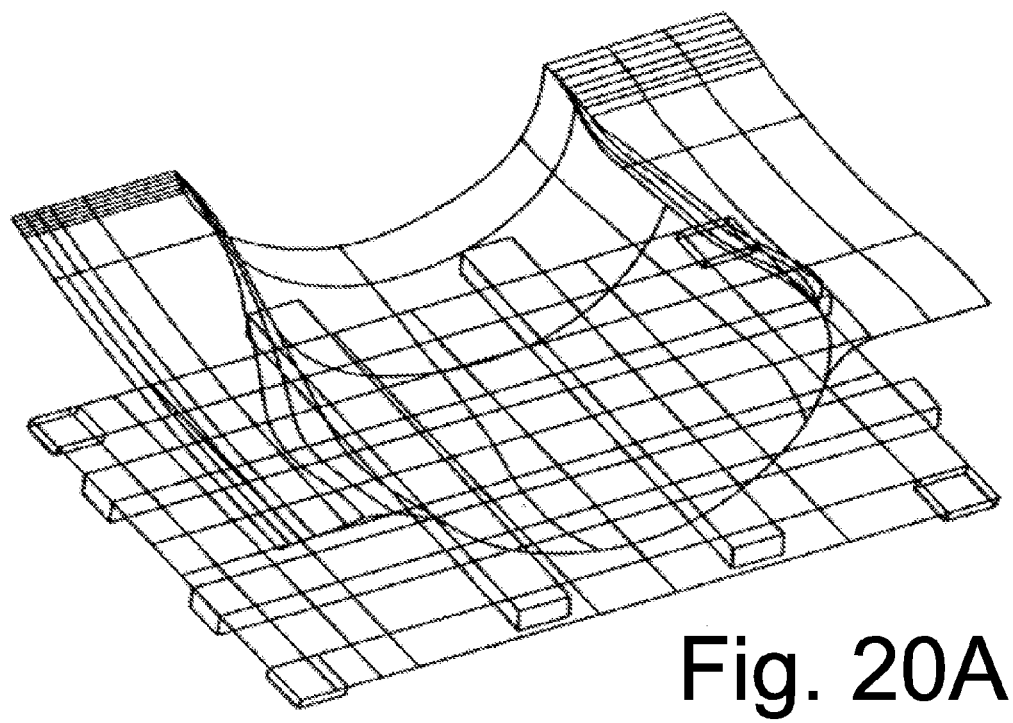
FIG. 20A through FIG. 20N are views of various exemplary input and output models showing three-dimensional space geometry according to one embodiment consistent with the present invention.
Figure 20B:
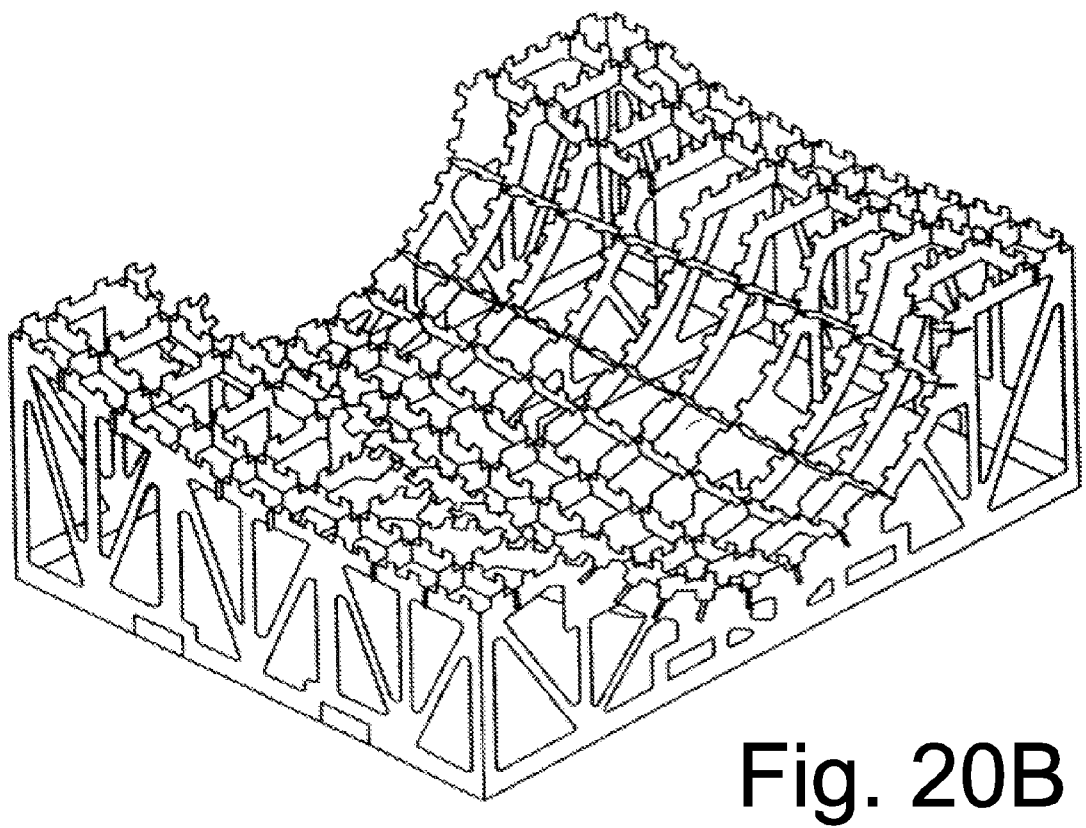
Figure 20C:
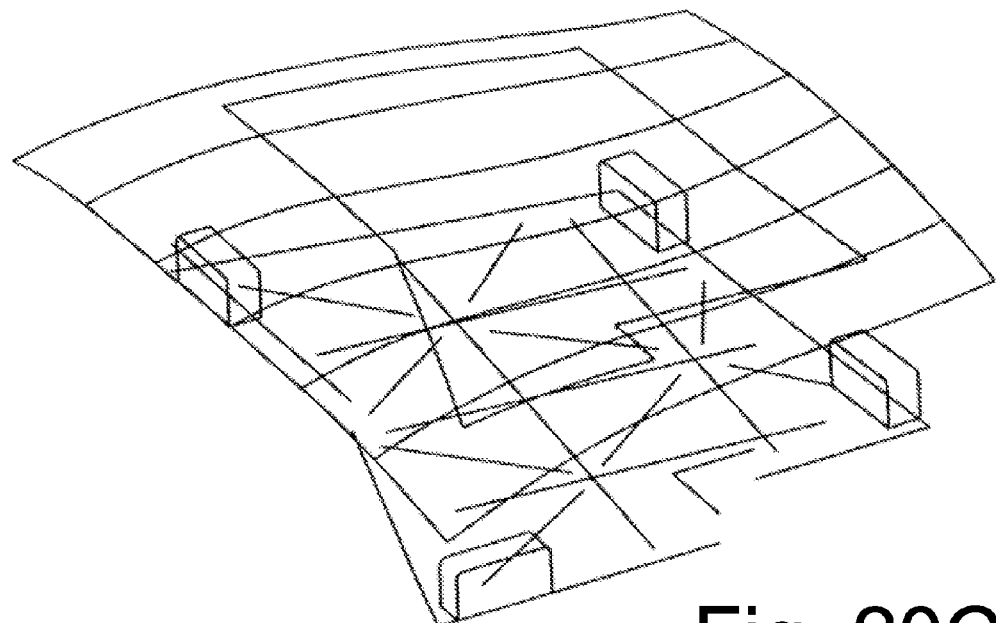
Figure 20D:
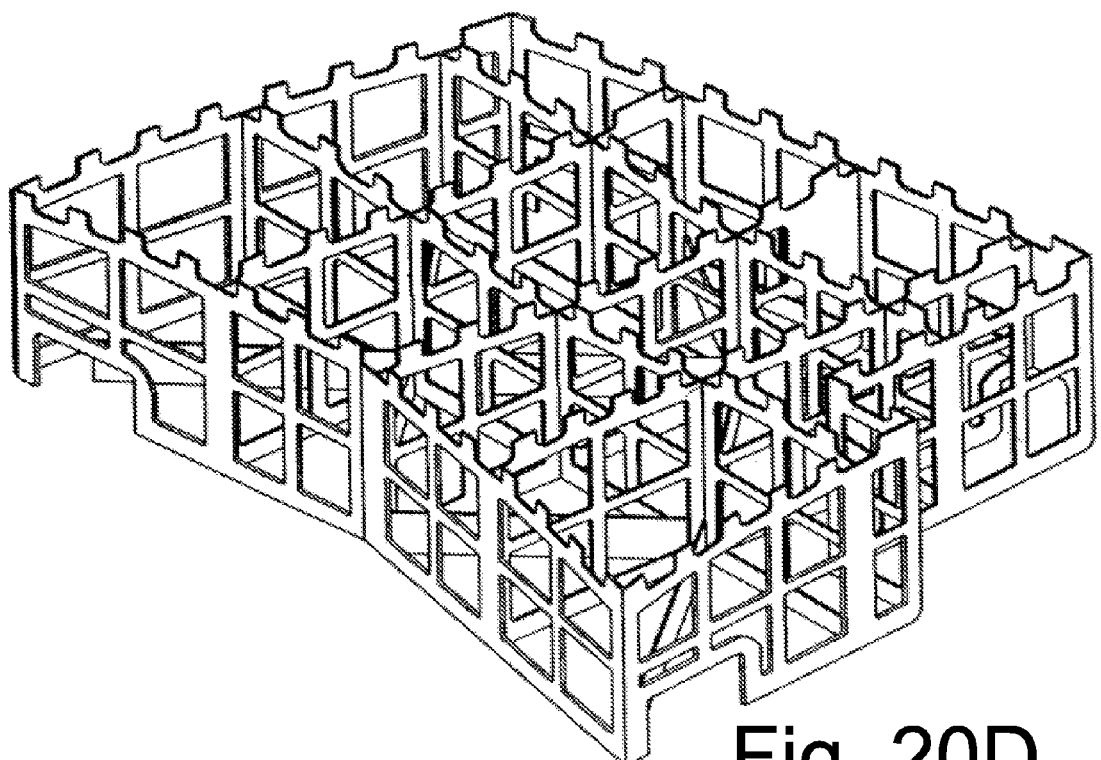
Figure 20E:
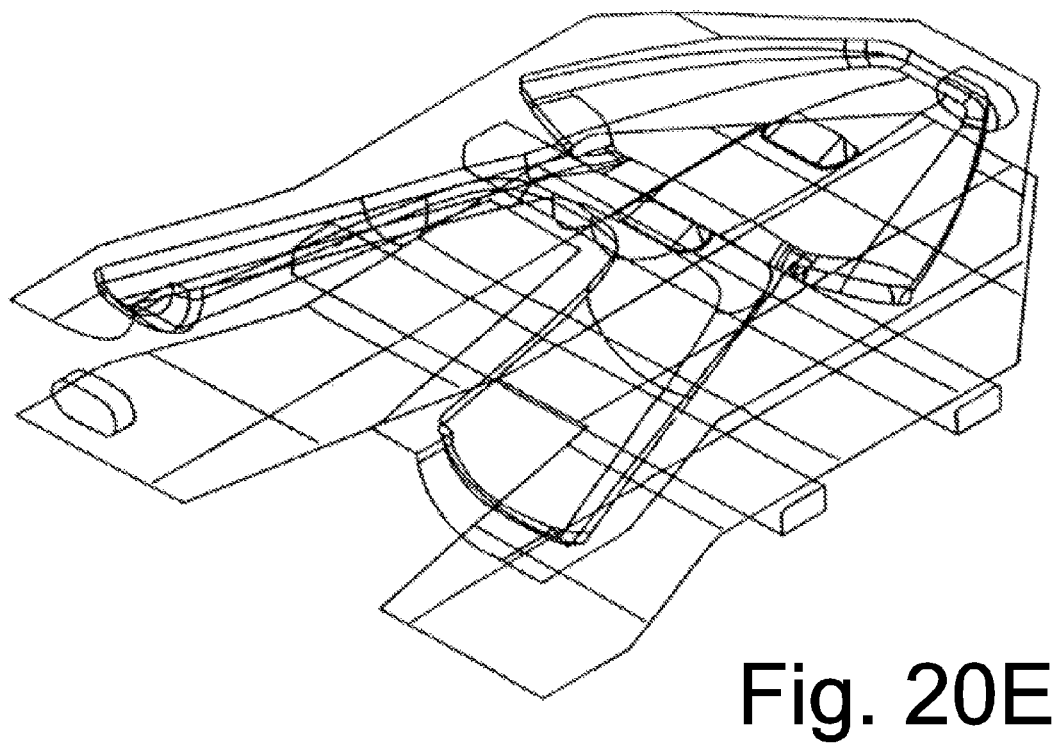
Figure 20F:
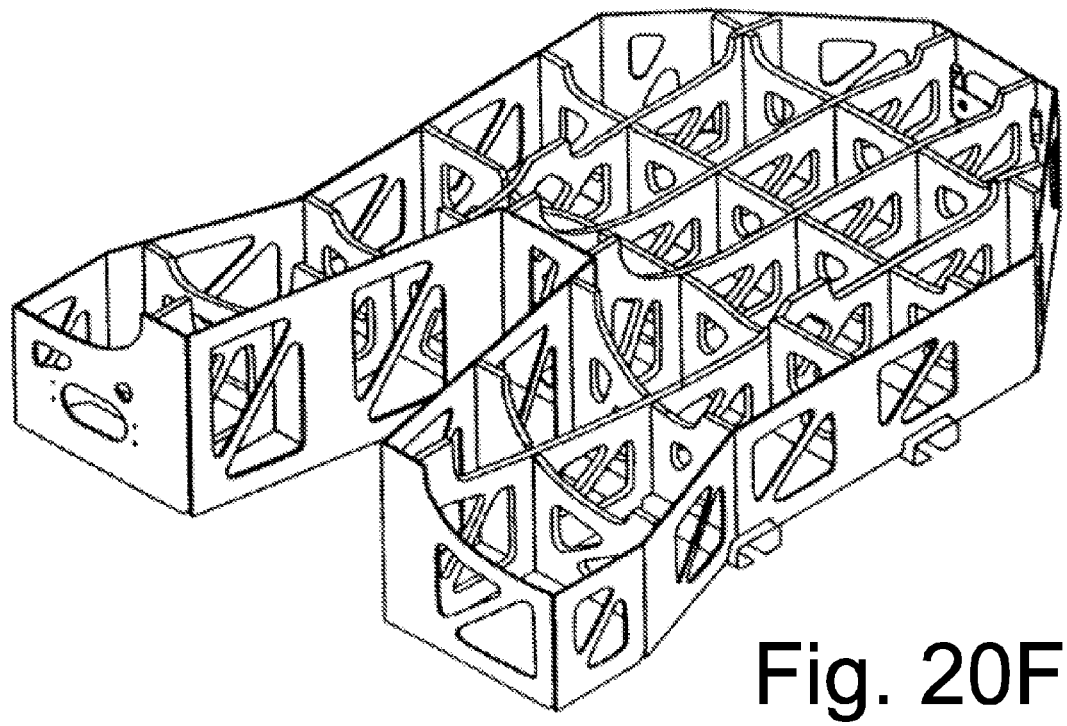
Figure 20G:
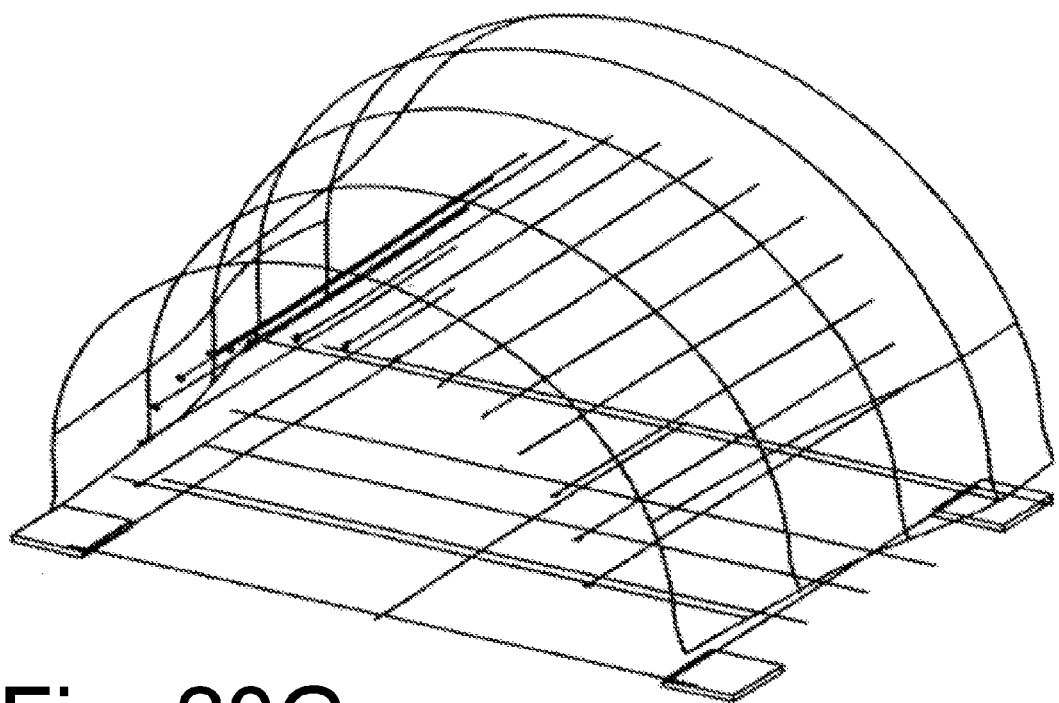
Figure 20H:
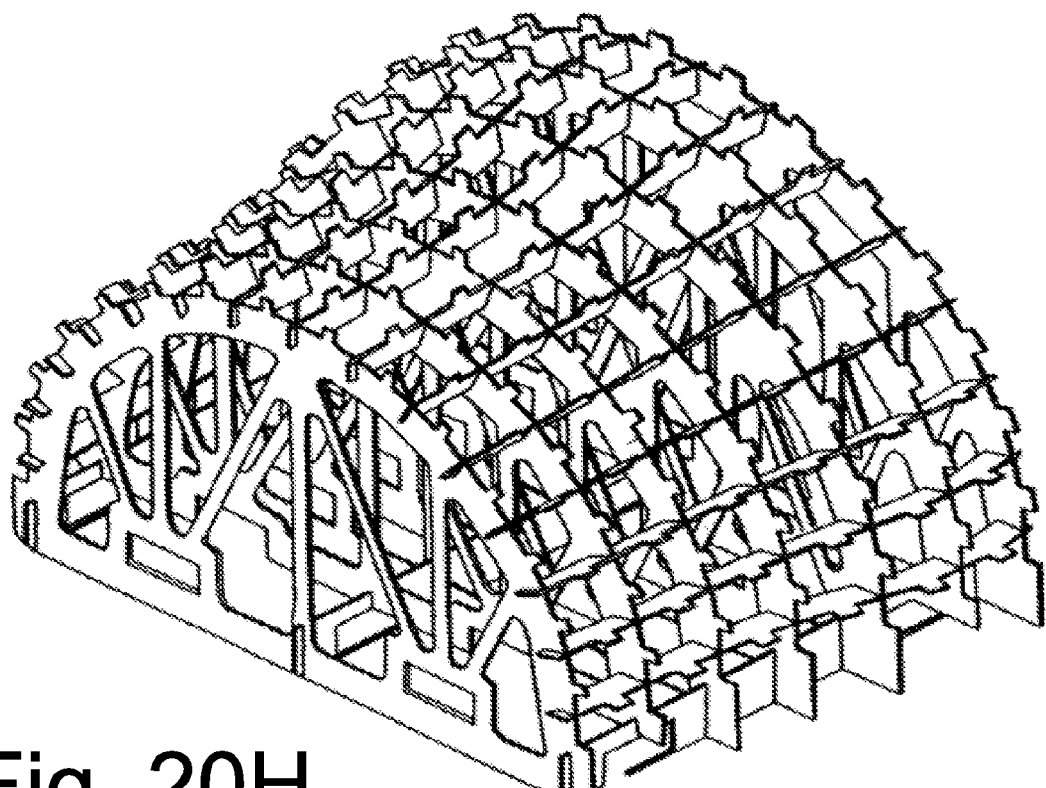
Figure 20I:
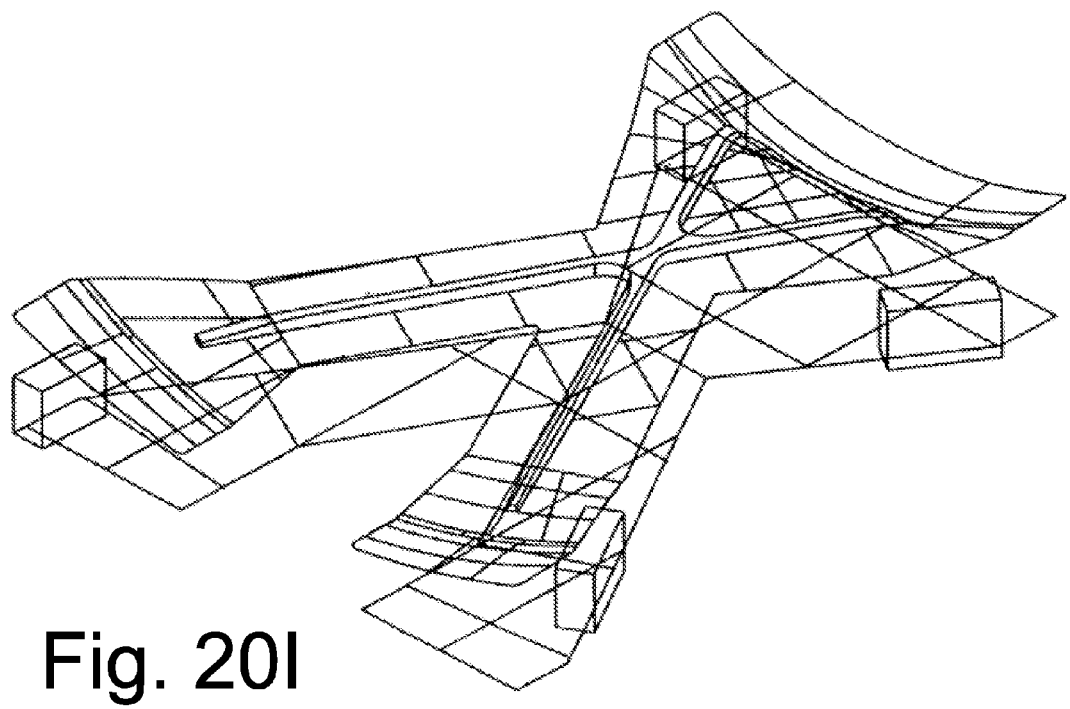
Figure 20J:
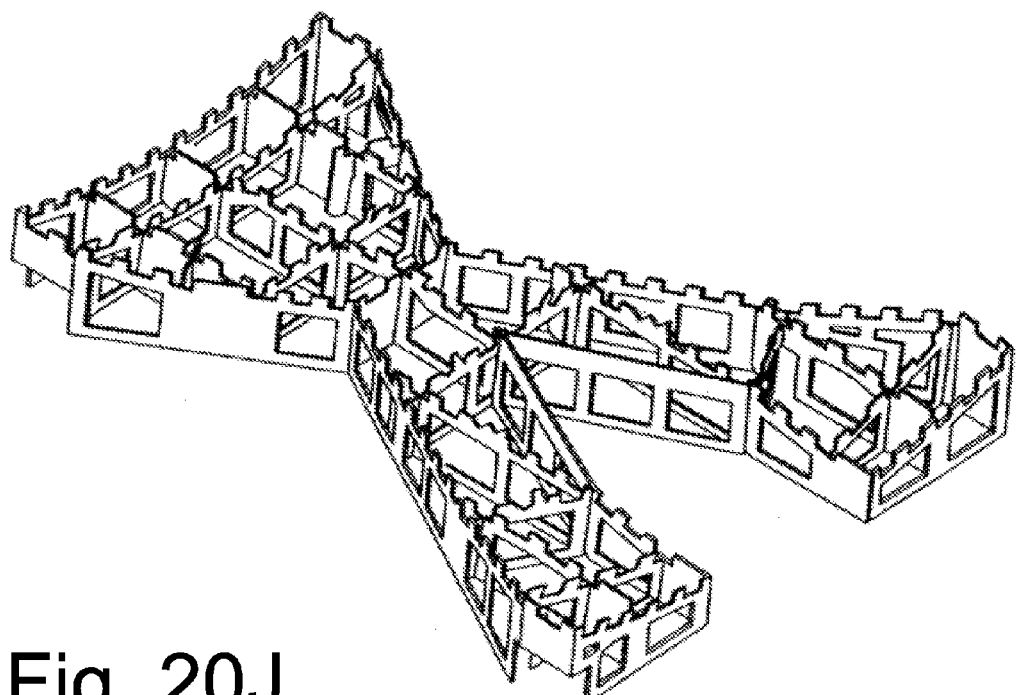
Figure 20K:
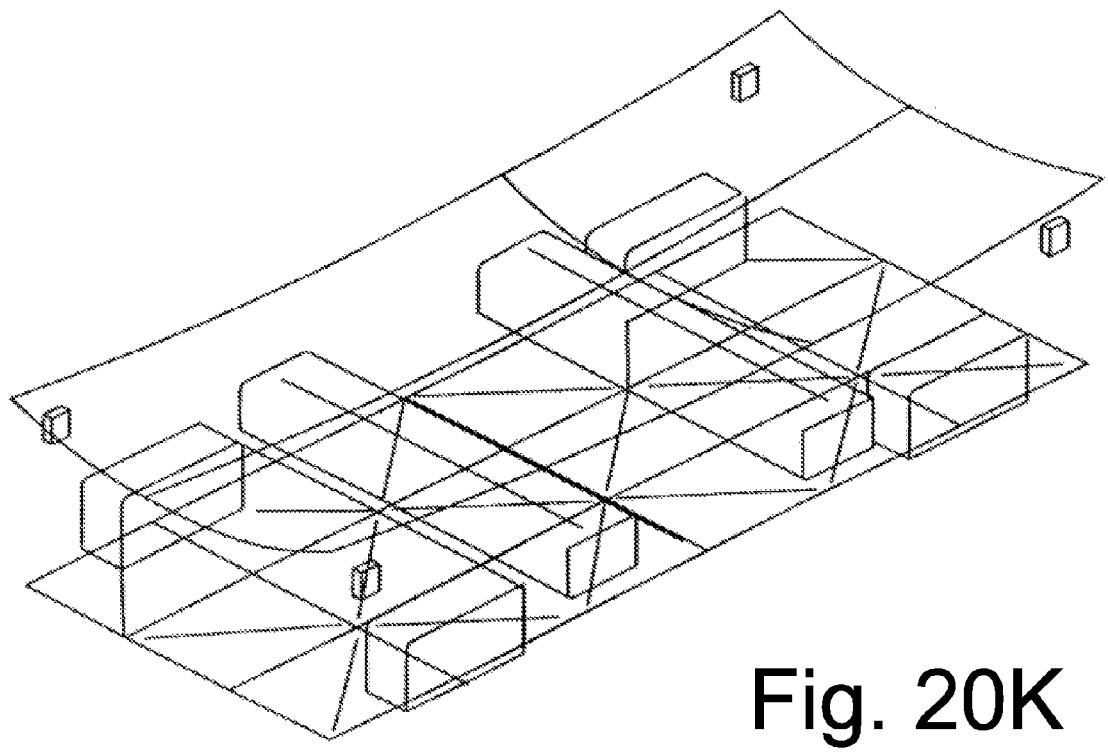
Figure 20L:
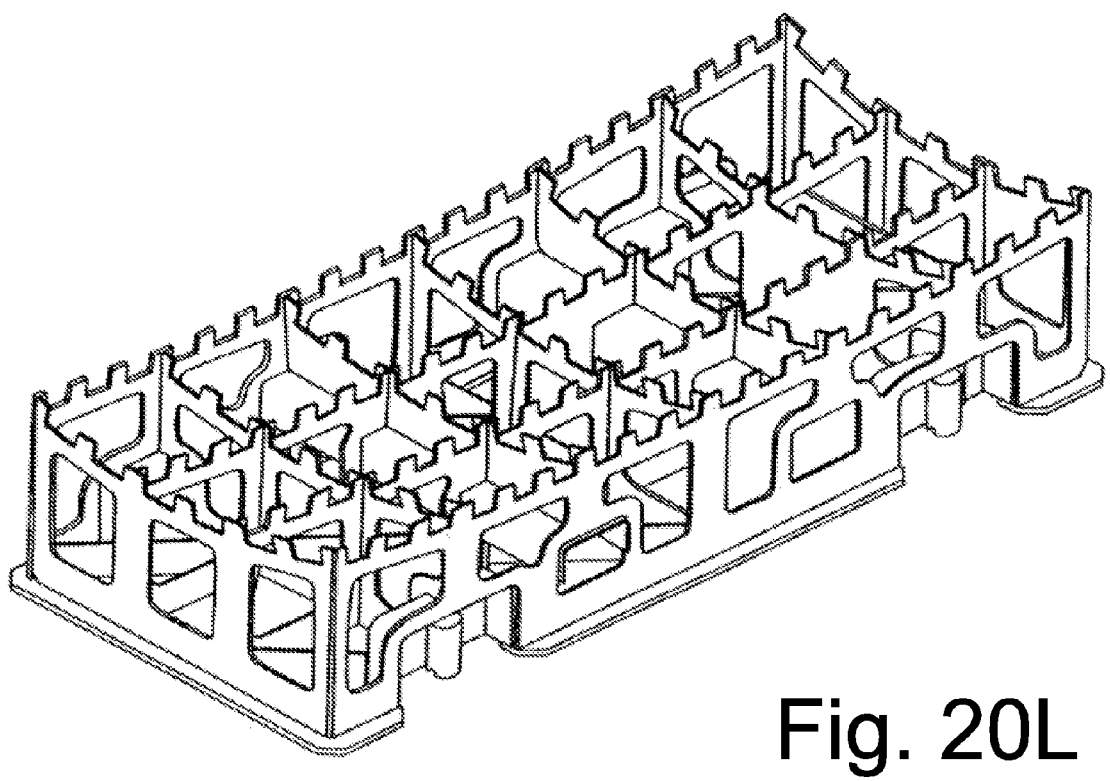
Figure 20M:
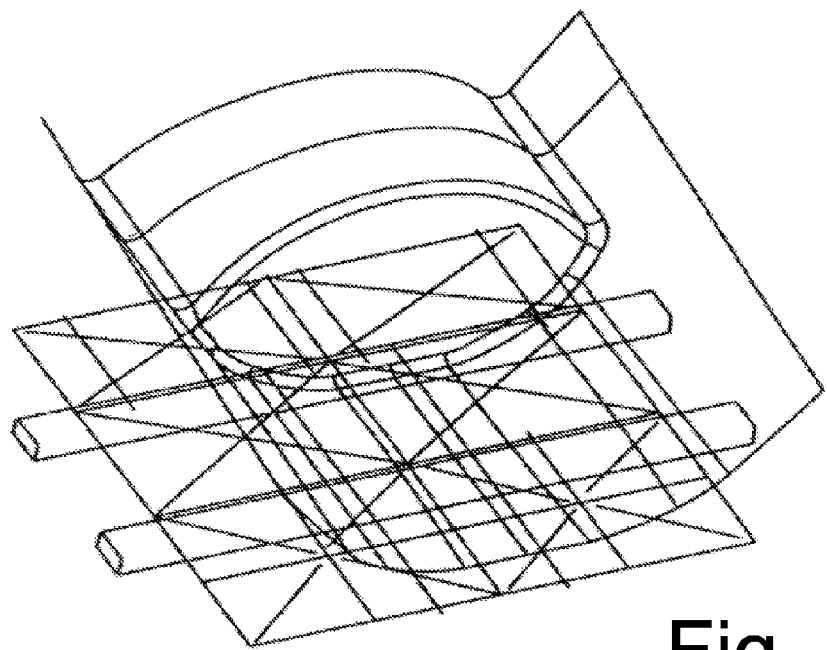
Figure 20N:
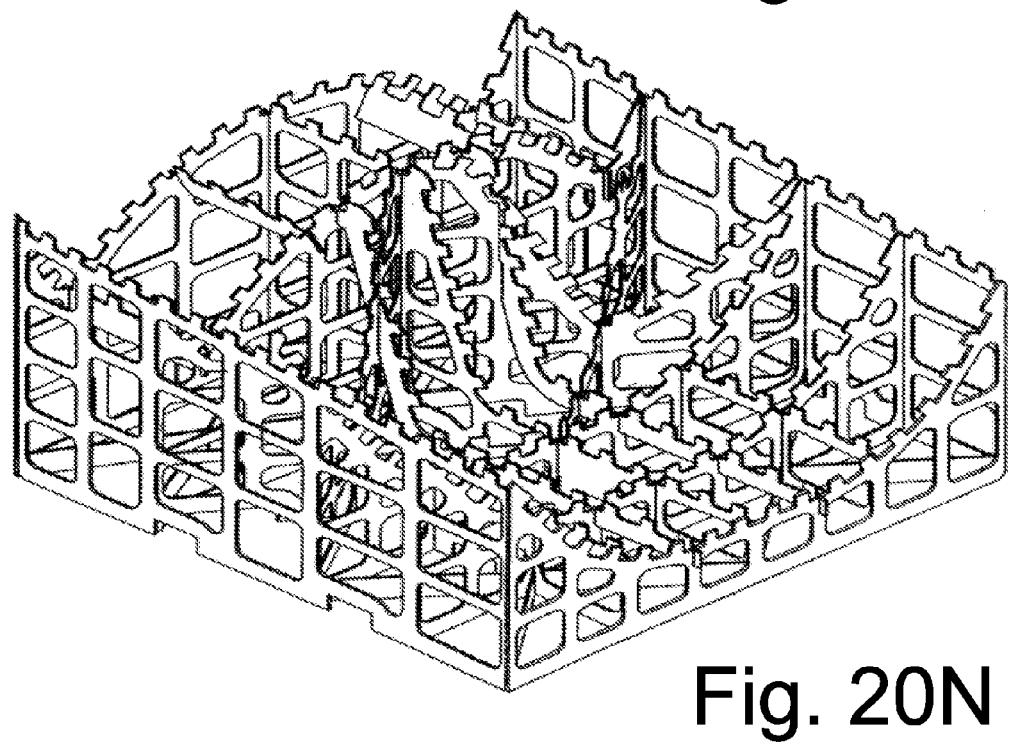

FIG. 13A (top view, default overlap settings) and FIG. 13B (top view, 50% overlap applied) are examples showing the resulting compound butt joints for different overlap values. The input CAD lines represent the bottom inside edge of each periphery support. From each given line a new bottom centerline can be created that has its length based on the corner joints between periphery inside edges. In other input process rules, the following are followed:

query for Q-periphery locations from input model.

chain bottom inside lines start to end.

re-chain bottom inside lines so that their x-axis vector points inward and y-axis vector to the next line's start.

create a Q-periphery joint object at each vertex on the chain that has two lines.

solve each joint based on the process rules.

create periphery bottom centerline objects between the joints using attributes from the solved start and end joints for each input Q-periphery location.

Similarly, the Q-periphery joint inputs and rules are as follows:

Inputs:

:quadrant-type-tolerance 0.0001

:overlap-selection-vector (the joint's (:face-normal-vector :right))—determines which input line/support will overlap the other when they form a 90 or 270 degree joint.

:default-overlap-percentage 0.05; (percent 0) to (percent 100) or 0 to 1 or nil

:quadrant-1-overlap-percentage (the :default-overlap-percentage)

:quadrant-2-overlap-percentage (the :default-overlap-percentage)

:quadrant-3-overlap-percentage (the :default-overlap-percentage)

:quadrant-4-overlap-percentage (the :default-overlap-percentage)

:overlap-percentage-at 90 (the :default-overlap-percentage)

:overlap-percentage-at 270 (the :default-overlap-percentage)

CAD Input Model

The input rules for building a 3D CAD sketch representing the inside edge of the substructure periphery, include:
  the line segments do not have to lie on the same plane.
  the start and end point of each line may be in different planes.
  the line segments may form an open chain when viewed along the tool z-axis vector (top view).
  each line segment may also have a corresponding plane in which the line lies and is used to define the z-axis of the support. This plane can not be parallel to the xy plane Further, the CAD input model must contain the following geometry elements:
  1) One local and active tool axis. This axis provides the orientation of the tool and its supports
  2) One or more surfaces and or faces modeling the bottom of the tool face sheet. These faces will be used to define the top of the supports.

Lines must be input representing the bottom centerline location of each support to be created. For non-quick type supports, the length of the line will be the length of the support. A plane on which a bottom centerline lies to give the bottom centerline a z-axis vector other than that of the tool axis. The plane should be of the same color and on the same layer as the bottom center line in order to group the two geometric parts together.

Interlock slots are created where intercostals cross headers and where contour seam supports cross interior supports. For quick type supports the bottom centerlines do not need to take into account the thickness of each support. Other features consistent with the present invention include:
  1) Cutout areas (holes) made from input solids are always perpendicular to the support.
  2) Fillets can be made for almost any 2D wireframe profile in a predictable manner, even when part of the profile must be removed or split into multiple profiles.
  3) Periphery locations only need to be sketched.
  4) Internal header locations only need to be sketched.
  5) Internal intercostals locations only need to be sketched.
  6) Trimming or extending of internal supports to other supports is handled by the application.
  7) Simple extruded solids can be used to represent the placement of any non-eggcrate part in the design and eggcrate features will be generated to accommodate these parts in the design.
  8) The support top edge is generated so that it is at a right angle to the support sides and only makes contact with the bottom of the tool face sheet even with highly contoured parts.

Thus, in at least some embodiments of the present invention, the input model is prepared where a sketch is made where the locations do not have to be exact in length or complete. The periphery can have as many sides as desired—intersections are possible. There is also a 3D component, where lines do not have to lie in the same plane—but lines are connected when the user looks down at the sketch. Once the inputs are entered by the user, the inputs may be stored and recalled by assigning them a name.

When the user is ready to see the model that has been created using the previously described inputs, the user can obtain the input model by launching the program as a batch job, for example, via the web page in step S200. The batch job process is launched from any web browser using the application's web launch page. The program will present application specific windows, then finally, the launch window(s). A batch job is submitted once all the windows are properly filled out by the user, and the user IDs and passwords are accepted by the program. The Batch Job Data/Title Block Inputs will be application specific inputs.

The flow chart in FIG. 2 shows the tier I flow of the ITS batch job submitted from the web launch page. If the program is unable to run, and the batch job fails, an error message similar to the one shown below will be contained in the returned CATIA model (see FIG. 14). After receiving an error message, all inputs to the batch job should be verified prior to launching the application again. The CATIA OUTPUT model comments page will contain information about the error that occurred.

In step S300, the program verifies the output model exists by running the program. In step S400, the program presents the output model for review by the user. The CAD output model contains both 3D space and 2D draw geometry, as shown by an exemplary model (see FIG. 13). The 3D space geometry may be used to verify the substructure against the input surfaces. In step S500, the user makes a determination of whether the output is acceptable. If so, the program receives the input from the user as to the input model's acceptability.

In step S600, if the output model is not acceptable, the user may make changes to the input model or batch job inputs, which include the 3D sketch and web or interactive inputs, and then run the program again as in step S200. Changes can be made on finer detail using the keywords etc., i.e., thickness of a support. Major changes do not have to be made before running the batch over again. When running the batch process, the program can only change "type" of thickness, i.e., peripheral, internal. To reduce overhead, batches are preferably run, but it is possible for the program to be interactive and simultaneous, and to see changes to the model after the user enters each input.

Note that several iterations may be necessary in order to produce the desired substructure design. As stated previously, this is accomplished by changing the inputs—both the CATIA model and/or web inputs—to the application and running another batch job.

If in step S500, the user believes the output to be acceptable, then the next step is to merge the ICAD (ITS) Spec Sheet into the tool drawing CAD model in step S700. In that event, the layer for which each support is output on defaults to the layer that its bottom centerline is on. This also holds true for diagonals. The input default-layer-offset may be used to move all of the support's wireframe geometry to a new layer that is offset from which the support's solid reside. A layer-offset input is also provided for each type of support.

In the next step, a substructure flag note is added to the face of the drawing. In a subsequent step, the ITS output is sent to Tool Fabrication. Finally, the formal output for NC Programming (tool fabrication) is prepared, and Tool Fabrication sends the formatted output to NC Programming.

Embodiments of the present invention may reduce the time it takes to create an initial design of the eggcrate substructure for a new LM by approximately 80% or more. Using its ability to use a sketch for inputs, a quick concept design can be done in as little as 20 minutes. Iterations can then be performed to fine tune the design and allow concurrent work to be done.

By utilizing the quick run time of the application, a designer can also quickly create tool concepts by creating a "napkin" type sketch of the tool. Since the application is very flexible it can be used on a wide variety of tools. Tool size and shape are not limited by the application.

Additional Capabilities for Interactive or Non-Interactive Applications

In the preceding detailed description, various embodiments of the invention have been described in terms of preparing input files for subsequent processing in a batch mode of operation. Further embodiments of the invention have been developed, however, that may be used to perform the actions involved in the creation of sketch-based eggcrate substructures interactively, non-interactively, or a combination of both.

Figure 21:
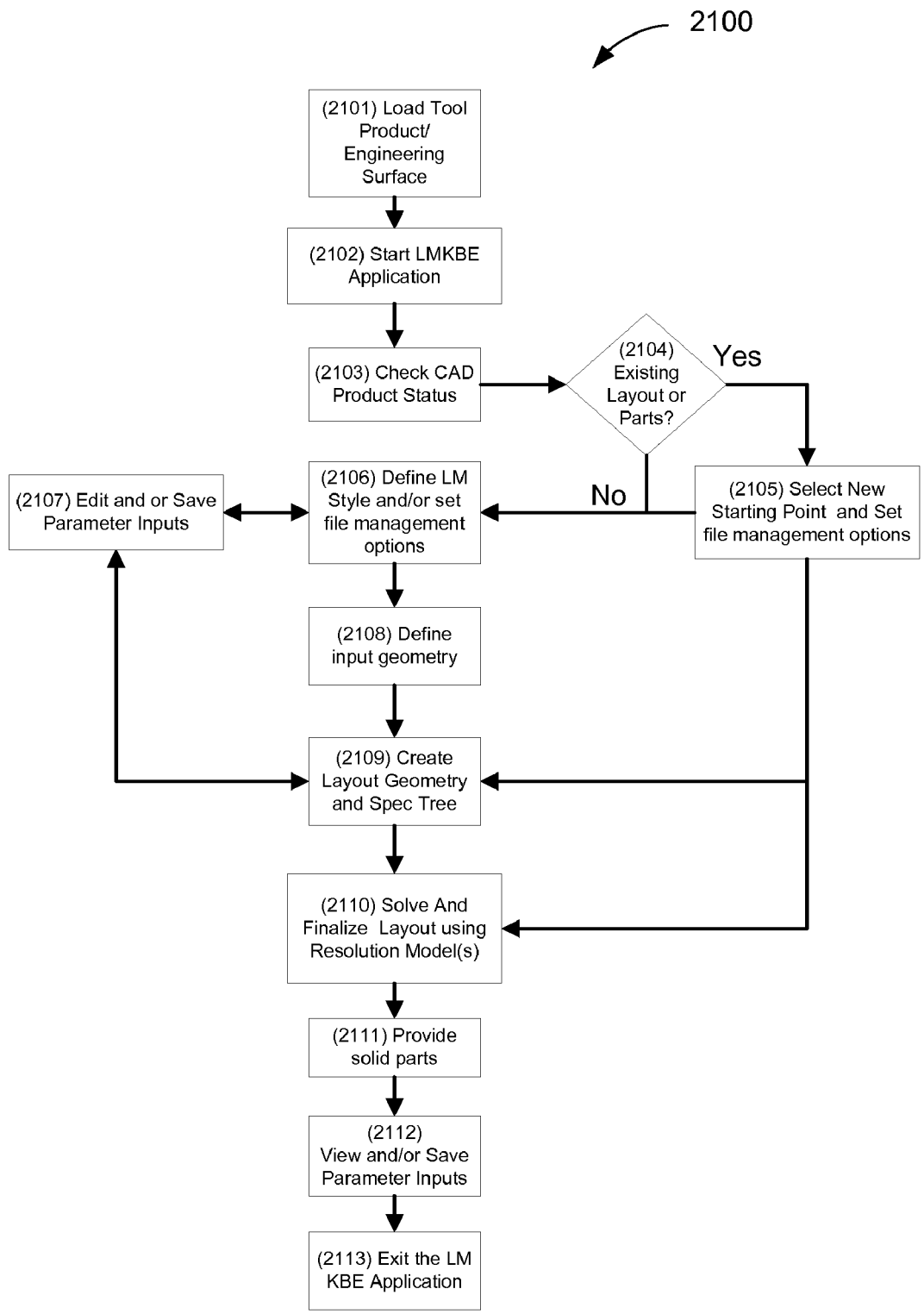
FIG. 21 is a flow chart identifying an overall process for an interactive application according to one embodiment consistent with the present invention.

FIG. 21 shows a flow chart identifying an overall process 2100 for an interactive application according to one embodiment consistent with the present invention. The embodiment shown in FIG. 21 may be referred to generally as the LMKBE (Layup Mandrel Knowledge Based Engineering) application (or process) 2100 for creating sketch-based eggcrate substructure for composite parts. In general, the process 2100 makes extensive use of the previously-described embodiments, and further enhances and extends their use. In one particular embodiment, the process 2100 may be implemented using a combination of Microsoft's Visual Basic version 6.0 (VB) and Dassaults Systemes' CATIA v5 (CATIA) software.

Referring to FIG. 21, step 2101, the user loads a tool product containing the input geometry and specifications (or other suitable data structure) into a CAD session (e.g. as described above). The user then starts, step 2102, an interactive portion of the LMKBE application. A process of checking the status, step 2103, of the tool product is started. The status process is used to determine the last step performed by the application and present possible starting points to the user based on any existing layout's completeness and existing substructure parts. This process utilizes a standard specification of what the possible contents of a sketch-based eggcrate substructure are to determine the status of the product in the current CAD session.

Figure 22:
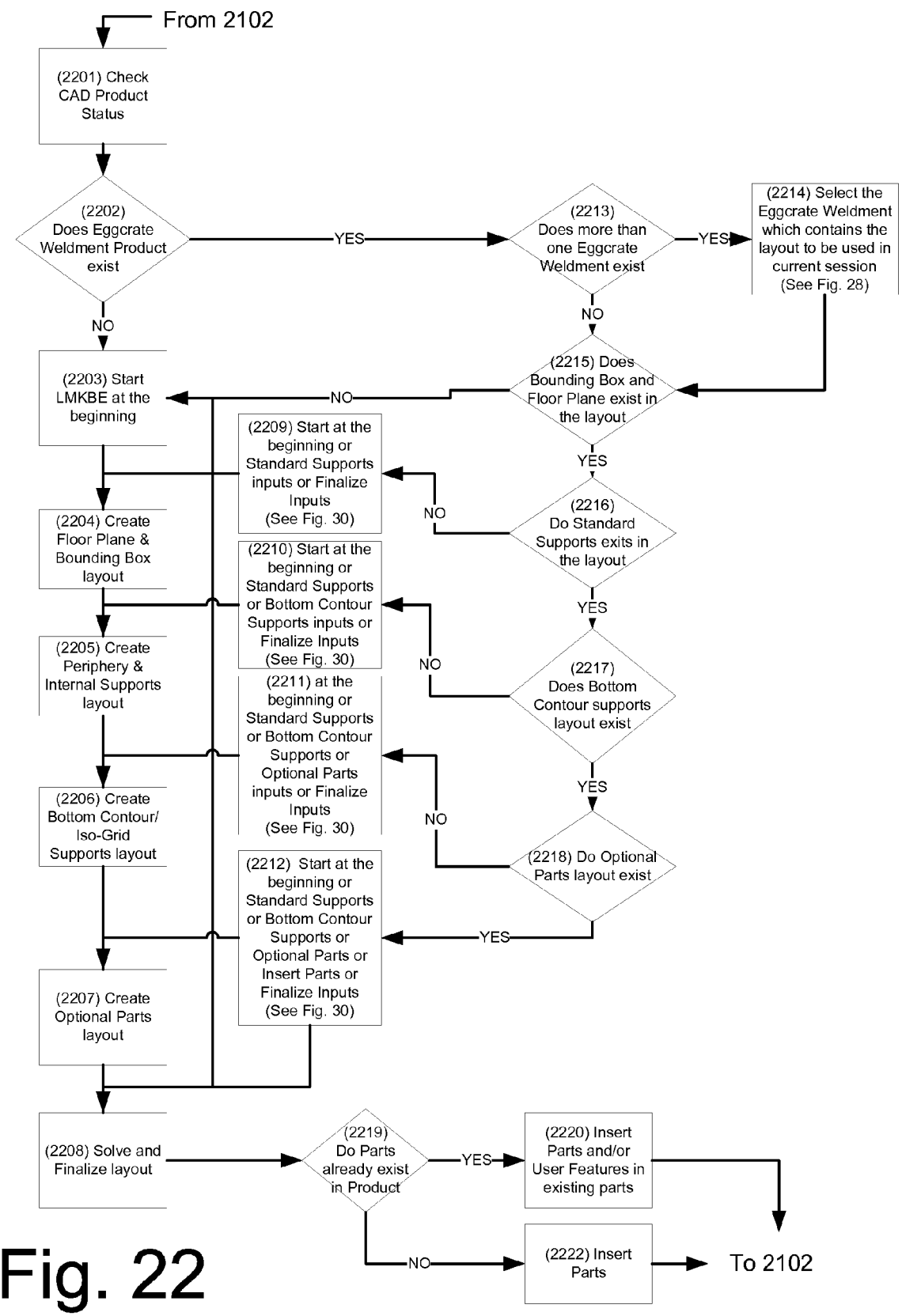
FIG. 22 is a flow chart showing a process of determining the status of a sketch-based eggcrate substructure according to one embodiment consistent with the present invention.
Figure 28:
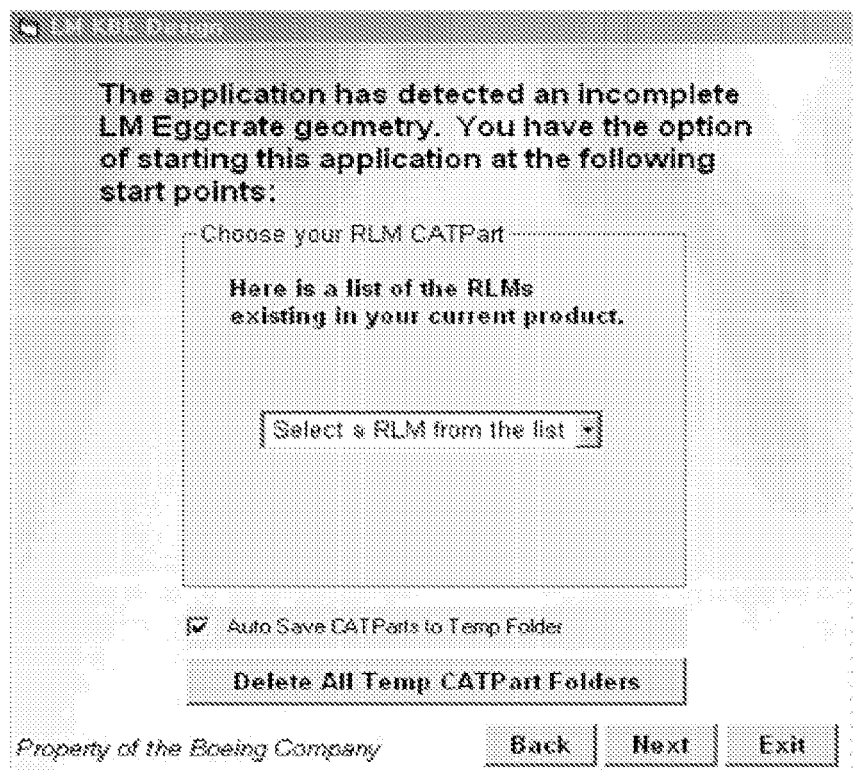
FIG. 28 shows a screenshot of an interactive menu for selecting an existing layout in accordance with an embodiment of the invention.
Figure 30:
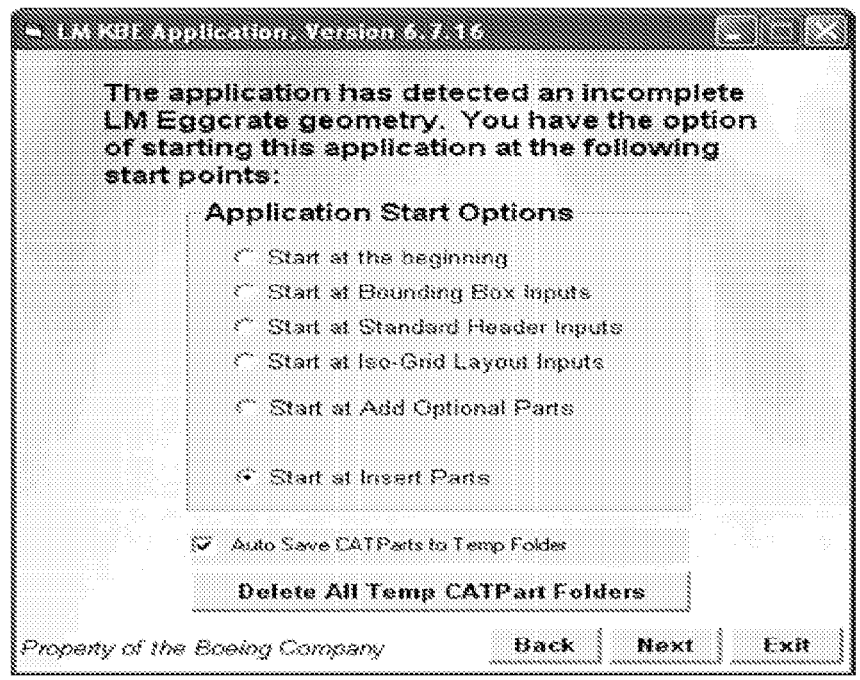
FIG. 30 is a screenshot of an interactive menu for selecting a starting point for an existing layout in accordance with another embodiment of the invention.

Referring to FIG. 22, step 2201, check product status, the application first finds a CAD session and searches for existing eggcrate substructure products within that session. If one or more exists, step 2202, the user is presented with a list of associated layouts, step 2214 and FIG. 28, and selects a previous layout to use in this current session. FIG. 28 shows screenshots of interactive menus for selecting an existing layout in accordance with alternate embodiments of the invention.

The selected layout is then read into memory and all further operations will be based on the selected layout's geometrical and parametric definitions. Next, the status of the layout is determined, steps 2215, 2216, 2217, 2218, by looking for geometry created by a previous session in the order in which it was created (see FIG. 23). Then the user is presented with options as to which step in the process to start from, (see FIG. 30), such as, but not limited to, the beginning, defining the eggcrate substructure bounding box, creating the periphery support layouts, creating the iso-grid support layouts, creating optional part layouts, or step 2208, solving and finalizing the layout. If one or more parts already exist, step 2219, in the eggcrate substructure the user may insert new parts and/or add features to existing parts, step 2220. If no eggcrate substructure layouts exist, the user starts at the beginning, step 2203, of selecting the inputs 2108 for the eggcrate substructure, which include but are not limited to, the top level product, the tooling surface, the engineering surface and the tool axis system.

Thus the check product status sub-process allows the user to stop the application at any point they desire and then restart without having to re-input any data to continue the automated eggcrate substructure design process.

Create Layout

Referring to FIG. 21, step 2109, the process of creating the Layout Geometry and Specification Tree (or other suitable data structure) may assist the user in creating the Sketched-Based Input geometry as described above, and may further provide substantial enhancements that provide the user a 3D visual representation of the substructure and its components allowing for "real time" modification of input data for any component.

Within the CAD Specification Tree, the process 2100 provides an interactive method of creating and organizes a series of "Layouts". A Layout, as referred to herein, is a group of geometric elements, parameters and nodes within the CAD Specification Tree that define both the Sketched-Based Inputs and simulate the shape of a CAD solid part to be created by the process 2100 (referring to FIG. 21, step 2111). The Layouts are typically sorted by types and subtypes of solid parts and their quantities. Any Layout can be "deactivated", which is a process that excludes that component from being used in follow on processes (referring to FIG. 21, steps 2110 and on), thus allowing the user to toggle on and off the substructure's solid parts providing more flexibility when optimizing design. The Layouts are linked to the LMKBE application's runtime memory, thus providing a method of "pausing" the application and changing input geometry via the CAD interface at anytime via the CAD interface.

Figure 23:
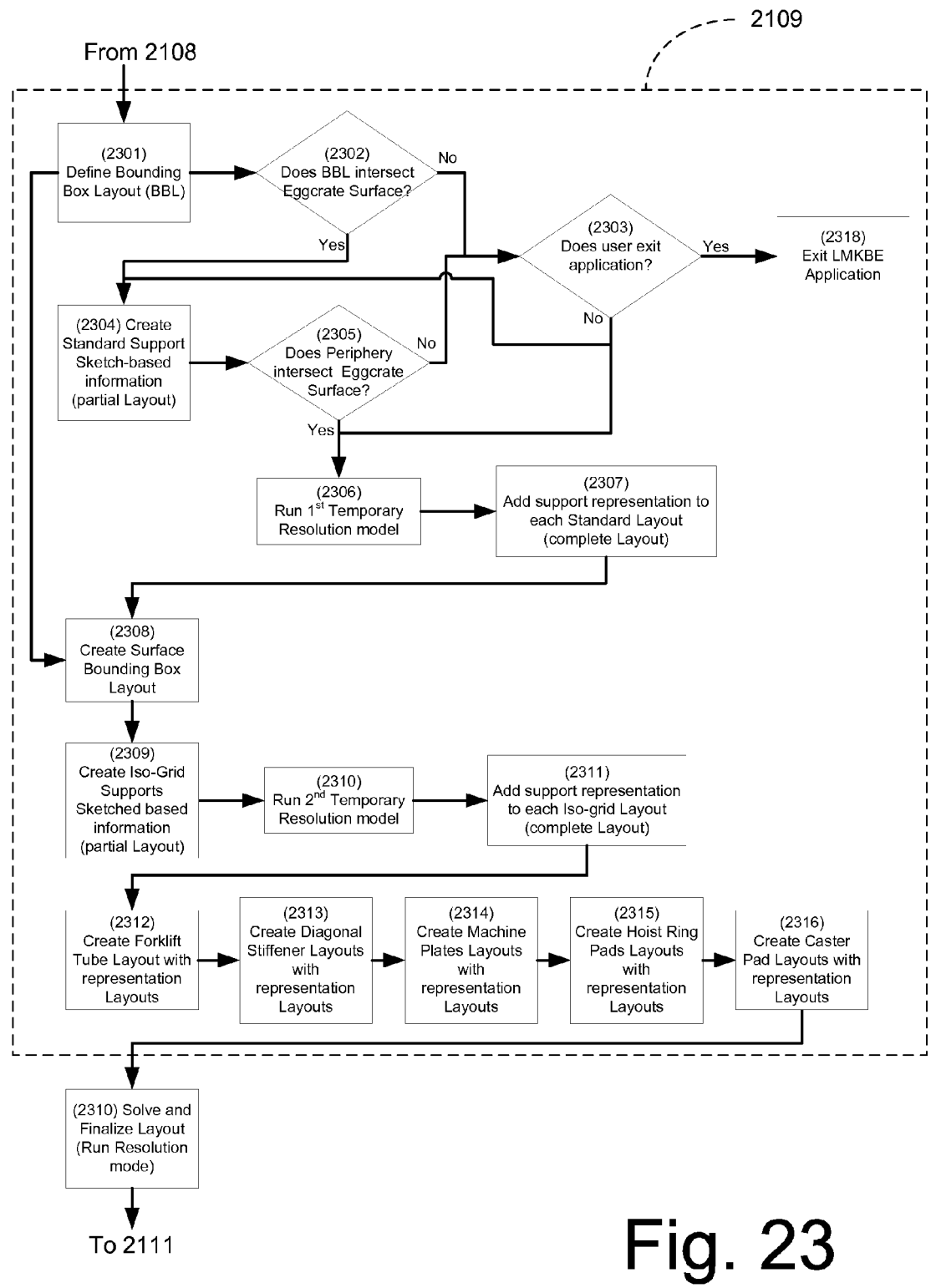
FIG. 23 is a flow chart showing a process of generating sketch-based layouts of substructure components according to one embodiment consistent with the present invention.
Figure 29A:
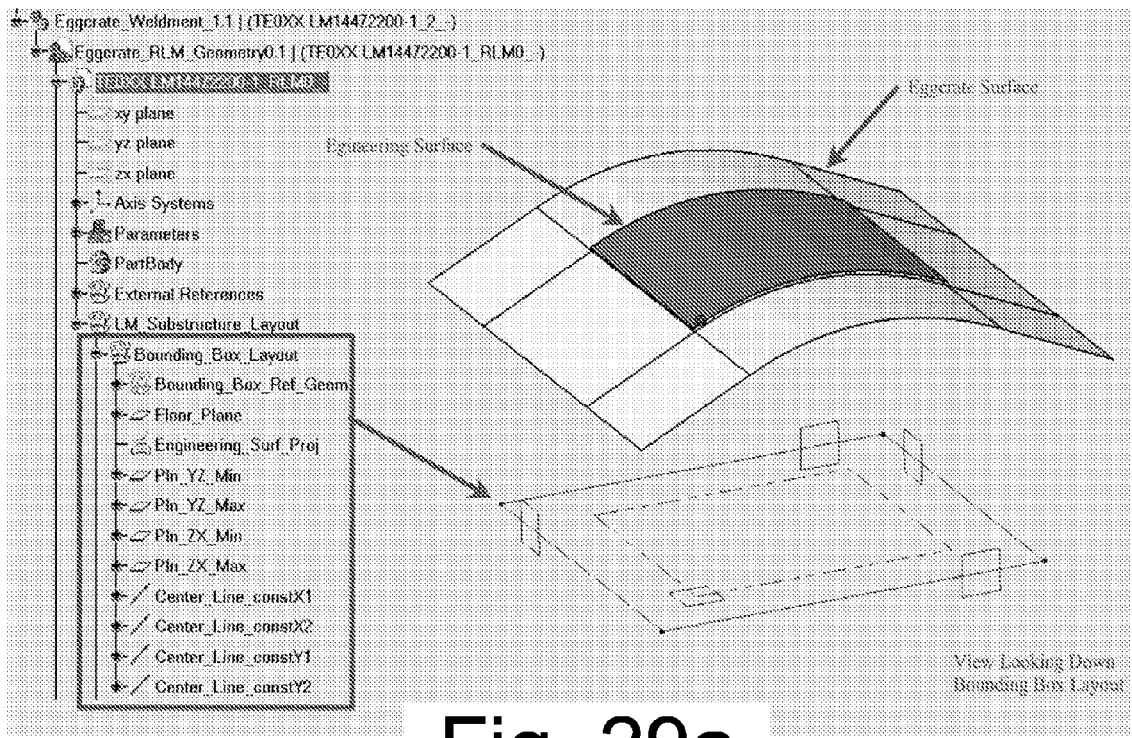
FIGS. 29A-29K illustrate various actions involved in a layout generation process in accordance with alternate embodiments of the invention.

The following describes the unique process used to create the LMKBE Layouts, an embodiment of which is shown in FIG. 23. In step 2301, the user inputs a desired floor height and part excess. As depicted in FIG. 29A, the LMKBE application 2100 then constructs the floor plane & places extremums (CAD elements) on the projected engineering surface, and bounds that planar area with four base lines and orientation planes. These elements make up the footprint of the tool serving as a guideline and suggested limits for follow on layout processes. In step 2302, the LMKBE application 2100 checks the intersection of the Bounding Box and the Eggcrate Surface (refer to FIG. 21, step 2108). If the check fails, the user is offered a chance to exit the application, step 2303, pause and manually tweak the inputs, step 2318, or just ignore the check and continue with the next step.

Figure 29B:
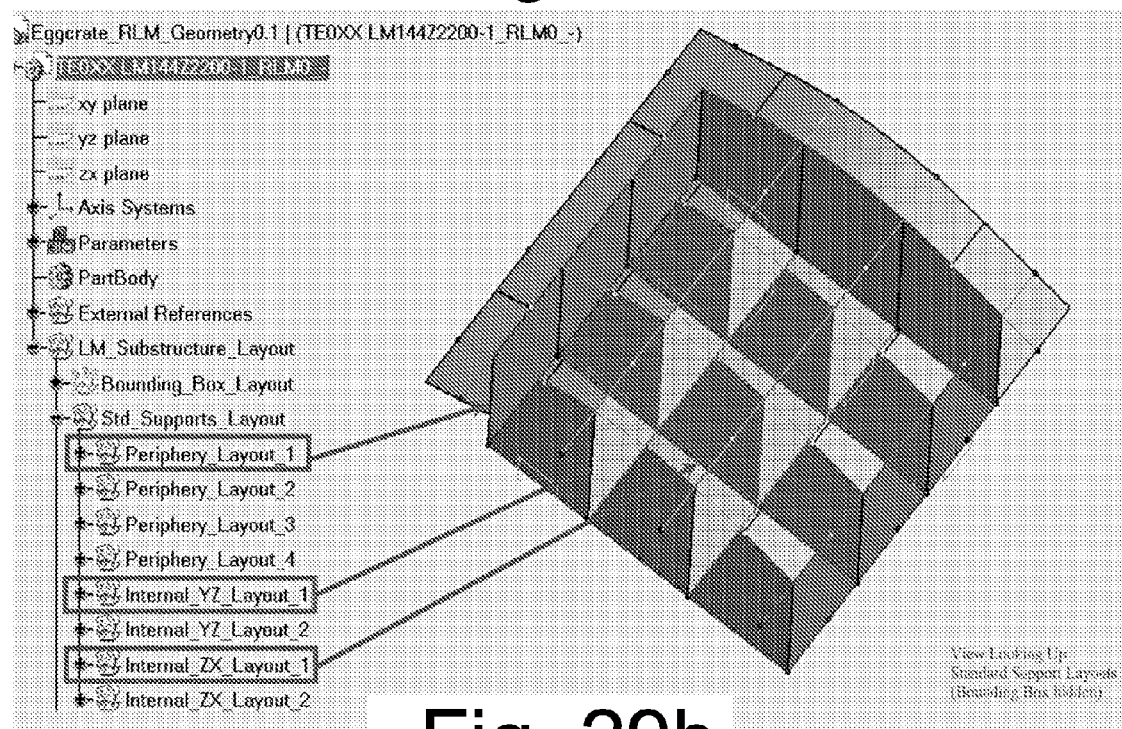

In this embodiment, the next step, step 2304, is to define the sketch-based inputs for the Standard Supports. A Standard Support is defined as any full height support. It is important to note that the application will allow any Standard Support to be converted to a Bottom Contour Support or vise versa. In the LMKBE application's implementation of the present invention, the user can define standard Support Layouts, such as, but not limited to, Periphery supports, Internal Headers & Intercostal supports, as shown in FIG. 29B.

Figure 24:
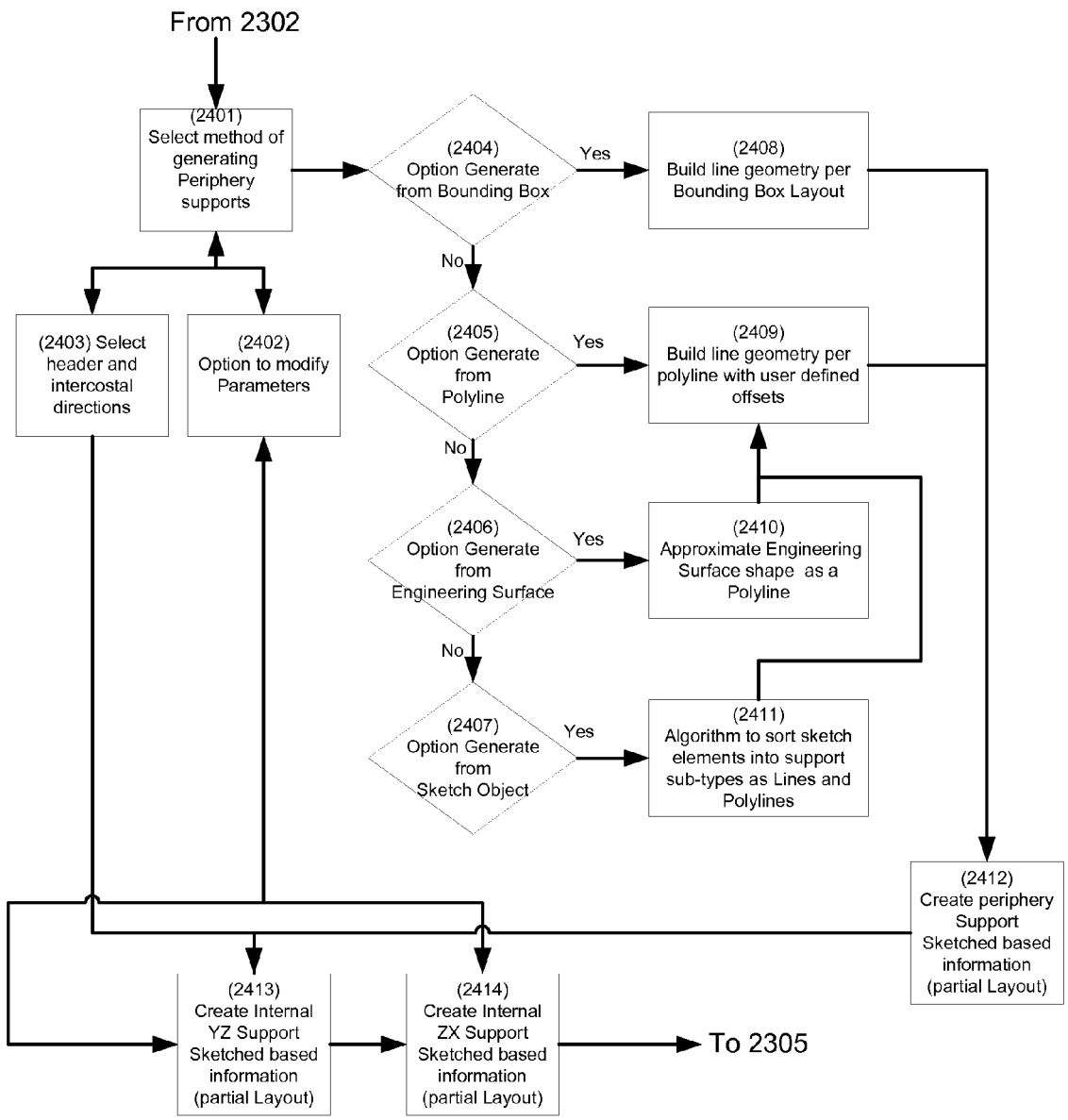
FIG. 24 is a flow chart showing a process of generating sketch-based layouts of periphery and internal support components of a substructure according to one embodiment consistent with the present invention.
Figure 29C:
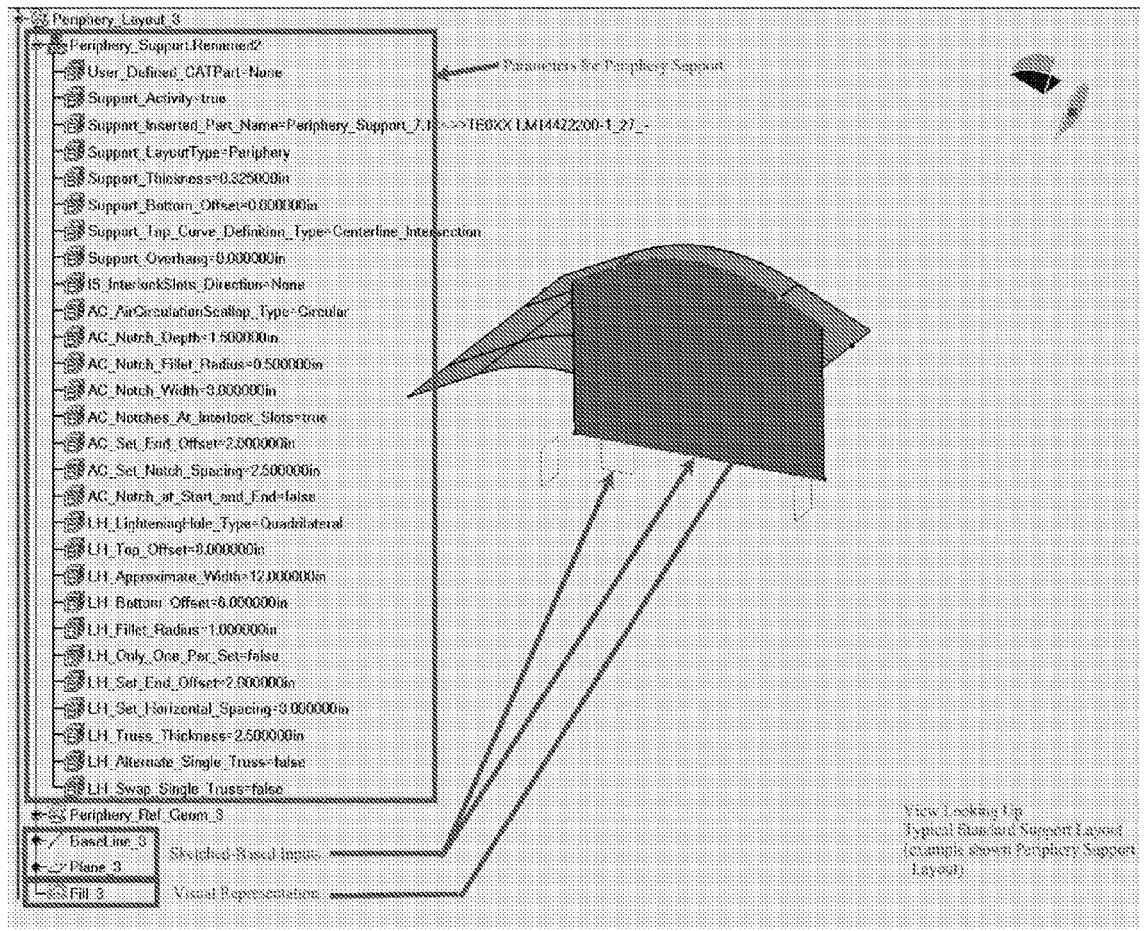

A detailed flow of step 2304 is shown in FIG. 24. In this embodiment, step 2304 creates a partial layout for each support type that contains all the eggcrate sketch input, such as geometry, specifications, and parameters, and information for a Standard Support, as shown in FIG. 29C. Before selecting the method to generate periphery support layouts in step 2401, the application 2100 allows the user to select the directions of the Internal Intercostals and Internal Headers at a step 2403, including the options of orienting in the YZ plane or XZ plane where the axes are based on the user defined input in step 2108. The application 2100 also provides the option to change support parameters, step 2402. It may be appreciated that step 2402 is available before any of the creation processes, steps 2401, 2413, & 2414. In step 2401, the user is asked to select one of 4 options, as follows:

Option 2404, Generate from Bounding Box, builds the input geometry directly from the bounding box geometry, steps 2408 & 2412. Each of the four base lines of the bounding box translates to a Periphery Layout node in the CAD Specification Tree. In addition the orientation plane of that periphery is defaulted to the bounding box plane (see next step 2412).

Option 2405, Generate from Polyline (CAD element), per step 2408, the LMKBE application 2100 projects any Polyline onto the floor plane (defined in step 2301) and then builds the Line geometry offset in plane from the Polyline parametrically, thus the user has the option to change the offset values for each line later in the process (reference step 2412). Each offset Line created from a Polyline edge translates into a Periphery Layout node in the CAD Specification Tree (see next step 2412).

Option 2406, Generate from Engineering Surface, the LMKBE application 2100 projects the boundary of the surface onto the Floor Plane where it is then best fit to a Polyline using a generic faceting algorithm. The next step, step 2409 described above, is building the sketch-based layout geometry from the Polyline.

Option 2407, Generate from Sketch Object (CAD object containing multiple elements in a single plane), the user supplies a Sketch Object created outside of the application. As described more fully above, for easy sketch-based layout creation consistent with the present invention, this option allows the user's input Sketch Object to contain centerline data for, in one embodiment, both the periphery support layouts and the internal support layouts, where the internal support layout geometry is optional. This data follows the above-noted sketch-based input data specification. The LMKBE application 2100 searches the input sketch object for the Profile (CAD element internal to Sketch Object) and creates a Polyline from that object representing periphery support locations. This data is then sent to step 2409. It also searches the Sketch Object for Line Outputs (CAD elements internal to Sketch Object) representing internal support locations. Because the internal supports need to be interlocked they must be categorized as a Header or an Intercostal. It is preferred that no two like internal supports of the same subtype, such as but not limited to header or intercostal, cross each other, thus the application runs a custom algorithm to determine which direction in plane best suits the requirements. These line outputs are then sorted per a custom algorithm and the data is then presented to the user as a default for possible override in steps 2413 & 2414.

Regardless of the option chosen, the lines, or BLOCs (Bottom Location, defined as an object within the application that represents the "to be" geometry) as described above, generated from these processes are feed into step 2412. In step 2412, a layout node is created in the tree for each line and then populated with a parameters set in step 2402. The partial layout for each support will contain a Base Line and an Orientation Plane. This is the Sketch-based information used as the input to the temporary Resolution Model (see steps 2306, 2310 & 2371). In steps 2413 & 2414, the LMKBE application 2100 generates sketch-based geometry and parameter sets for the Internal Support per the selected directions in step 2403.

With continued reference to FIG. 23, the next step 2306 sorts initial sketch input geometry for the standard supports using a temporary Resolution model which is a custom algorithm made up of the Q-Periphery process as described above, (see FIGS. 11, 12, 13A & 13B). In step 2307, the joint information is retrieved from the temporary Resolution Model and used to define the existing relationships between each support layout. With the temporary Resolution Model data the end conditions are determined based on an adjacent support layout's orientation plane. The top is constrained by a curve that is created by an intersection of the support layout's orientation plane and the eggcrate surface. Using this data and the parameters a closed wire-frame shape is created and from it a planar surface to provide a visual representation of the support. The geometry created here will react to modifications the user makes to any of the sketch-based layout inputs or to the support's layout parameters. This completes the Layouts for all the Standard Supports.

Next, in step 2308, the LMKBE application 2100 generates a Surface Bounding Box Layout by using the Bounding Box orientation planes from step 2301 and intersecting them with the eggcrate surface creating four curves on the surface. These four curves are then intersected with each of the Standard support layout's orientation plane to generate a set of standard support intersection points.

Figure 25:
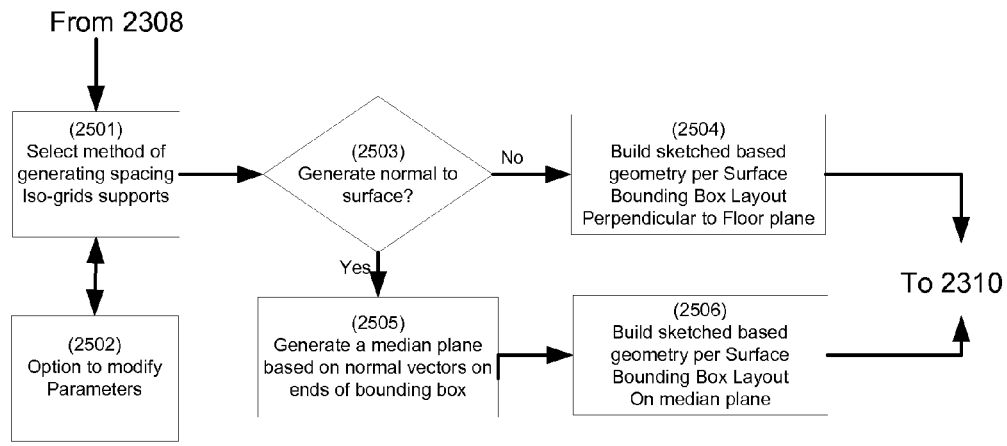
FIG. 25 is a flow chart showing a process of generating sketch-based "Iso-Grid" layouts of contoured bottom components of a substructure according to one embodiment consistent with the present invention.

In step 2309, creating Iso-Grid Support's Sketch-based information is diagramed in FIG. 25. This complete process is run twice to define the bottom contoured support layouts running parallel to the internal support in the YZ direction specified in step 2413, and then again for the bottom contoured support running parallel to the XZ in step 2414. Prior to step 2501, the user has the option to modify the parameters (ref step 2502).

In step 2501 the user selects a method of spacing the iso-grid either between the standard supports or independent of the standard supports. If the option is between the standard supports the following process is repeated between each of the standard support intersection points defined in step 2308. The user then identifies if the supports are to be oriented normal to the eggcrate surface step 2503. In steps 2503 & 2505, if the support is to be normal to eggcrate surface, the LMKBE application 2100 will create an orientation plane based on the average of two normal vectors at the end points that intersect the Surface Bounding Box's curves (geometry created in step 2308), else in steps 2503 & 2504 the application builds the orientation plane perpendicular to the Floor Plane (geometry created in step 2301). The sketch-based input line for the bottom contoured support is based off the same end points that intersect the Surface Bounding Box's curves and is then trimmed by the periphery support layout (geometry created in step 2304).

Figure 29D:
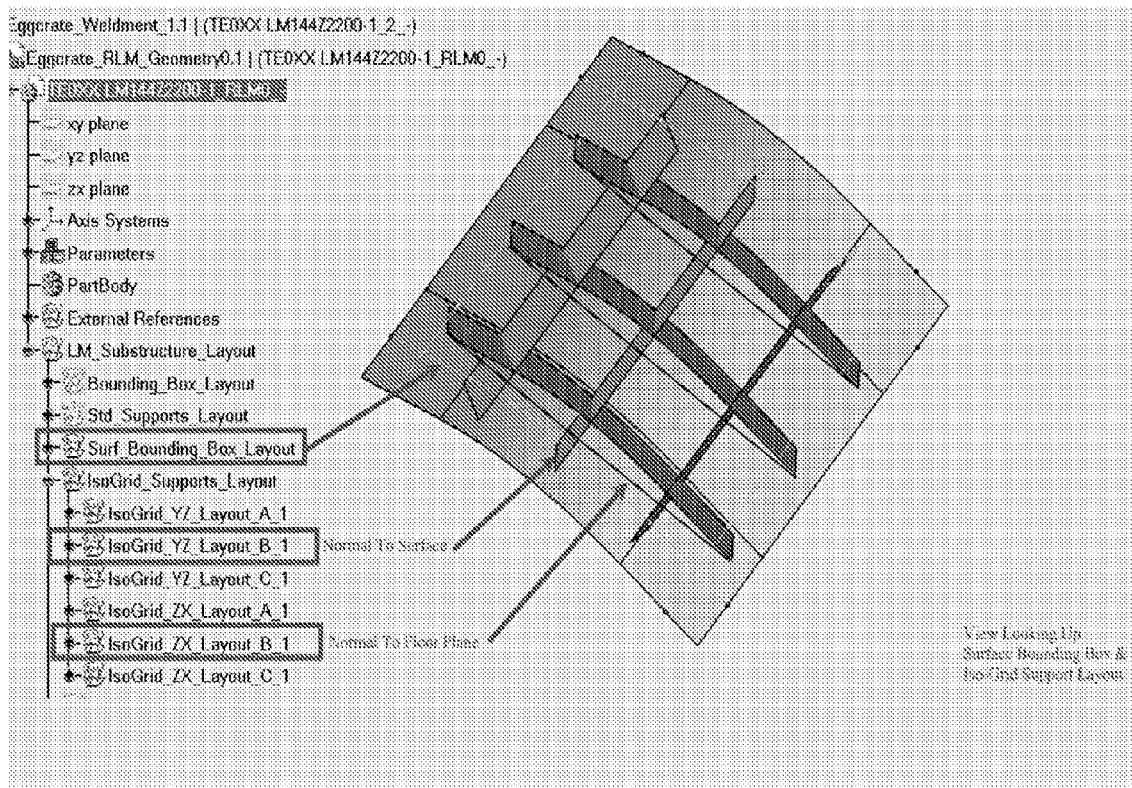
Figure 29E:
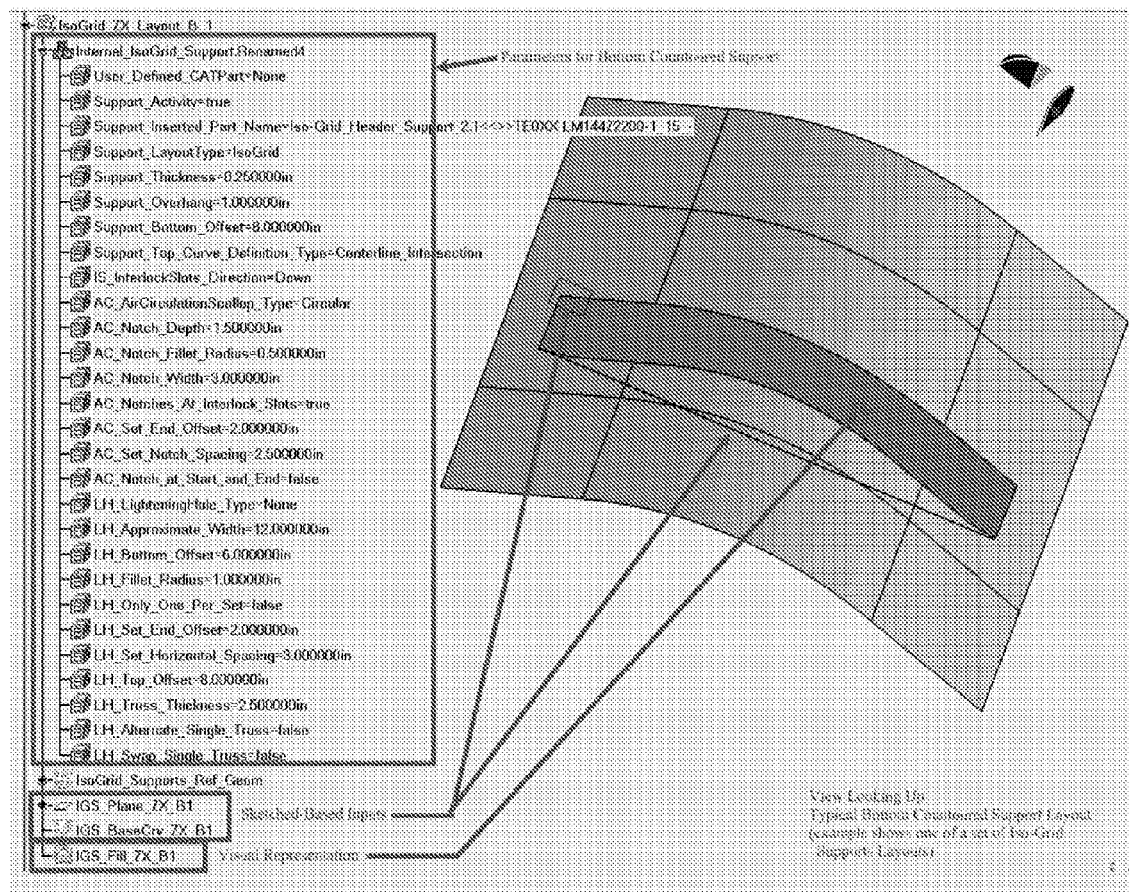

In step 2310, the joint information for the Iso-Grids and Periphery Supports is retrieved from a temporary Resolution Model. The temporary Resolution Model data is used in Step 2311 to trim or extend the lengths of the Iso-grid base lines based on the layout geometry and specifications of the periphery supports. At this point in the process 2100, all of the layouts for the supports are complete, as shown in FIGS. 29B, 29D & 29E.

Figure 29F:
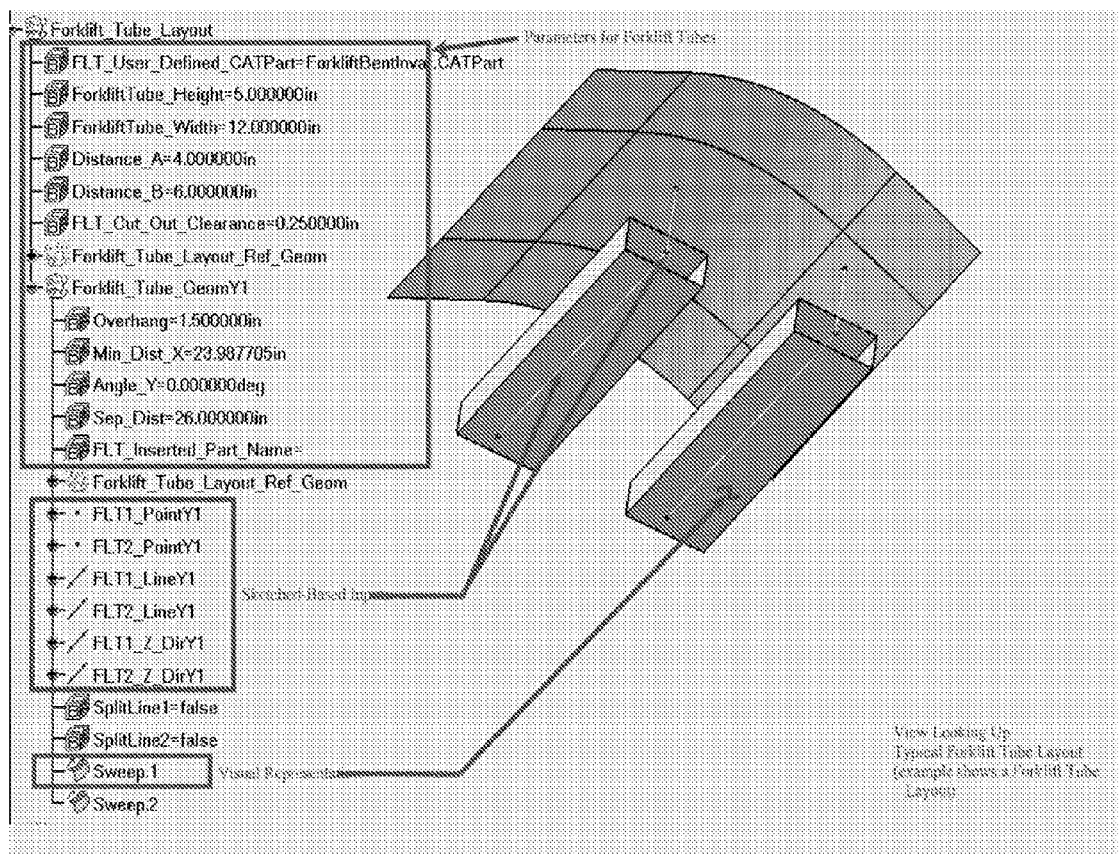

Next, optional step 2312 may be used to create a Layout set to define the position of the substructure's Forklift Tube Pairs, as depicted in FIG. 29F. The LMKBE application 2100 uses the Bounding Box Layout to define an area for locating and spacing the forklift tube pairs. These layouts can be stacked in two directions, X or Y, split if a side of the bounding box exceeds user maximum length, or even angled, providing great flexibility to the user. In addition, the application 2100 may analyze the positions of the forklift tubes relative to the all Supports and then adjust any supports (defined by parameter within that supports Layout geometry) interfering with the forklift tubes. As shown in FIG. 29F, in one embodiment, a representation may be created using a CAD surface shaped like a rectangular tube that is linked to the parameters.

Figure 29G:
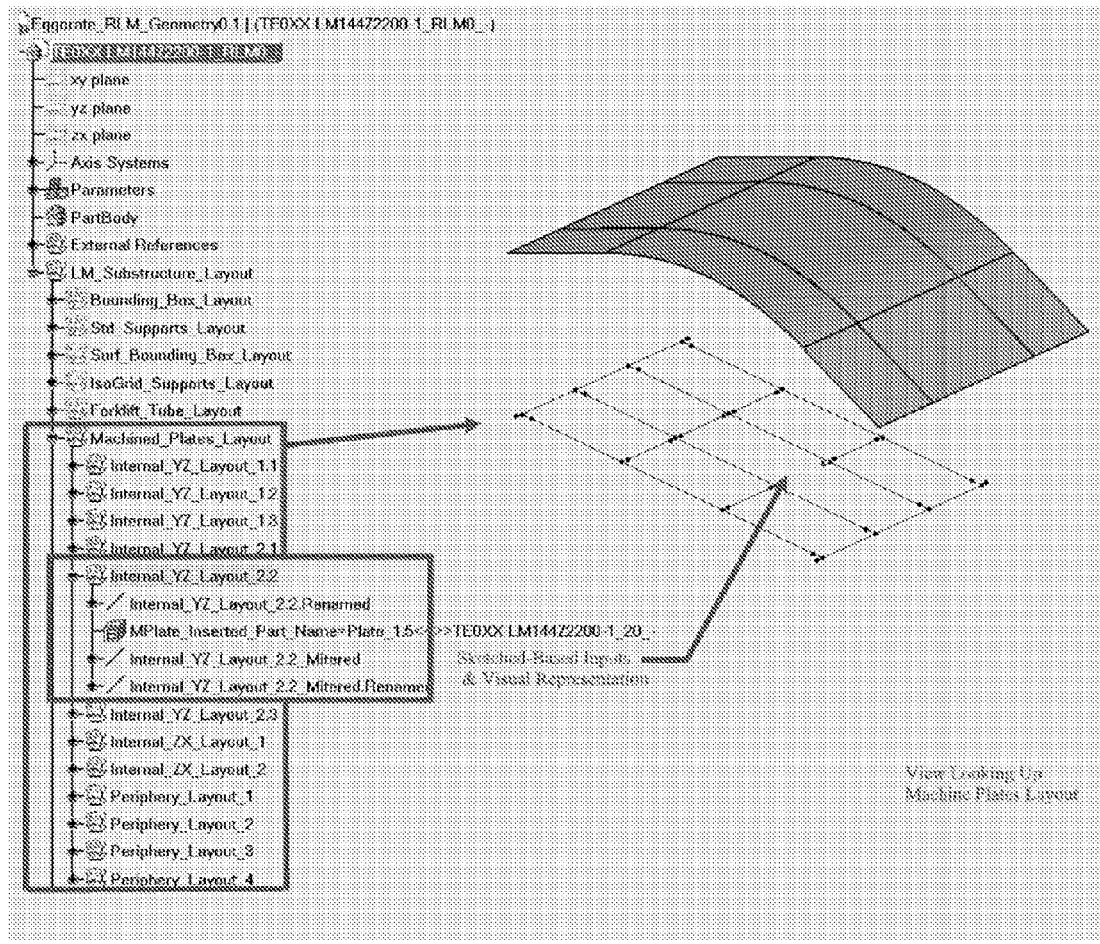
Figure 29H:
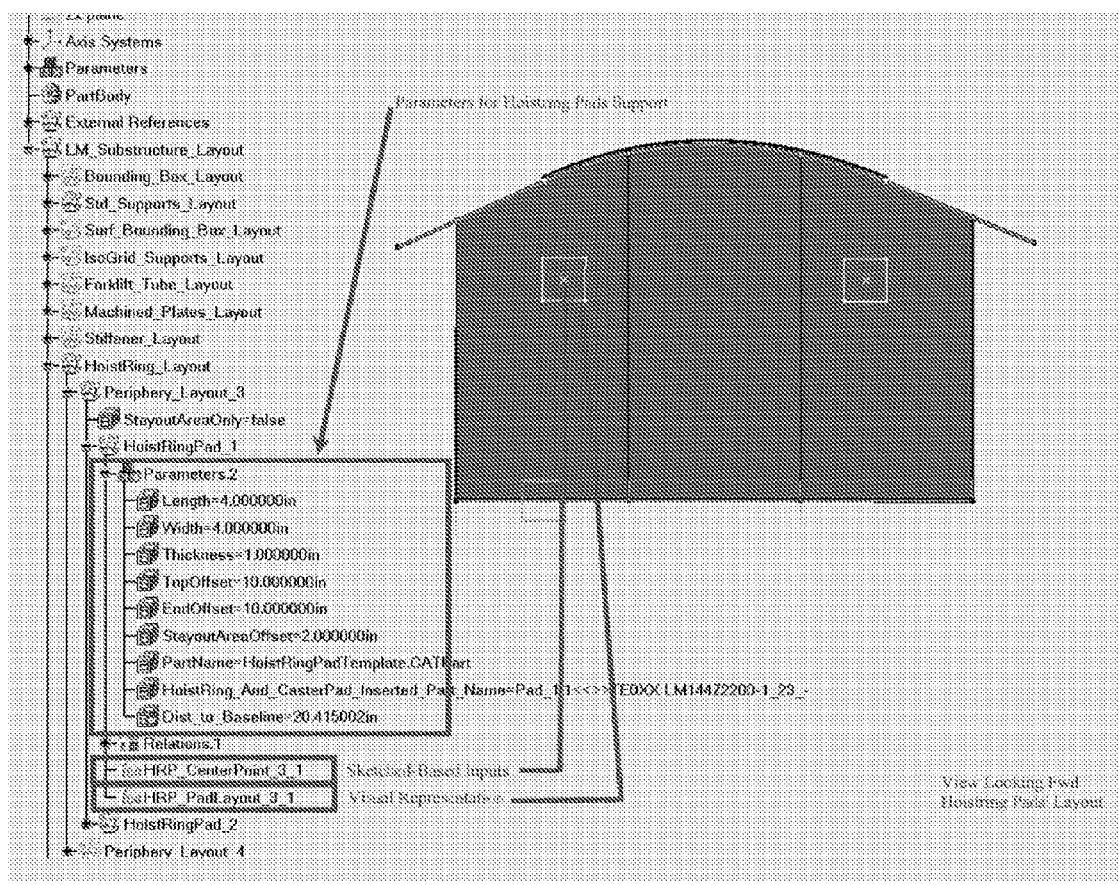
Figure 29I:
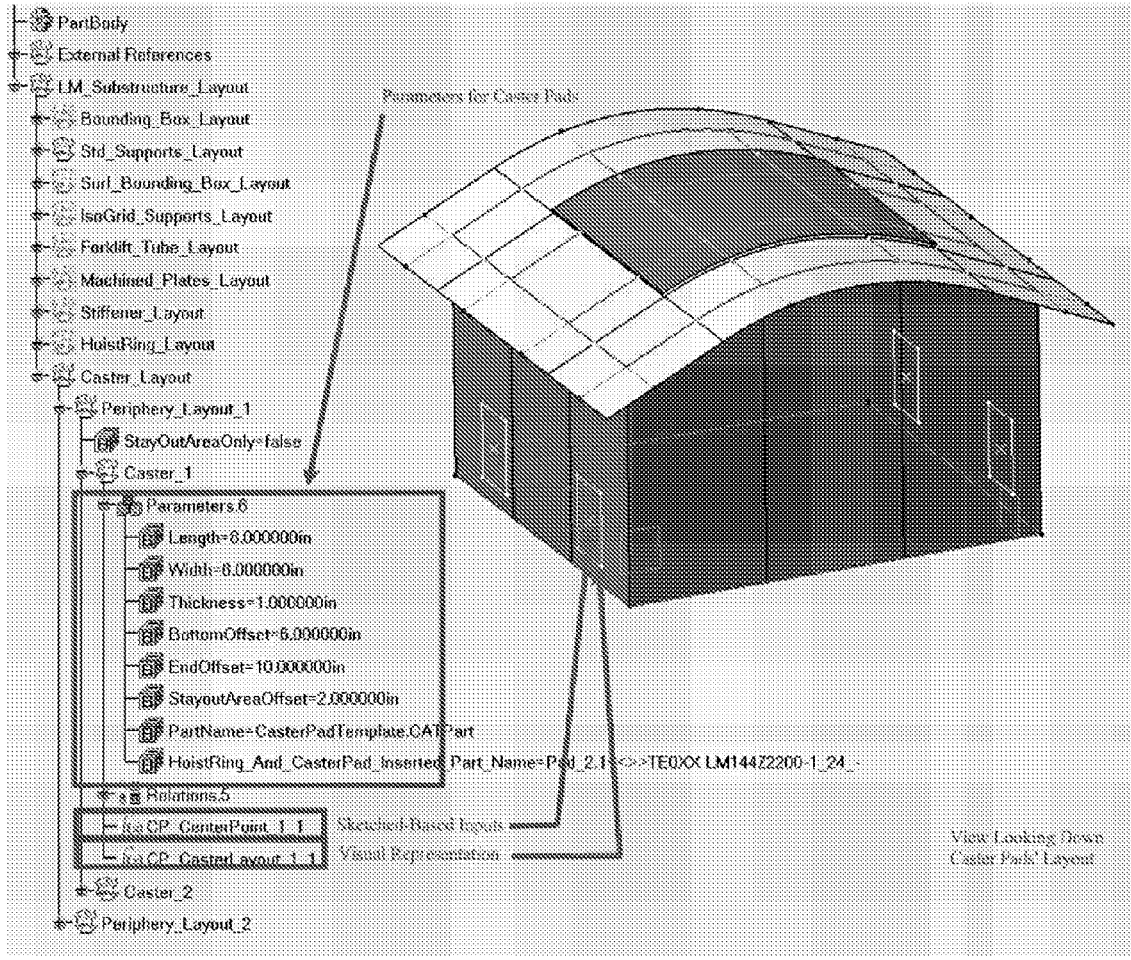
Figure 29J:
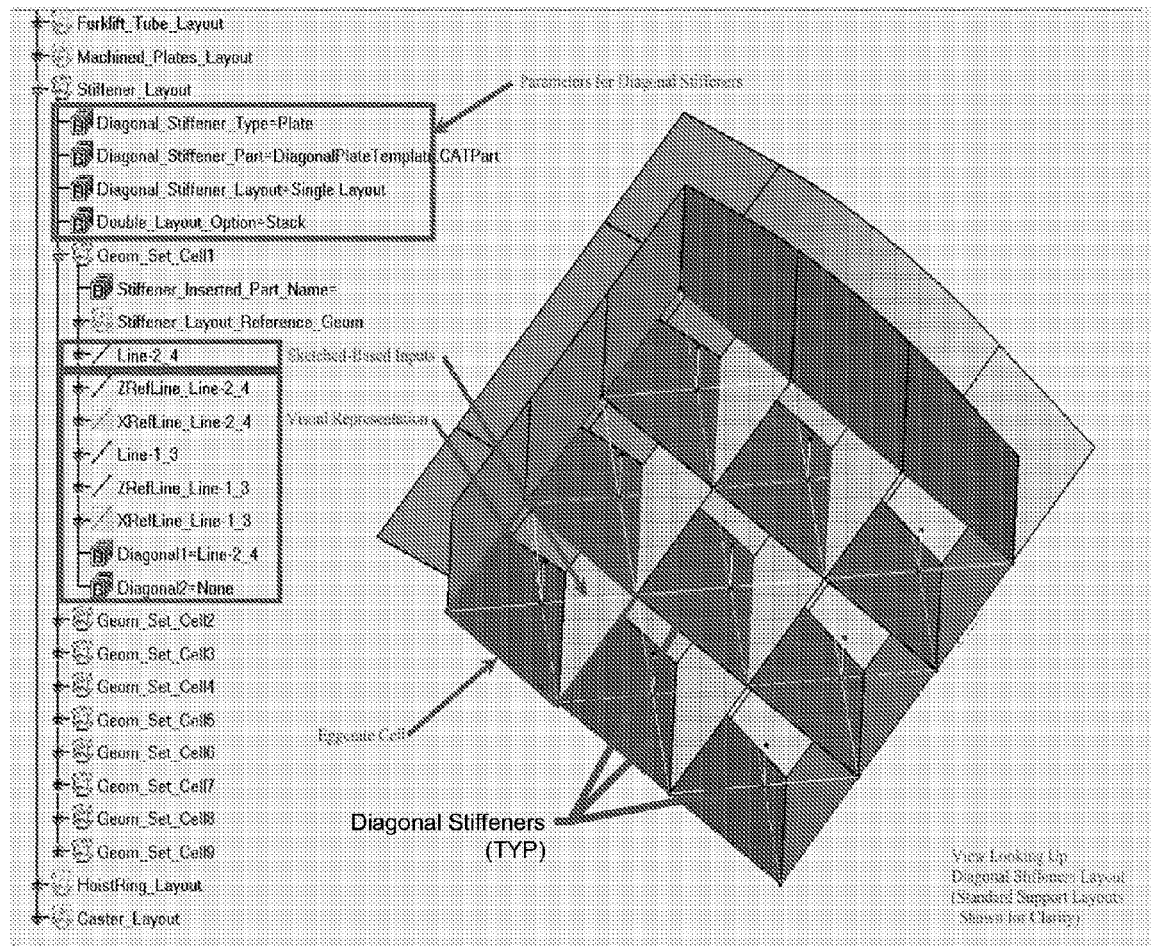

An optional step 2313 creates a Layout set to define the position of the substructure's Diagonal Stiffeners, as depicted in FIG. 29J. The LMKBE application 2100 uses a temporary Resolution Model with geometry and specifications from all the support layouts and the forklift tube layouts to define the closed "egg-cells" (see FIG. 17) in the eggcrate (this step is consistent with previous claims). Within each cell a set of diagonal stiffeners is suggested. There are options to have double or single diagonals in each cell. Where the cell contains more than four corners, the application will chose the best diagonal configuration. The user may change the configurations by editing the specifications in the layout.

The LMKBE application 2100 also provides an algorithm that will alter the pattern for single diagonal configuration, thus mimicking a truss structure. The LMKBE application 2100 may also provide the option of stacking or interlocking when two diagonals are generated in one cell. A representation is created in the layout using a CAD lines indicating the locations the structural element will be placed and their orientation An optional step 2314 creates a Layout set to define the positions of the substructure's Machine Plates or Pads, as depicted in FIG. 29G. The LMKBE application 2100 uses a temporary Resolution Model with all geometry from all previous layout components to place and segment line geometry representing the position, approximate length, and orientation of the Machine plates and point geometry to represent the position of Machine Pads within the layout.

As shown in FIG. 29H, an optional step 2315 creates a Layout set to define the positions of the substructure's Hoist ring Pads. The LMKBE application 2100 provides options to place as many pads as desired on any of the periphery supports with either a constant offset form surface or a minimum offset from surface with constant height from the floor plane. In one embodiment, each layout is represented with a rectangular shape based on the parameters for that pad.

Optional step 2316 creates a Layout set to define the positions of the substructure's Caster Pads, as shown in FIG. 29I. The LMKBE application 2100 provides options to place as many pads as desired on any of the periphery supports at a constant offset form the floor plane. Again, in one particular embodiment, each layout is represented with a rectangular shape based on the parameters for that pad.

Solve and Finalize Layout

Figure 29K:
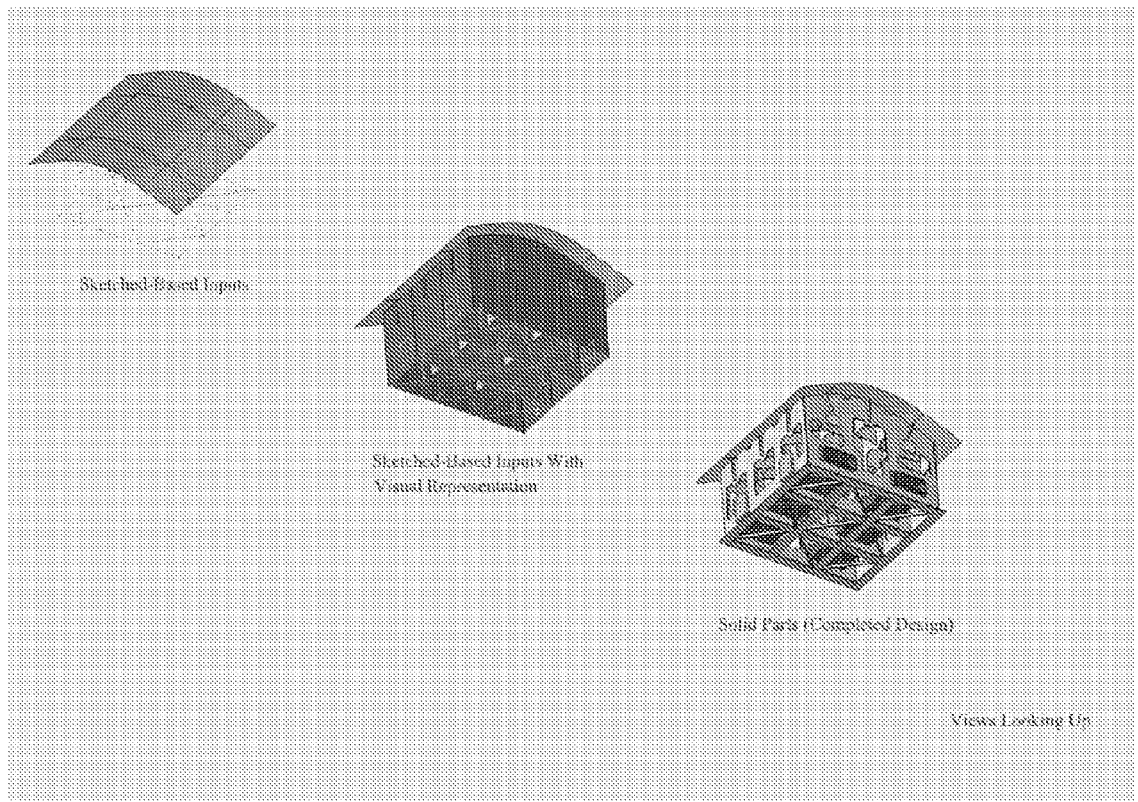

Referring to FIG. 21, step 2110, the layouts of as used in one embodiment of the invention, periphery supports, internal header and intercostal supports, Iso-Grid contoured bottom header and intercostal supports, forklift tubes, standard diagonals, snap-to diagonals, and machined plates are solved and finalized using various Resolution Models. This builds upon the previously-described algorithms for solving 3D sketch-based eggcrate substructures. FIG. 29K shows one embodiment of a completed sketch-based inputs layout, a sketch-based inputs layout with visual representation, and a completed design including solid parts.

Figure 31:
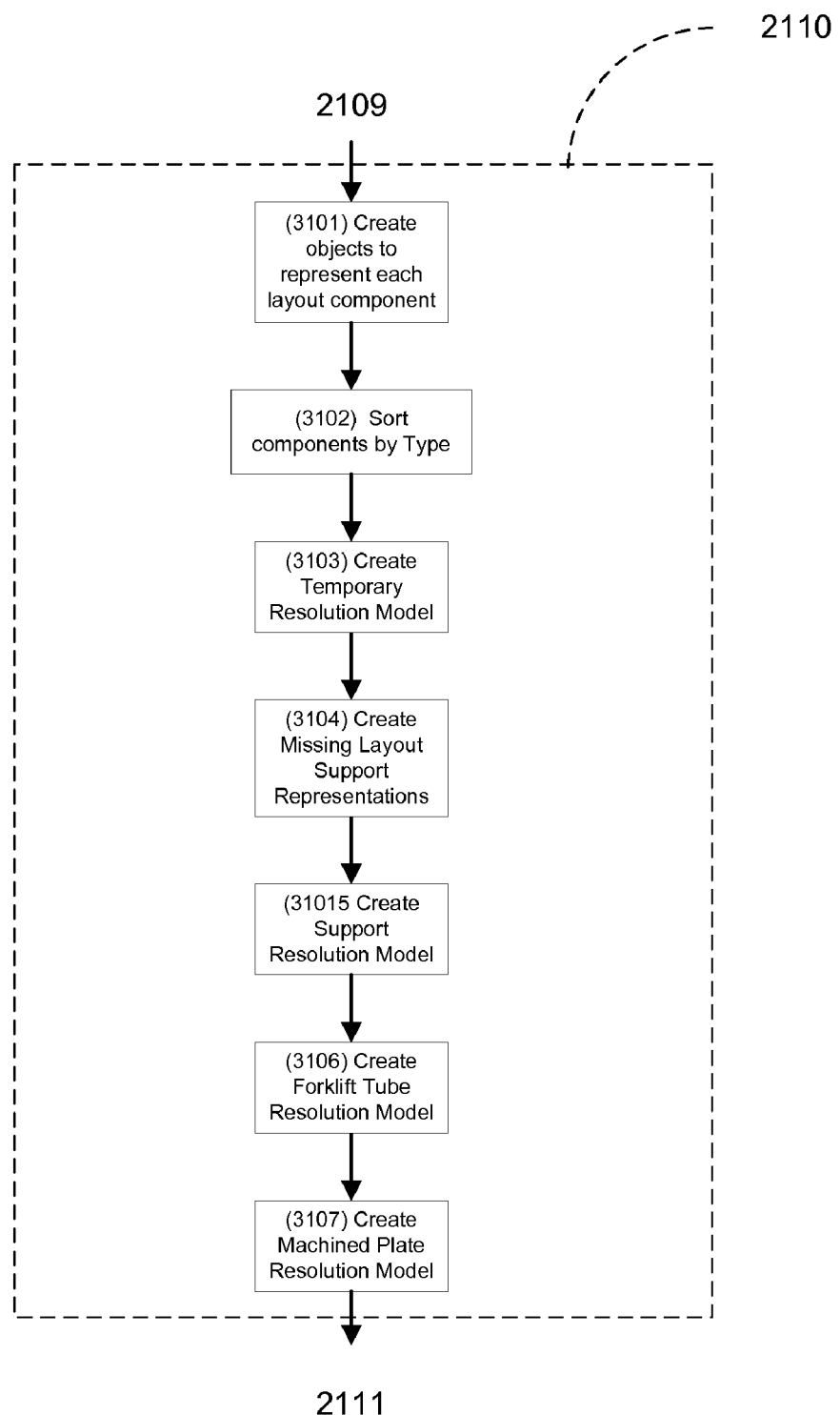
FIG. 31 is a flowchart depicting a process for solving and finalizing resolution models in accordance with an embodiment of the invention.

More specifically, FIG. 31 shows an embodiment of the solving and finalizing of the Resolution Models. As shown in FIG. 31, objects are created to represent each layout component for Resolution Models at step 3101. The objects are then sorted by each object's layout component type. In one embodiment of the present invention, a temporary Resolution Model is created and solved, step 3103, and used to create any missing support surface representations, step 3104. Then in step 3105, a Resolution Model is created and solved for the support layouts.

Next, at step 3106, a Resolution Model is created and solved for any forklift tube layouts. At step 3107, a Resolution Model is solved for any machined plates. The layout components may be sorted by type in an alternate embodiment of this step. In one embodiment, the Resolution Model uses BLOC objects to represent the various layout components. The BLOC objects may be used to solve for, in one embodiment of the present invention, Butt Joints, Interlock Slot Joints, Interference Joints, length, orientation and end conditions of each of the BLOCs. The Resolution Models of the various layout components along with the created CAD layouts are utilized to generate solid parts with features such as, but not limited to, interlock slots, stayout areas, lightening holes, air circulation notches, forklift tube cutouts, hoist ring pads, and caster pads that will produce the eggcrate substructure design. Incremental solving using various Resolution Models of the sketch-based layouts is also conducted during the previously-described layout creation processes.

Inserting Parts

In Step 2111, in any desired order, solid part templates are used to represent the various solid components, such as, but not limited to, periphery supports, internal header and intercostals supports, Iso-Grid header and Iso-Grid intercostals supports, forklift tubes, caster pads, machine plates, machine pads, hoist ring pads, and lightening hole T-stiffeners, of an eggcrate substructure. Each part template consists of a set of input specification parameters and geometry elements. These input requirements are matched up with the part templates corresponding layout and the specifications in memory resulting from the finalized resolution of the layout. In one particular embodiment, a part template is inserted into the eggcrate substructure and then positioned and named according to the sketch-based layout. The part's input parameters as set and the required part features' input geometry inserted into the part based on the layout and resolution specifications.

Supports are the main components making up the substructure and require solid features to be added to the inserted support template to complete their design. These features are commonly referred to as User Defined Features (UDF) or smart features. Various CAD systems have different implementations of UDFs or smart features and this present invention's application implements them as CATIA v5's UDFs. Each of these features serves a different purpose in regard to the eggcrate substructure and would normally take a designer a considerable amount of time to create independently of this present invention's application.

A support parts unique features such as, but not limited to, interlock slots, air circulation notches, lightening holes, forklift tube cutouts and various stayout areas are added by inserting UDFs into the part using parameters and geometry previously created within the part.

Stayout Areas

As a continuation and extension of stayout area solids, as described above, and to accommodate CATIA v5 parametric processes, stayout areas are implemented in one embodiment of the invention's interactive application (see FIGS. 21, 26, & 27) as UDFs with an output of a planar wireframe element. Various CAD systems have different implementations of UDFs or smart features and the stayout area process is applicable to these various implementations. The Layout may contain both parameter and geometric elements describing the location and function of both eggcrate and non-eggcrate weldment features within the structure. Stayout areas, in one embodiment of the invention, are used to accommodate these features within the individual eggcrate parts.

Stayout area UDFs consist of a set of standard input parameters that include but are not limited to:
  Stayout Area Active (Boolean) Controls the use of the stayout area;
  Stayout Area Offset (Length) Specifies the clearance distance (see FIG. 23 and Stayout Area Added Clearance as described above)
  Fillet Stayout Area (Boolean) Controls whether the final profile is to be filleted with a radius equal to the offset; and
  an output geometric element consisting of a closed planar wireframe profile.

Additional parameters, formulas and rules may be used to control the final shape of the stayout area and the stayout area may require other geometric elements as inputs to locate and control its shape.

Figure 26:
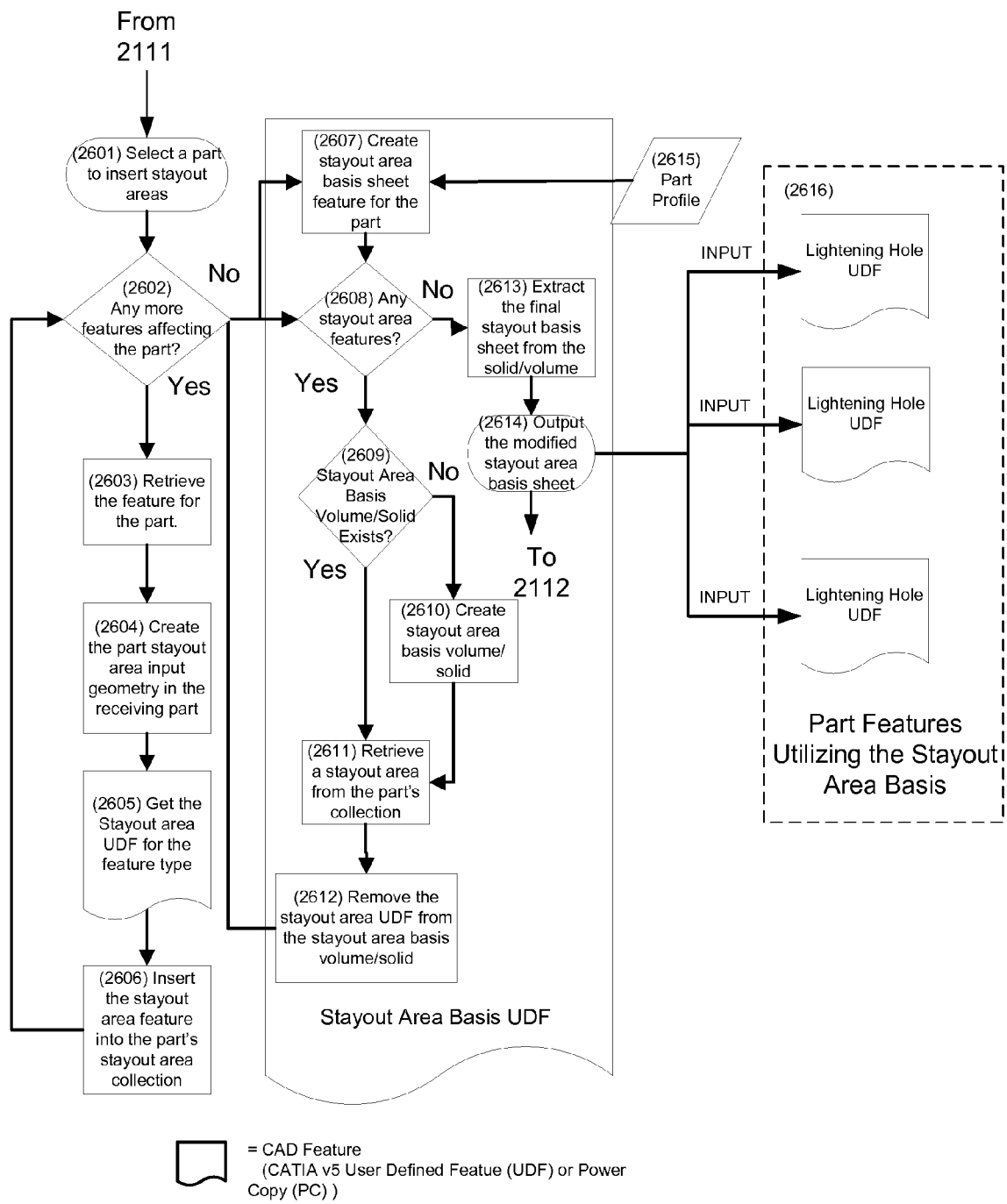
FIG. 26 is a flow chart showing a process that may be used to provide stayout areas that represent other assembly features affecting a part within said part and create a stayout area basis used for lightening holes according to one embodiment consistent with the present invention.

Referring to FIG. 26, a part, its corresponding layout representation, and any features affecting the part in the layout are selected. Based on the eggcrate substructure's layout requirement, stayout area geometric and parameter inputs are created in the part, step 2604.

Next, a stayout area UDF template of a type based on the layout and part is obtained from a file or database, step 2605. The stayout area UDF is then inserted into the part using the said geometric and parameter inputs and updated to form the stayout area object, step 2606. The process 2100 continues until all of the stayout areas are inserted for the part.

At step 2607, the stayout area basis object checks for any existing stayout area UDFs within the part. If no stayout areas exist, the stayout area basis object outputs its basis sheet unchanged, step 2613. If stayout areas exist, step 2609, a volume or solid is created using the stayout area basis sheet to be used as the basis in a series of remove Boolean operations. A stayout area is retrieved from the collection and its profile used to create a volume or solid which is then removed, step 2612, from the basis volume/solid. When all of the stayout area UDFs from the collection have been removed from said basis, the resulting stayout area basis volume/solid is intersected to extract a final output sheet, step 2213. The extraction of a profile sheet, step 2213, may or may not be required depending on the part's requirements.

Figure 27:
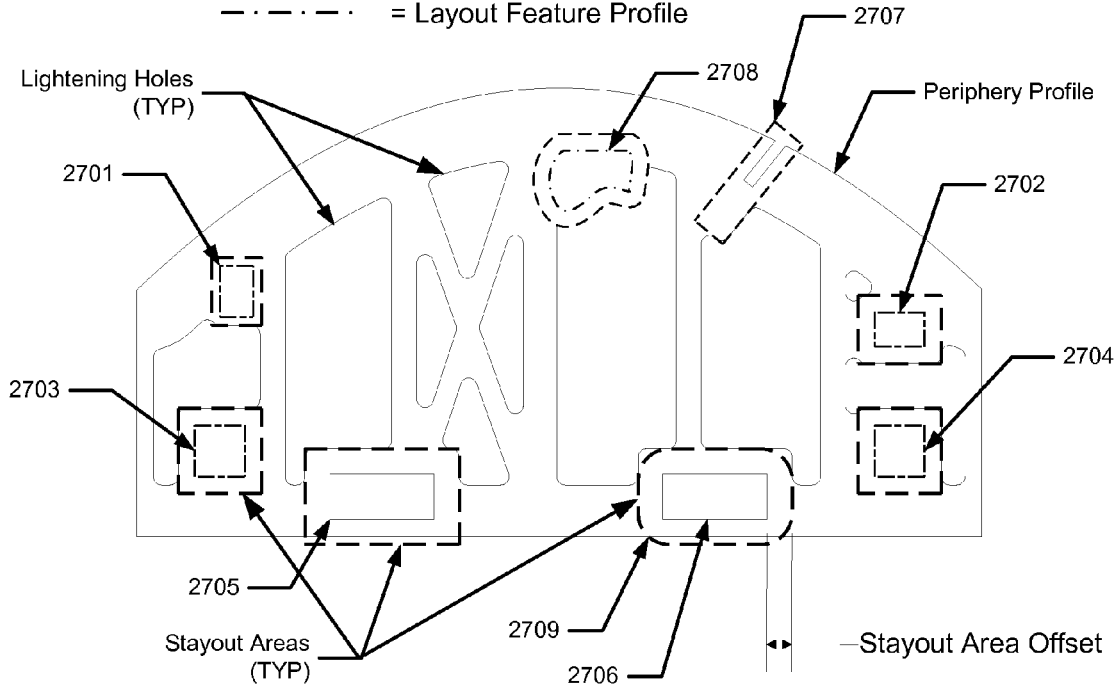
FIG. 27 is a front view of a part implementing the stay-out area process to automatically accommodate assembly features within a part according to one embodiment consistent with the present invention.

The final profile sheet is then used as an input to other part features, such as lightening holes, in both the interactive and batch application's implementations of the present invention. FIG. 27 is one example of a part implementing the stayout area process using different sub-types of stayout areas UDFs, including but not limited to, hoist rings pads, step 2701 & 2702, with different stayout area offset, caster mounting plates, steps 2703 & 2704, forklift tube cutouts, steps 2705 & 2706, interlock slot, step 2707, and a generic stayout area, step 2708.

A user may, at their discretion, utilize the stayout area process manually to accommodate other features not provided by the interactive application. They may create custom stayout area UDFs conforming to the stayout area specification.

When all of the solid parts and their UDF features have been added to the eggcrate substructure the user is presented with the option of viewing and/or saving the specification parameters, step 2112, used in the current session as a unique set under a descriptive name to represent a user eggcrate substructure style or type. This type specification can then be reused as an input style (FIG. 21, step 2106) when creating another eggcrate substructure in a future session of the LMKBE application 2100.

Referring to FIG. 21, step 2113, upon finishing a complete eggcrate substructure the user can review the final design, and at their discretion make modifications to the specifications, in both the layout and inserted parts, and/or delete inserted parts, and then restart the process/system to initialize the checking of the status of the design (see FIG. 21, step 2103, & FIG. 22).

Representative Computing System

Figure 32:
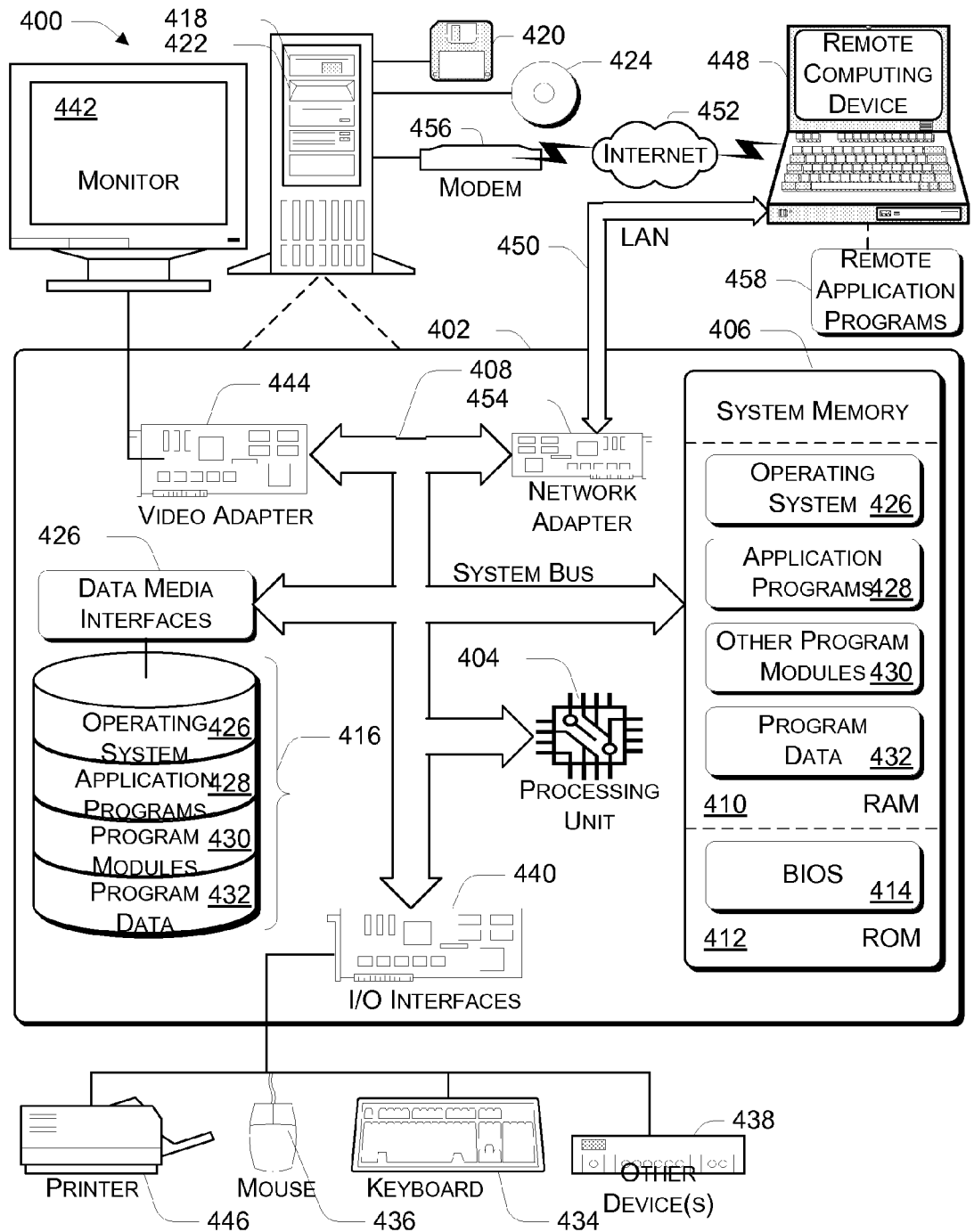
FIG. 32 illustrates a general computer environment, which can be used to implement the techniques described herein.

FIG. 32 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 (which may include the content repository 112 of FIG. 1) includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 32 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can alo be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, including any of the methods and processes described above in accordance with the present invention (such as the process 2100 of FIG. 21), other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

One of ordinary skill in the art would appreciate that the above-described embodiments of the invention are merely possible examples of implementations which are set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

Thus, while preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of creating a design of a sketch-based eggcrate substructure for manufacturing composite parts, comprising:
providing an input model from a plurality of inputs, including:
providing a layout geometry; and
providing a specification data structure;
creating, via a processor, a resolution model of the input model, including:
interpolating the layout geometry;
interpolating the specification data structure; and
defining the eggcrate substructure having a plurality of closed egg-cells based on the interpolated layout geometry and the interpolated specification data structure;
finalizing a layout using the resolution model; and
providing one or more solid components into the finalized resolution model to create the design.

2. The method according to claim 1, wherein providing an input model from a plurality of inputs includes at least one of:
creating at least a portion of the input model;
determining that at least a portion of a previous input model exists; and
selecting at least a portion of the previous input model.

3. The method according to claim 1, wherein providing an input model from a plurality of inputs includes defining at least one of a layout style, a set of file management options, and an input geometry.

4. The method according to claim 1, wherein providing an input model from a plurality of inputs includes:
defining a bounding box layout;
determining whether the bounding box layout intersects an eggcrate surface;
defining at least one standard support input portion, including:
creating a sketch-based standard support information;
providing a temporary resolution model; and
defining a standard support representation;
defining a surface bounding box layout; and
defining at least one iso-grid input portion, including:
creating a sketch-based iso-grid information;
providing another temporary resolution model; and
defining an iso-grid support representation.

5. The method according to claim 1, wherein defining the eggcrate substructure includes suggesting a set of diagonal stiffeners for each cell of the plurality of closed egg-cells in the eggcrate substructure.

6. The method according to claim 1, wherein creating a resolution model of the input model includes creating a resolution model based on one or more sketch-based components.

7. The method according to claim 1, wherein creating a resolution model of the input model includes simultaneously creating a resolution model of the input model as the input model is interactively modified by a user.

8. The method according to claim 1, wherein creating a resolution model of the input model includes at least one of:
creating a temporary resolution model of a standard support portion;
creating a temporary resolution model of an iso-grid support portion;
creating a temporary resolution model of a forklift tube portion; and
creating a temporary resolution model of a machine plate layout portion.

9. The method according to claim 1, wherein at least one of creating a resolution model and finalizing the resolution model includes at least one of trimming and extending a support representation.

10. The method according to claim 1, wherein finalizing the layout using the resolution model includes finalizing the layout using one or more temporary resolution models and a final resolution model.

11. The method according to claim 1, wherein finalizing the layout using the resolution model includes:
for one or more components of the resolution model, creating an object to represent each component;
creating a temporary resolution model of the one or more objects; and
solving the temporary resolution models for the one or more objects.

12. The method according to claim 11, wherein solving the temporary resolution model includes solving at least one of:
a support resolution model for one or more objects representing support layouts;
a forklift resolution model for one or more objects representing forklift tube layouts; and
a machined plate resolution model for one or more objects representing machined plate layouts.

13. The method according to claim 1, wherein providing one or more solid components includes providing in any desired order a solid component of at least one of a periphery support, an internal support header, an internal support intercostal, an iso-grid header, an iso-grid intercostal, a standard diagonal, a snap-to diagonal, a forklift tube, a caster pad, a machine plate, a machine pad, a hoist ring pad, and a lightening hole T-stiffener.

14. The method according to claim 1, wherein providing one or more solid components includes:
defining one or more stayout areas; and
adjusting a definition of at least one solid component to accommodate the one or more stayout areas.

15. The method according to claim 14, wherein defining one or more stayout areas includes providing one or more user-defined features to define one or more stayout areas.

16. The method according to claim 14, wherein defining one or more stayout areas includes:
creating a stayout area basis sheet for a solid part;
retrieving a stayout area from a collection associated with the solid part;
removing the one or more stayout areas from the stayout area basis sheet; and
using the modified stayout area basis sheet.

17. One or more computer-readable media comprising computer executable instructions that, when executed by one or more processors, cause the one or more processors to perform a method of creating a design, comprising:
providing an input model from a plurality of inputs, including:
providing a layout geometry; and
providing a specification data structure;
creating a resolution model of the input model, including:
interpolating the layout geometry;
interpolating the specification data structure;
defining an eggcrate substructure having a plurality of closed egg-cells;
selecting a double or single diagonal stiffener for at least one of the cells of the plurality of closed egg-cells; and
altering a pattern of at least one single diagonal stiffener to mimic a truss structure;

finalizing a layout using the resolution model; and
providing one or more solid components into the finalized resolution model to create the design.

18. The computer-readable media according to claim 17, wherein finalizing the layout using the resolution model includes finalizing the layout using one or more temporary resolution models and a final resolution model.

19. A computer-based system, comprising computer readable storage medium, for creating a design, comprising:
   a first component configured to provide an input model from a plurality of inputs, including being configured to:
      provide a layout geometry; and
      provide a specification data structure;
   a second component configured to create a resolution model of the input model, including being configured to:
      interpolate the layout geometry;
      interpolate the specification data structure; and
      define an eggcrate substructure having a plurality of closed egg-cells based on the interpolated layout geometry and the interpolated specification data structure;
   a third component configured to finalize a layout using the resolution model; and
   a fourth component configured to provide one or more solid components into the finalized resolution model to create the design.

20. The computer-based system according to claim 19, wherein the third component is further configured to:
   for one or more components of the resolution model, create an object to represent each component;
   create a temporary resolution model of the one or more objects; and
   solve the temporary resolution models for the one or more objects.

* * * * *